(12) United States Patent
Chaudhri et al.

(10) Patent No.: US 7,793,232 B2
(45) Date of Patent: Sep. 7, 2010

(54) UNIFIED INTEREST LAYER FOR USER INTERFACE

(75) Inventors: Imran A. Chaudhri, San Francisco, CA (US); John Louch, San Luis Obispo, CA (US); Andrew M. Grignon, Campbell, CA (US); Gregory N. Christie, San Jose, CA (US)

(73) Assignee: Apple Inc., Cupertino, CA (US)

( * ) Notice: Subject to any disclaimer, the term of this patent is extended or adjusted under 35 U.S.C. 154(b) by 674 days.

(21) Appl. No.: 11/370,743

(22) Filed: Mar. 7, 2006

(65) Prior Publication Data

US 2006/0150118 A1 Jul. 6, 2006

Related U.S. Application Data

(63) Continuation of application No. 10/877,968, filed on Jun. 25, 2004.

(51) Int. Cl.
  *G06F 3/048* (2006.01)
  *G06F 3/00* (2006.01)

(52) U.S. Cl. .................. 715/802; 709/217; 709/218; 709/219; 715/762; 715/763; 715/764; 715/765; 715/767; 715/781; 715/782; 715/792; 715/840; 715/841

(58) Field of Classification Search .......... 715/792, 715/802, 810, 762–767, 781–782, 840–841; 345/667
See application file for complete search history.

(56) References Cited

U.S. PATENT DOCUMENTS

| | | | |
|---|---|---|---|
| 4,752,893 A | | 6/1988 | Guttag et al. |
| 5,007,033 A | * | 4/1991 | Kubota et al. .............. 368/21 |
| 5,168,441 A | | 12/1992 | Ornaheim et al. |
| 5,289,574 A | | 2/1994 | Sawyer |

(Continued)

FOREIGN PATENT DOCUMENTS

EP   548586 A2   6/1993

(Continued)

OTHER PUBLICATIONS

Microsoft et al. "Microsoft Windows XP—Microsoft Word 2003", 2003.*

(Continued)

*Primary Examiner*—Steven B Theriault
(74) *Attorney, Agent, or Firm*—Fenwick & West LLP

(57) ABSTRACT

A user-activatable dashboard (also referred to as a unified interest layer) contains any number of user interface elements, referred to herein as "widgets," for quick access by a user. In response to a command from a user, the dashboard is invoked and the widgets are shown on the screen. The user can activate the dashboard at any time, causing the dashboard to temporarily replace the existing user interface display on the user's screen. Once the dashboard has been activated, the user can interact with any or all of the widgets, and can configure the dashboard by adding, deleting, moving, or configuring individual widgets as desired. When the user wishes to return to the normal user interface he or she was working with, the user issues a command causing the dashboard to be dismissed. Once the dashboard has been dismissed, the previous user interface state is restored, allowing the user to resume normal interactions with the operating system.

65 Claims, 40 Drawing Sheets

U.S. PATENT DOCUMENTS

| | | | |
|---|---|---|---|
| 5,297,250 A | 3/1994 | Leroy et al. | |
| 5,351,995 A | 10/1994 | Booker | |
| 5,357,603 A | 10/1994 | Parker | |
| 5,388,201 A | 2/1995 | Hourvitz et al. | |
| 5,481,665 A | 1/1996 | Okada et al. | |
| 5,490,246 A | 2/1996 | Brotsky et al. | |
| 5,522,022 A | 5/1996 | Rao et al. | |
| 5,537,630 A | 7/1996 | Berry et al. | |
| 5,583,833 A * | 12/1996 | Capps et al. | 368/185 |
| 5,602,997 A * | 2/1997 | Carpenter et al. | 715/764 |
| 5,638,501 A | 6/1997 | Gough et al. | |
| 5,644,739 A | 7/1997 | Moursund | |
| 5,651,107 A | 7/1997 | Frank et al. | |
| 5,657,049 A * | 8/1997 | Ludolph et al. | 715/856 |
| 5,671,343 A | 9/1997 | Kondo et al. | |
| 5,708,764 A | 1/1998 | Borrel et al. | |
| 5,721,848 A | 2/1998 | Joseph | |
| 5,742,285 A | 4/1998 | Ueda | |
| 5,754,174 A * | 5/1998 | Carpenter et al. | 715/810 |
| 5,764,229 A | 6/1998 | Bennett | |
| 5,764,238 A * | 6/1998 | Lum et al. | 345/660 |
| 5,790,120 A * | 8/1998 | Lozares et al. | 715/779 |
| 5,793,376 A | 8/1998 | Tanaka et al. | |
| 5,796,402 A | 8/1998 | Ellison-Taylor | |
| 5,801,703 A * | 9/1998 | Bowden et al. | 715/841 |
| 5,838,316 A | 11/1998 | Arruza | |
| 5,845,251 A * | 12/1998 | Case | 704/500 |
| 5,877,741 A | 3/1999 | Chee et al. | |
| 5,877,762 A | 3/1999 | Young et al. | |
| 5,878,219 A * | 3/1999 | Vance et al. | 709/217 |
| 5,883,639 A | 3/1999 | Walton et al. | |
| 5,920,659 A * | 7/1999 | Iverson et al. | 382/298 |
| 5,929,852 A | 7/1999 | Fisher et al. | |
| 5,930,501 A * | 7/1999 | Neil | 713/400 |
| 5,933,148 A | 8/1999 | Oka et al. | |
| 5,949,409 A | 9/1999 | Tanaka et al. | |
| 5,963,191 A * | 10/1999 | Jaaskelainen, Jr. | 715/856 |
| 5,974,253 A * | 10/1999 | Nahaboo et al. | 717/105 |
| 5,978,579 A * | 11/1999 | Buxton et al. | 717/107 |
| 5,999,948 A * | 12/1999 | Nelson et al. | 715/207 |
| 6,005,568 A * | 12/1999 | Simonoff et al. | 715/744 |
| 6,006,231 A | 12/1999 | Popa | |
| 6,011,562 A | 1/2000 | Gagne et al. | |
| 6,031,937 A | 2/2000 | Graffagnino | |
| 6,075,543 A | 6/2000 | Akeley | |
| 6,128,010 A | 10/2000 | Baxter et al. | |
| 6,141,005 A * | 10/2000 | Hetherington et al. | 715/866 |
| 6,166,748 A | 12/2000 | Van Hook et al. | |
| 6,167,533 A * | 12/2000 | Potterveld et al. | 714/25 |
| 6,191,797 B1 | 2/2001 | Politis | |
| 6,195,664 B1 | 2/2001 | Tolfa | |
| 6,211,890 B1 | 4/2001 | Ohba | |
| 6,232,957 B1 * | 5/2001 | Hinckley | 345/156 |
| 6,246,418 B1 | 6/2001 | Oka | |
| 6,266,053 B1 | 7/2001 | French et al. | |
| 6,266,430 B1 * | 7/2001 | Rhoads | 382/100 |
| 6,272,484 B1 * | 8/2001 | Martin et al. | 707/1 |
| 6,272,558 B1 | 8/2001 | Hui et al. | |
| 6,275,449 B1 * | 8/2001 | Wang | 368/21 |
| 6,278,448 B1 * | 8/2001 | Brown et al. | 715/866 |
| 6,278,450 B1 * | 8/2001 | Arcuri et al. | 715/763 |
| 6,304,684 B1 * | 10/2001 | Niczyporuk et al. | 382/318 |
| 6,307,574 B1 | 10/2001 | Ashe et al. | |
| 6,321,314 B1 | 11/2001 | Van Dyke | |
| 6,333,753 B1 | 12/2001 | Hinckley | |
| 6,344,855 B1 | 2/2002 | Fisher et al. | |
| 6,369,823 B2 | 4/2002 | Ohba | |
| 6,369,830 B1 | 4/2002 | Brunner et al. | |
| 6,396,520 B1 * | 5/2002 | Ording | 715/798 |
| 6,411,301 B1 | 6/2002 | Parikh et al. | |
| 6,412,021 B1 | 6/2002 | Nguyen | |
| 6,421,058 B2 | 7/2002 | Parikh et al. | |
| 6,424,348 B2 | 7/2002 | Parikh | |
| 6,452,600 B1 | 9/2002 | Parikh et al. | |
| 6,456,290 B2 | 9/2002 | Parikh et al. | |
| 6,457,034 B1 | 9/2002 | Morein | |
| 6,466,218 B2 | 10/2002 | Parikh et al. | |
| 6,469,714 B2 * | 10/2002 | Buxton et al. | 715/762 |
| 6,483,524 B1 | 11/2002 | Petchenkine et al. | |
| 6,489,963 B2 | 12/2002 | Parikh et al. | |
| 6,512,522 B1 | 1/2003 | Miller et al. | |
| 6,526,174 B1 | 2/2003 | Graffagnino | |
| 6,542,160 B1 | 4/2003 | Abgrall | |
| 6,542,166 B1 | 4/2003 | Washington et al. | |
| 6,544,295 B1 * | 4/2003 | Bodnar | 709/219 |
| 6,571,328 B2 | 5/2003 | Liao et al. | |
| 6,577,317 B1 | 6/2003 | Duluk, Jr. et al. | |
| 6,580,430 B1 | 6/2003 | Hollis et al. | |
| 6,590,592 B1 * | 7/2003 | Nason et al. | 715/778 |
| 6,601,988 B2 * | 8/2003 | Molander | 368/187 |
| 6,609,977 B1 | 8/2003 | Shimizu et al. | |
| 6,614,444 B1 | 9/2003 | Duluk, Jr. et al. | |
| 6,618,048 B1 | 9/2003 | Leather | |
| 6,636,214 B1 | 10/2003 | Leather et al. | |
| 6,639,595 B1 | 10/2003 | Drebin et al. | |
| 6,647,370 B1 * | 11/2003 | Fu et al. | 705/8 |
| 6,661,426 B1 | 12/2003 | Jetha et al. | |
| 6,664,958 B1 | 12/2003 | Leather et al. | |
| 6,664,962 B1 | 12/2003 | Komsthoeft et al. | |
| 6,674,438 B1 | 1/2004 | Yamamoto et al. | |
| 6,687,745 B1 * | 2/2004 | Franco et al. | 709/219 |
| 6,697,074 B2 | 2/2004 | Parikh et al. | |
| 6,707,462 B1 | 3/2004 | Peercy et al. | |
| 6,710,790 B1 * | 3/2004 | Fagioli | 715/802 |
| 6,714,201 B1 | 3/2004 | Grinstein et al. | |
| 6,715,053 B1 | 3/2004 | Grigor | |
| 6,717,599 B1 | 4/2004 | Olano | |
| 6,724,403 B1 * | 4/2004 | Santoro et al. | 715/765 |
| 6,734,864 B2 | 5/2004 | Abgrall | |
| 6,738,804 B1 * | 5/2004 | Lo | 709/219 |
| 6,741,242 B1 | 5/2004 | Itoh et al. | |
| 6,760,046 B2 * | 7/2004 | I'Anson et al. | 715/746 |
| 6,765,592 B1 * | 7/2004 | Pletcher et al. | 715/760 |
| 6,788,318 B2 | 9/2004 | Chen | |
| 6,806,892 B1 | 10/2004 | Plow et al. | |
| 6,819,343 B1 * | 11/2004 | Sobeski et al. | 715/848 |
| 6,906,720 B2 | 6/2005 | Emberling et al. | |
| 6,910,000 B1 | 6/2005 | Yedidia et al. | |
| 6,911,984 B2 | 6/2005 | Sabella et al. | |
| 6,918,091 B2 | 7/2005 | Leavitt et al. | |
| 6,931,633 B1 | 8/2005 | Vazquez et al. | |
| 6,944,829 B2 * | 9/2005 | Dando | 715/798 |
| 6,993,721 B2 * | 1/2006 | Rosin et al. | 715/738 |
| 7,016,011 B2 | 3/2006 | De Haan | |
| 7,024,381 B1 | 4/2006 | Hastings et al. | |
| 7,027,055 B2 | 4/2006 | Anderson et al. | |
| 7,028,264 B2 * | 4/2006 | Santoro et al. | 715/765 |
| 7,050,955 B1 | 5/2006 | Carmel et al. | |
| 7,065,718 B2 * | 6/2006 | Lection | 715/863 |
| 7,085,994 B2 * | 8/2006 | Gvily | 715/234 |
| 7,107,546 B2 * | 9/2006 | Coulthard | 715/780 |
| 7,127,713 B2 * | 10/2006 | Davis et al. | 717/177 |
| 7,174,512 B2 * | 2/2007 | Martin et al. | 715/719 |
| 7,194,743 B2 | 3/2007 | Hayton et al. | |
| 7,218,575 B2 * | 5/2007 | Rosevear | 368/21 |
| 7,249,327 B2 * | 7/2007 | Nelson et al. | 715/782 |
| 7,281,202 B2 * | 10/2007 | Croney et al. | 715/255 |
| 7,293,034 B2 * | 11/2007 | Paya et al. | 707/101 |
| 7,305,491 B2 * | 12/2007 | Miller et al. | 709/248 |
| 7,315,848 B2 * | 1/2008 | Pearse et al. | 707/1 |
| 7,328,435 B2 * | 2/2008 | Trifon | 717/171 |
| 7,657,837 B2 * | 2/2010 | Shappir et al. | 715/751 |
| 2001/0030647 A1 | 10/2001 | Sowizral et al. | |
| 2001/0035885 A1 * | 11/2001 | Iron et al. | 345/855 |

| | | |
|---|---|---|
| 2002/0065946 A1* | 5/2002 | Narayan .................... 709/315 |
| 2002/0067418 A1* | 6/2002 | I ........................... 348/333.01 |
| 2002/0085037 A1 | 7/2002 | Leavitt et al. |
| 2002/0089526 A1* | 7/2002 | Buxton et al. ............... 345/700 |
| 2002/0093516 A1 | 7/2002 | Brunner et al. |
| 2002/0099678 A1* | 7/2002 | Albright et al. .............. 706/45 |
| 2002/0105548 A1 | 8/2002 | Hayton et al. |
| 2002/0118217 A1 | 8/2002 | Fujiki |
| 2002/0120673 A1* | 8/2002 | Tolson et al. ................ 709/202 |
| 2002/0123739 A1 | 9/2002 | Graffagnino |
| 2002/0129092 A1* | 9/2002 | Tolson et al. ................ 709/202 |
| 2002/0140740 A1 | 10/2002 | Chen |
| 2002/0171682 A1 | 11/2002 | Frank et al. |
| 2002/0174003 A1* | 11/2002 | Redmann et al. ............... 705/8 |
| 2002/0174181 A1 | 11/2002 | Wei |
| 2002/0186257 A1* | 12/2002 | Cadiz et al. ................. 345/838 |
| 2003/0009267 A1* | 1/2003 | Dunsky et al. ................ 701/4 |
| 2003/0020671 A1* | 1/2003 | Santoro et al. ............... 345/1.3 |
| 2003/0046316 A1* | 3/2003 | Gergic et al. ................ 707/513 |
| 2003/0065715 A1* | 4/2003 | Burdick et al. ............. 709/203 |
| 2003/0076369 A1* | 4/2003 | Resner et al. ............... 345/864 |
| 2003/0080995 A1* | 5/2003 | Tenenbaum et al. ......... 345/738 |
| 2003/0101046 A1* | 5/2003 | Krasnov ........................ 704/7 |
| 2003/0123739 A1 | 7/2003 | Graffagnino |
| 2003/0146934 A1 | 8/2003 | Bailey et al. |
| 2003/0154239 A1* | 8/2003 | Davis et al. ................. 709/201 |
| 2003/0158975 A1* | 8/2003 | Frank et al. ................. 709/331 |
| 2003/0164862 A1* | 9/2003 | Cadiz et al. ................. 345/838 |
| 2003/0169306 A1 | 9/2003 | Makipaa et al. |
| 2003/0174136 A1 | 9/2003 | Emberling et al. |
| 2003/0174154 A1* | 9/2003 | Yukie et al. ................. 345/700 |
| 2003/0184552 A1 | 10/2003 | Chadha |
| 2003/0184584 A1 | 10/2003 | Vachuska et al. |
| 2003/0189597 A1 | 10/2003 | Anderson et al. |
| 2003/0191799 A1* | 10/2003 | Araujo et al. ............... 709/203 |
| 2004/0012626 A1* | 1/2004 | Brookins .................... 345/738 |
| 2004/0032409 A1 | 2/2004 | Girard |
| 2004/0036711 A1 | 2/2004 | Anderson |
| 2004/0039934 A1 | 2/2004 | Land et al. |
| 2004/0056900 A1* | 3/2004 | Blume ........................ 345/807 |
| 2004/0179019 A1 | 9/2004 | Sabella et al. |
| 2004/0194020 A1 | 9/2004 | Beda et al. |
| 2004/0199574 A1* | 10/2004 | Franco et al. ............... 709/201 |
| 2004/0212640 A1* | 10/2004 | Mann et al. ................. 345/792 |
| 2004/0215740 A1* | 10/2004 | Frank et al. ................. 709/217 |
| 2004/0223003 A1 | 11/2004 | Heirich et al. |
| 2004/0255253 A1 | 12/2004 | Marcjan |
| 2004/0261012 A1* | 12/2004 | Balsiger ...................... 715/508 |
| 2004/0261037 A1 | 12/2004 | Ording et al. |
| 2004/0261038 A1 | 12/2004 | Ording et al. |
| 2005/0010419 A1* | 1/2005 | Pourhamid .................. 704/277 |
| 2005/0010634 A1* | 1/2005 | Henderson et al. .......... 709/201 |
| 2005/0021935 A1* | 1/2005 | Schillings et al. ............... 713/1 |
| 2005/0022139 A1 | 1/2005 | Gettman et al. |
| 2005/0039144 A1* | 2/2005 | Wada et al. ................. 715/840 |
| 2005/0057497 A1* | 3/2005 | Kawahara .................... 345/157 |
| 2005/0060655 A1* | 3/2005 | Gray et al. .................. 715/745 |
| 2005/0060661 A1* | 3/2005 | Kawahara et al. ........... 715/782 |
| 2005/0088447 A1 | 4/2005 | Hanggie et al. |
| 2005/0088452 A1 | 4/2005 | Hanggie et al. |
| 2005/0091571 A1 | 4/2005 | Leichtling |
| 2005/0144563 A1* | 6/2005 | Hough et al. ............... 715/753 |
| 2005/0160368 A1 | 7/2005 | Liu et al. |
| 2005/0168471 A1 | 8/2005 | Paquette |
| 2005/0168476 A1 | 8/2005 | Levene et al. |
| 2005/0172239 A1* | 8/2005 | Liu et al. .................... 715/763 |
| 2005/0193368 A1* | 9/2005 | Becker et al. ............... 717/106 |
| 2005/0240857 A1* | 10/2005 | Benedict et al. ............. 715/500 |
| 2005/0243373 A1 | 11/2005 | Silverbrook et al. |
| 2005/0256940 A1* | 11/2005 | Henderson et al. .......... 709/219 |
| 2005/0278651 A1* | 12/2005 | Coe et al. .................... 715/779 |
| 2005/0283734 A1* | 12/2005 | Santoro et al. .............. 715/765 |
| 2006/0015846 A1* | 1/2006 | Fraleigh et al. ............. 717/109 |
| 2006/0075141 A1* | 4/2006 | Boxenhorn ................. 709/246 |
| 2006/0123356 A1* | 6/2006 | Sobeski et al. .............. 715/781 |
| 2006/0136843 A1 | 6/2006 | Shafron |
| 2006/0206835 A1* | 9/2006 | Chaudhri et al. ............ 715/781 |
| 2006/0271637 A1* | 11/2006 | McKeon et al. ............. 709/217 |
| 2006/0274086 A1* | 12/2006 | Forstall et al. .............. 345/629 |
| 2006/0277469 A1* | 12/2006 | Chaudhri et al. ............ 715/709 |
| 2006/0277481 A1* | 12/2006 | Forstall et al. .............. 715/764 |
| 2007/0038934 A1* | 2/2007 | Fellman ...................... 715/700 |
| 2007/0044039 A1* | 2/2007 | Amadio et al. .............. 715/847 |
| 2007/0061724 A1* | 3/2007 | Slothouber et al. .......... 715/716 |
| 2007/0101146 A1* | 5/2007 | Louch et al. ................ 713/176 |
| 2007/0101279 A1* | 5/2007 | Chaudhri et al. ............ 715/762 |
| 2007/0101288 A1* | 5/2007 | Forstall et al. .............. 715/781 |
| 2007/0101291 A1* | 5/2007 | Forstall et al. .............. 715/805 |
| 2007/0101297 A1* | 5/2007 | Forstall et al. .............. 715/841 |
| 2007/0101433 A1* | 5/2007 | Louch et al. .................. 726/25 |
| 2007/0118813 A1* | 5/2007 | Forstall et al. .............. 715/805 |
| 2007/0130541 A1* | 6/2007 | Louch et al. ................ 715/804 |
| 2007/0162850 A1* | 7/2007 | Adler et al. ................. 715/700 |
| 2007/0203984 A2* | 8/2007 | AlHusseini et al. ......... 709/205 |
| 2007/0209013 A1* | 9/2007 | Ramsey et al. .............. 715/769 |
| 2007/0233736 A1* | 10/2007 | Xiong et al. ............. 707/104.1 |
| 2007/0266093 A1* | 11/2007 | Forstall et al. .............. 709/204 |

FOREIGN PATENT DOCUMENTS

| | | |
|---|---|---|
| EP | 0694879 A2 | 1/1996 |
| EP | 1383080 A1 | 1/2004 |
| EP | 0 972 273 B1 | 3/2004 |
| WO | WO 98/45815 | 10/1998 |
| WO | WO 02/09039 A2 | 1/2002 |
| WO | WO 2004/027707 A2 | 4/2004 |

OTHER PUBLICATIONS

Conner, D., et al. "Three-Dimensional Widgets," ACM, 1992, pp. 183-231.

"Stardock News: DesktopX User Manual On-line," 1999, 2003, [online] [Retrieved on May 11, 2007] Retrieved from the Internet <URL:http://www.stardock.com/newsitem.asp?id=538>.

"Comparison of widget engines" Wikipedia, 2007 [online] [Retrieved on Sep. 28, 2007] Retrieved from the Internet <URL: http://en.wikipedia.org/wiki/Comparison_of_widget_engines>.

"Dashboard Blog," Dec. 2003 [online] [Retrieved on May 11, 2007] Retrieved from the Internet <URL:http://www.nat.org/dashboard/blog.php3>.

Stardock.com, et al., "DesktopX Whitepaper and Users Guide," Stardock.com, et al., 1999 [online] [Retrieved on May 14, 2007] Retrieved from the Internet <URL:http://www.stardock.net/media/whitepaper_desktopx.html>.

"Windows Sidebar" Wikipedia, 2007 [online] [Retrieved on May 29, 2007] Retrieved from the Internet <URL:http://en.wikipedia.org/wiki/Windows-Sidebar>.

Gruber, J., et al., "Dashboard vs. Konfabulator," Daring Fireball, Jun. 2004, [online] [Retrieved on May 11, 2007] Retrieved from the Internet <URL:http://daringfireball.net/2004/06/dashboard_vs._konfabulator>.

"Snippets Software Platform," Snippet Software Inc., Jun. 2001, [online] [Retrieved on Jun. 11, 2001] Retrieved from the Internet <URL:http://www.snippets.com/products/>.

Snippet Software Inc. et al., "Product Spotlight Non-browser based portal solution from Snippets Software, Inc.," Corporate Portal Letter, Oct. 2000, 3 Pages, vol. 1, No. 10.

Microsoft Corporation, User's Guide Microsoft® Windows™ and MS-Dos® 6, 1993, pp. Cover-xvi, 11-28, 47-57, 91-101.

Microsoft Corporation, Microsoft® Windows™ User's Guide for the Windows Graphical Environment, Version 3.0 for the MS-DOS® or PC-DOS Operating System, 1990, Document No. SY06851-0290, pp. Cover-vii, 15-76, 355-424.

Altman, R. B., "Visual QuickStart Guide Power Point 2000/98, Applying Preset Animations," ProQuest Safari Books, Peachpit Press, May 7, 1999, 7 pages [online] Retrieved from the Internet: <URL:http://proquest.safaribooksonline.com/0201354411>.

Apple Computer, Inc. "Writing a Desk Accessory," Developer Connection, Jul. 3, 1996, [online] [Retrieved on Jan. 3, 2006] Retrieved from the Internet<URL:http://developer.apple.com/documentation/mac/Devices/Devices-16.html>.

Akeley, Kurt, and Hanrahan, Pat, "Real-Time Graphics Architecture," http://www.graphics.stanford.edu/courses/cs448a-01-fall, The OpenGL® Graphics System, CS448 Lecture 15, Fall, 2001.

Cadiz, JJ et al., "Sideshow: Providing Peripheral Awareness of Important Information," Technical Report MSR-TR-2001-83, Sep. 14, 2001, Microsoft Corporation, Redmond, WA.

Elliott, Conal, "Programming Graphics Processors Functionally," Proceedings of the 2004 Haskell Workshop, Sep. 22, 2004.

Fried, Ina, "Developer Calls Apple's Tiger a Copycat," CNET News.com, Jun. 28, 2004 [online] [Retrieved on Jul. 1, 2004] Retrieved from the Internet<URL:http://zdnet.com.com/2102-1104_2-250692.html?tag=printthis>.

Fried, Ina, "For Apple's Tiger, the Keyword is Search," CNET News.com, Jun. 28, 2004 [online] [Retrieved on Jul. 1, 2004] Retrieved from the Internet<URL:http://zdnet.com.com/2102-1103_2-250346.html?tag=printthis>.

Konfabulator, "Cupertino, Start Your Photocopiers!," [online] [Retrieved on Jul. 1, 2004] Retrieved from the Internet<URL: http://www.konfabulator.com>.

Konfabulator, "Screenshots," [online] [Retrieved on Jul. 1, 2004] Retrieved from the Internet<URL:http://www.konfabulator.com/info/screenshots.html>.

Konfabulator, "What is Konfabulator?," [online] [Retrieved on Jul. 1, 2004] Retrieved from the Internet<URL:http://www.konfabulator.com/info/>.

Notification of Transmittal of the International Search Report and the Written Opinion of the International Searching Authority, PCT/US2005/022579.

Puder, Arno, "Extending Desktop Applications to the Web," Jun. 2004, San Francisco State University, Computer Science Department.

Segal, Mark and Akeley, Kurt, "The OpenGL® Graphics System: A Specification (Version 1.5)," Copyright © 1992-2003 Silicon Graphics, Inc., Oct. 30, 2003.

Shantzis, Michael A., "A Model for Efficient and Flexible Image Computing," Computer Graphics Proceedings, Annual Conference Series, Orlando, Florida, Jul. 24-29, 1994.

Shiozawa, Hidekazu et al., "Perspective Layered Visualization of Collaborative Workspaces," Proceedings of the International ACM SIGGROUP conference on Supporting Group Work Publisher, Nov. 1999.

Staples, Loretta, "Representation in Virtual Space: Visual Convention in the Graphical User Interface," Proceedings of the SIGCHI Conference on Human Factors in Computing Systems, Apr. 1993.

Wardell, Brad, Konfabulator for Windows, Jan. 10, 2004; [online]Retrieved from the Internet Mar. 6, 2006] Retrieved from the Internet:<URL: http://www.xpthemes.com/forums.asp?MID=19&CMID=19&AID=4472>.

Haeberli, P. et al., "The Accumulation Buffer: Hardware Support for High-Quality Rendering," Computer Graphics, Aug. 1990, pp. 309-318, vol. 24, No. 4.

International Search Report, PCT/US2005/008804, Jul. 27, 2005, 3 pages.

International Search Report, PCT/US2005/008805, Aug. 8, 2005, 3 pages.

Rochkind, M. et al., "Common Elements in Today's Graphical User Interfaces: The Good, the Bad, and the Ugly," INTERCHI '93, ACM, Apr. 24-29, 1993, pp. 470-473.

Tang, J.C. et al., "ConNexus to Awarenex: Extending Awareness to Mobile Users," SIGCHI '01, ACM, Mar. 31-Apr. 4, 2001, 8 pages.

International Search Report and Written Opinion, PCT/US2005/022152, Jul. 10, 2006, 8 pages.

Archive of "Objects, Images and Applets," W3C Recommendation, Feb. 10, 2003, [online] [Archived by http://archive.org; Retrieved on Apr. 13, 2006] Retrieved from the Internet<URL:http://web.archive.org/web/20030210154019/http://www.w3.org/TR/REC-html140/struct/objects.html>.

Snippets Software et al., "Products: Overview," Feb. 2002, [online] [Retrieved on Feb. 5, 2008] Retrieved from the Internet URL:http://web.archive.org/web/20020206061508/http://www.snippets.com/products/>.

Stardock et al., "DesktopX General Guide," Aug. 2000, [online] [Retrieved on Jan. 31, 2008] Retrieved from the internet <URL:http://www.stardock.com/products/desktopx/docs/>.

Stardock et al., "DesktopX WhitePaper," Aug. 2000, [online] [Retrieved on Jan. 31, 2008] Retrieved from the internet <URL:http://www.stardock.net/media/whitepaper_desktopx.html>.

Stardock et al., "DesktopX Tutorial," Aug. 2000, [online] [Retrieved on Jan. 31, 2008] Retrieved from the internet <URL:http://www.stardock.com/products/desktopx/tutorial.html>.

Stardock et al., "What Can It Do? Making Objects," DesktopX Tutorial, 2001, [online] [Retrieved on Apr. 11, 2008] Retrieved from the Internet <URL:http://web.archive.org/web/20011019222825/http://www.stardock.com/products/desktopx/...>.

Rist, T., et al., "Customizing Graphics for tiny Displays of Mobile Devices," Personal and Ubiquitous Computing, 2002, pp. 260-268, vol. 6.

Unknown, "Convert just about Anything to Anything else," OnlineConversion.com, Aug. 2000, [online] [Retrieved on Jun. 22, 2008] Retrieved from the internet <URL:http://web.archive.org/web/20000815055422/http://www.onlineconversion.com/>.

First Office Action, Chinese Application No. 200580016349.3, Jul. 25, 2008, 21 Pages.

Baratz, A., et al., "DesktopX 3.1," Ars Technica, Nov. 17, 2005, [online] [Retrieved on Aug. 1, 2008] Retrieved from the internet <URL:http://arstechnica.com/reviews/apps/desktopx.ars>.

Siracusa, J., et al., "Mac OA 10.4 Tiger: Dashboard," Apr. 28, 2005, [online] [Retrieved on Aug. 1, 2008] Retrieved from the internet <URL:http://arstechnica.com/reviews/os/macosx-10-4.ars/17>.

Wardell, B., et al., "Apple's Dashboard vs. Konfabulator vs. DesktopX," Skinning the frog, Jul. 1, 2004, [online] [Retrieved on Aug. 1, 2008] Retrieved from the internet < URL:http://frogboy.joeuser.com/article/19800>.

Thomas, B., et al., "Animating Widgets in the InterViews Toolkit," Lecture Notes in Computer Science, 1995, pp. 26-44.

Archive of BabelFish.com Inc., Oct. 2003, [online] [Archived by http://archive.org on Oct. 2, 2003; Retrieved on Dec. 8, 2008] Retrieved from the internet URL:http://web.archive.org/web/20031002115902/www.babelfish.com/en/index.html>.

"Starfish Software Introduces Starfish Internet Sidekick; Starfish Internet Sidekick is the best way for Internet users to manage their calendar, contacts and communications," Business Wire, Sep. 23, 1996, [online] [Retrieved on Dec. 8, 2008] Retrieved from the internet URL:http://findarticles.com/p/articles/mi_m0EIN/is_1996_Sept_23/ai_18704672?tag=rel.res1>.

Archive of www.gigaplex.com, Lazar Productions, Nov. 1996, [online] [Archived by http://archive.org on Nov. 5, 1996; Retrieved on Dec. 8, 2008] Retrieved from the internet URL:http://web.archive.org/web/19961105081827/www.gigaplex.com/>.

Archive of movies.com, Jan. 2002, [online] [Archived by http://archive.org on Jan. 18, 2002; Retrieved on Dec. 8, 2008] Retrieved from the internet URL:http://web.archive.org/web/20020118102516/movies.go.com>.

"Software Widget," Wikipedia, Dec. 4, 2008, [online] [Retrieved on Dec. 8, 2008] Retrieved from the internet URL:http://en.wikipedia.org/wiki/Software_widget>.

Stardock, et al., "Stardock—Innovation on demand!" Stardock White Paper Archived on Aug. 2000, 3 pages [online] [Retrieved on Jul. 20, 2009] Retrieved from the internet URL:<http://web.archive.org/web/20000817004730/http://www.stardock.com/index.html>.

Stardock, et al., "Desktopx—User Guide—Version 2," Aug. 2000, p. 1-57.

Office Action for U.S. Appl. No. 11/166,802, Jul. 22, 2009, 34 Pages.

Second Office Action for Chinese Patent Application No. 200580016349.3, Jan. 8, 2010, 15 Pages.

* cited by examiner

UNIFIED INTEREST LAYER FOR USER INTERFACE

CROSS-REFERENCE TO RELATED APPLICATIONS

This application is a continuation of U.S. application Ser. No. 10/877,968, entitled "Unified Interest Layer for User Interface," filed Jun. 25, 2004; and the subject matter of the invention is generally related to the following jointly owned and co-pending patent applications, each incorporated herein by reference in its entirety:

U.S. Provisional patent application Ser. No. 11/144,384, for "Procedurally Expressing Graphic Objects for Web Pages," filed Jun. 25, 2004;

U.S. Utility patent application Ser. No. 10/874,829, for "User Interface for Assisting in the Installation of an Asset," filed Jun. 22, 2004;

U.S. Utility patent application Ser. No. 10/877,358, for "Display-Wide Visual Effects for a Windowing System Using a Programmable Graphics Processing Unit," filed Jun. 25, 2004;

U.S. Utility patent application Ser. No. 10/826,762, for "High-Level Program Interface for Graphics Operations," filed Apr. 16, 2004;

U.S. Utility patent application Ser. No. 10/866,360, for "System and Method for Processing Graphics Operations with Graphics Processing Unit," filed Jun. 11, 2004;

U.S. Utility patent application Ser. No. 10/826,596, for "Improved Gaussian Blur," filed Apr. 16, 2004;

U.S. Utility patent application Ser. No. 10/826,744, for "System for Emulating Graphics Operations," filed Apr. 16, 2004;

U.S. Utility patent application Ser. No. 10/876,298, for "User-Interface Design," filed Jun. 24, 2004;

U.S. Utility patent application Ser. No. 10/876,039, for "Gaussian Blur Approximation Suitable for GPU," filed Jun. 24, 2004;

U.S. Utility patent application Ser. No. 10/825,694, for "System for Optimizing Graphics Operations," filed Apr. 16, 2004;

U.S. Utility patent application Ser. No. 10/826,773, for "System for Reducing the Number of Programs Necessary to Render an Image," filed Apr. 16, 2004; and U.S. Utility patent application Ser. No. 10/875,483, for "Fast Approximation Functions for Image Processing Filters," filed Jun. 24, 2004.

FIELD OF THE INVENTION

The present invention relates generally to graphical user interfaces, and more particularly to a user-activatable, configurable, unified layer containing items of interest to a user.

BACKGROUND OF THE INVENTION

A hallmark of modern graphical user interfaces is that they allow a large number of items to be displayed on a screen at the same time. The leading personal computer operating systems, such as Apple MacOS X and Microsoft Windows XP, provide user interfaces in which a number of windows can be displayed, overlapped, resized, moved, configured, and reformatted according to the needs of the user. Taskbars, menus, and other UI elements provide mechanisms for accessing and activating windows even when they are hidden behind other windows.

Although many users appreciate the ability of such user interfaces to present such a wealth of information on the screen simultaneously, the resulting "information overload" can be somewhat overwhelming. Users often find that it is difficult to navigate to a particular UI element or window, or to even locate a desired element, among a large number of onscreen elements. The problem is further compounded when user interfaces allow users to position the onscreen elements in any desired arrangement, including overlapping, minimizing, maximizing, and the like. Such flexibility may be useful to some users but may result in chaos for other users. Having too many items on the screen simultaneously leads to information overload, and can act as an inhibiting factor in the effective use of the computer equipment.

Some user interfaces dedicate certain areas of the screen for holding certain user interface elements that are commonly used (such as a menu bar, or icons that activate commonly-used programs or files). However, such areas are generally limited in size, so as not to occupy too much valuable screen real estate that could otherwise be devoted to the main workspace area of the display screen. Although small elements, such as a digital clock element or taskbar, may be well suited for display in such dedicated screen areas, other types of elements cannot be usably presented in such a small screen area; thus they must be activated, or enlarged, before they can be used or viewed. This causes yet another level of confusion, since the items need to be activated and dismissed. Furthermore, the items may overlap or otherwise add to the number of onscreen elements that must be dealt with and organized by the user.

These problems cause many users to fail to use their computers to their full potential, and can further result in frustration or confusion, particularly in novice users.

What is needed is a mechanism for providing easy access to commonly used user interface elements, without introducing additional clutter or confusion. What is further needed is a mechanism for providing such access in a user-configurable manner that allows the user to activate and dismiss the UI elements at will and with a minimum of confusion. What is further needed is a mechanism that allows users to easily activate and dismiss certain user interface elements regardless of the number of open windows currently on the user's screen, and without requiring the user to search for particular user interface elements among a set of open windows.

What is further needed is a mechanism for addressing the above-stated problems in a convenient, easy-to-use manner that is likely to be readily adopted by users, and that fits within the framework of existing graphical user interfaces.

SUMMARY OF THE INVENTION

According to the techniques of the present invention, a user-activatable dashboard (also referred to as a unified interest layer) is provided. The dashboard can contain any number of user interface elements, referred to herein as "widgets," for quick access by a user. In response to a command from a user, the dashboard is invoked and the widgets are shown on the screen. In one aspect of the invention, the user can activate the dashboard at any time, causing the dashboard to temporarily replace or overlay the existing user interface display on the user's screen.

Once the dashboard has been activated, the user can interact with any or all of the widgets, and can configure the dashboard by adding, deleting, moving, or configuring individual widgets as desired. When the user wishes to return to the normal user interface, the user issues a command causing the dashboard to be dismissed. Once the dashboard has been dismissed, the previous user interface state is restored, allowing the user to resume normal interactions with the operating system.

In one aspect, the dashboard, when activated, temporarily replaces the existing user interface display. In another aspect, the dashboard partially obscures the existing user interface display, but allows some part of the existing display to be visible so as to remind the user of its presence. In another aspect, the existing user interface display is faded, blurred, and/or darkened while the dashboard is active.

In one aspect, a transition effect is displayed during activation and/or dismissal of the dashboard, so as to assist the user in understanding what is happening when the dashboard appears and disappears.

In one aspect, the user can select from any number of widgets to be placed on the dashboard in any desired arrangement. Whenever the dashboard is activated, the widgets appear in the locations where the user placed them previously.

Widgets can be of any type. They can communicate with a remote server to provide information to the user (for example, a weather report), or they can provide commonly needed functionality (for example, a calculator), or they can act as an information repository (for example, a notepad or calendar). Some widgets can provide a combination of these types of functions. In one aspect, an application programming interface (API) is provided so as to allow third-party developers to create and distribute additional widgets that provide different types of functionality.

BRIEF DESCRIPTION OF THE DRAWINGS

The accompanying drawings illustrate several embodiments of the invention and, together with the description, serve to explain the principles of the invention.

One skilled in the art will recognize that these Figures are merely examples of the operation of the invention according to one embodiment, and that other user interface arrangements and modes of operation can be used without departing from the essential characteristics of the invention.

DETAILED DESCRIPTION OF THE EMBODIMENTS

The present invention is now described more fully with reference to the accompanying Figures, in which several embodiments of the invention are shown. The present invention may be embodied in many different forms and should not be construed as limited to the embodiments set forth herein. Rather these embodiments are provided so that this disclosure will be complete and will fully convey the invention to those skilled in the art.

Hardware Architecture

Figure 1:
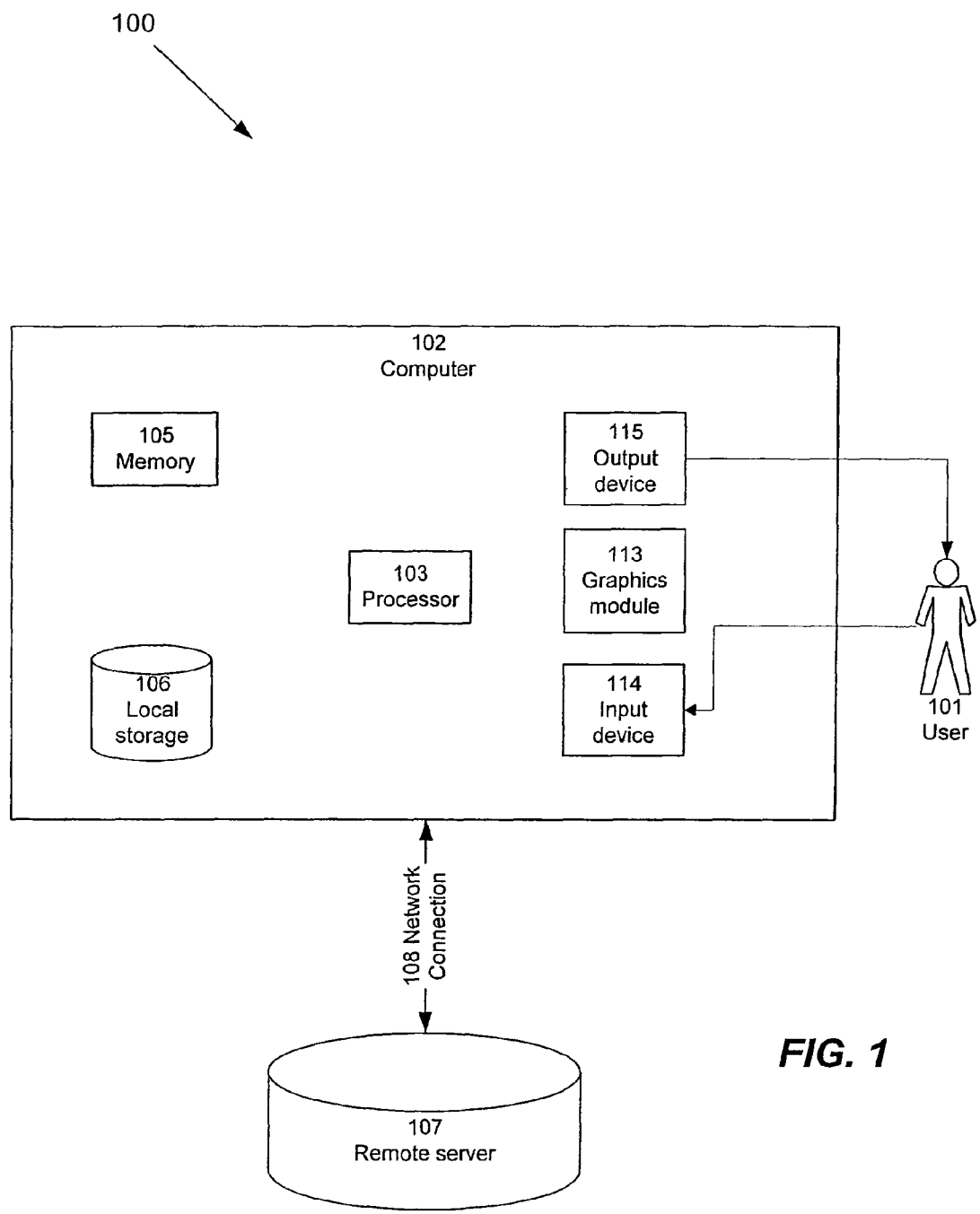
FIG. 1 is a block diagram depicting an overall architecture for implementing the present invention according to one embodiment.

In one embodiment, the present invention is implemented as part of an operating system for a personal computer. One example of an implementation of the present invention is in a Macintosh personal computer running the MacOS X operating system. Referring now to FIG. 1, there is shown an example of an architecture for a system 100 for implementing the present invention. Personal computer 102 includes processor 103, memory 105, input devices 114 such as keyboard and mouse, and output device 115 such as a display screen. A graphics module 113, such as a graphics card, may be provided for generating output for output device 115. User 101 interacts with system 100 by providing input via device 114 and viewing output via device 115. Computer 102 also includes local storage 106, such as a hard drive, and can also include network connection 108 for accessing remote server 107. These components are well-known hardware components commonly used for running software applications. In one embodiment, software embodying the invention is provided on a computer-readable medium such as local storage 106.

In another embodiment, the present invention is implemented as a plug-in that can be installed and run on personal computer 102, and that interacts with the operating system of personal computer 102 to perform the functions described herein. In yet another embodiment, the present invention is implemented as functionality in a software application running on a personal computer.

For illustrative purposes, in the following description the invention is described as a feature of an operating system; however, one skilled in the art will recognize that the techniques of the present invention can be implemented in other contexts as well, including those described above.

Method of Operation

Figure 2:
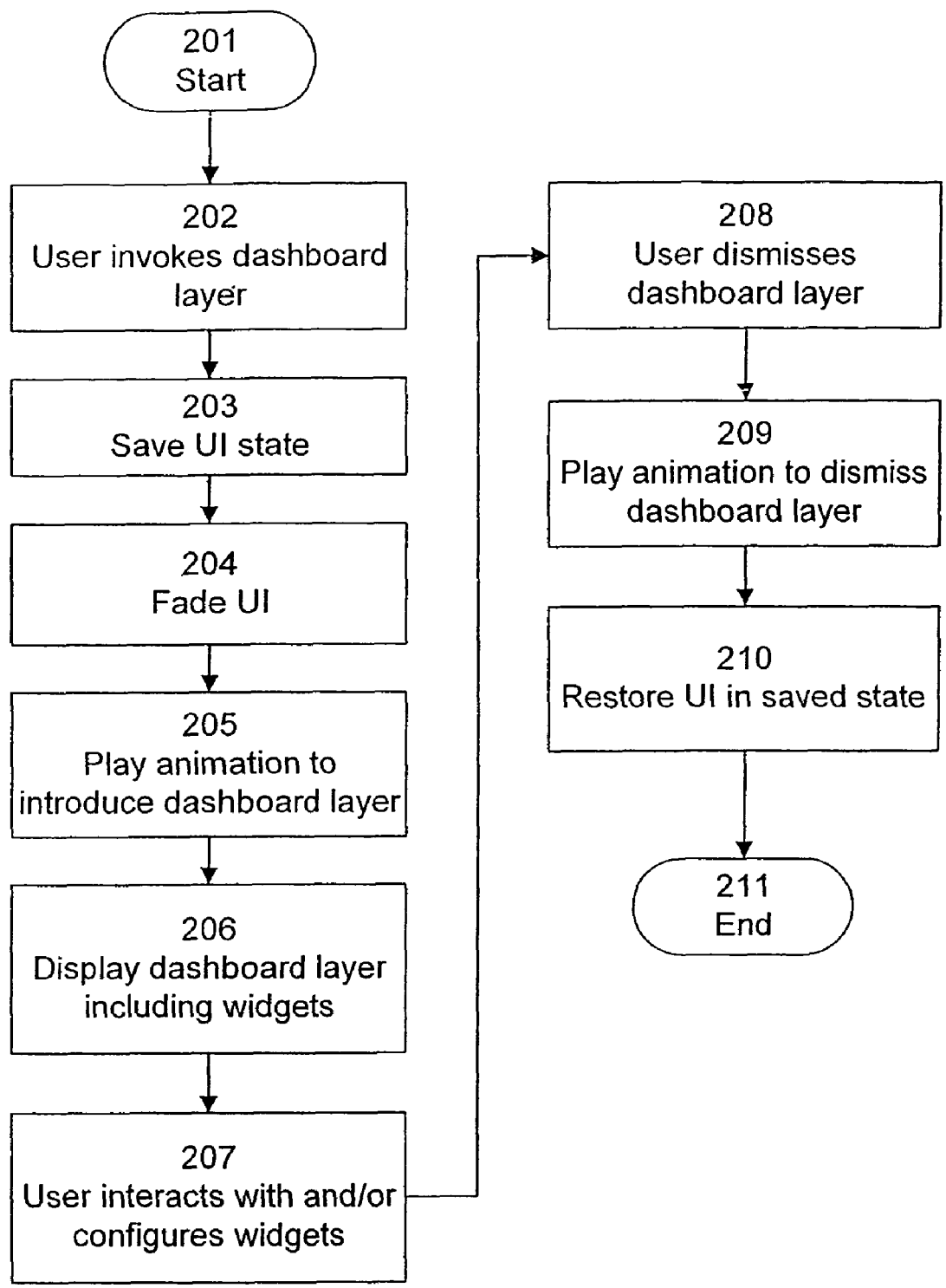
FIG. 2 is a flowchart depicting a method for activating and using a dashboard according to one embodiment of the present invention.

Referring now to FIG. 2, there is shown a flowchart depicting a method for activating and using a dashboard according to one embodiment of the present invention. In one embodiment, the user can activate the functionality of the present invention at any time, for example by hitting a designated function key or key combination, or by clicking on an icon, or by selecting a command from an onscreen menu, or by moving an onscreen cursor to a designated corner of the screen. In response to the user performing such an action 202, the current state of the user interface is saved 203, the user interface is temporarily inactivated (and/or faded 204), an animation is played 205 to introduce the dashboard, and the dashboard of the present invention is displayed 206. If applicable, a previous state of the dashboard is retrieved, so that the dashboard can be displayed in the same configuration as the last time the user saw it.

In one embodiment, the dashboard is overlaid on the existing desk-top user interface; the user interface may be darkened, brightened, blurred, distorted, or otherwise altered so as to emphasize that it is temporarily inactivated. The existing desktop may be visible behind the dashboard. In another embodiment, the existing desktop is not visible while the dashboard is active. In another embodiment, the desktop is shrunk to a small portion of the screen while the dashboard is active, and can be reactivated by clicking on it. In another embodiment, the desktop is shrunk and presented as a widget similar to the widgets described herein; the desktop can be reactivated by clicking on the widget.

The dashboard (also referred to herein as a "unified interest layer") includes a number of elements, referred to herein as "widgets". These widgets generally include software accessories for performing useful, commonly needed functions. Examples of widgets include, without limitation, a calendar, a calculator, an address book, a package tracker, a weather module, and the like. In one embodiment, some widgets may interact with remote sources of information, such as servers, to provide information; for example, a weather module may retrieve live weather data from a remote server. Widgets may be interactive, so that a user performs common input operations (such as clicking a mouse or typing on a keyboard) to utilize the functionality of a widget.

The user interacts with and/or configures widgets as desired 207. In one embodiment, the user can move widgets around the screen, and can resize widgets if applicable. Some widgets may be resizable, and some may be of fixed size; the widget author may specify whether a widget can be resized. Some widgets may automatically resize themselves based on the amount or nature of the data being displayed. In one embodiment, widgets may overlap one another. In another embodiment, widgets do not overlap one another; if the user attempts to move one widget to the position occupied by another widget, one of the widgets may automatically move out of the way to make room. In one embodiment, the position, configuration, and size of widgets are saved when the dashboard is dismissed, so that the same state can be restored the next time the dashboard is invoked.

When the user wishes to dismiss 208 the dashboard and return to the normal user interface, he or she does so by invoking a dismissal command. In various embodiments, the user hits a function key or key combination (which may be the same or different than the key or combination used to activate the dashboard), or clicks on a close box or other icon, or clicks on negative space within the dashboard (in other words, a space between widgets), or moves an onscreen cursor to a predefined corner of the screen. In another embodiment, the dashboard is automatically dismissed after some predetermined period of time without any user activity, or upon some other trigger event. An animation may be played 209 to provide a transition as the dashboard is dismissed.

In one embodiment, when the dashboard is dismissed, the current configuration of the widgets is stored so that it can be retrieved the next time the dashboard is activated. In one embodiment, an animation is played to dismiss the dashboard and re-introduce the user interface. The user interface is restored 210 to its previous state, so that the user can resume normal interaction with the software applications and operating system of the computer.

In one embodiment, the dashboard is configurable. The user can select any number of widgets to be displayed, for example by dragging the widgets from a configuration bar (or other user interface element) onto a location on the dashboard. In one embodiment, the configuration bar can include different types of widgets, and can be categorized and/or hierarchically organized. In one embodiment, in response to the user dragging a widget onto the configuration bar, the widget is downloaded from a server and installed (if it is not already installed on the user's machine). In one embodiment, certain widgets may cost money, so that the user must provide a credit card or some other payment means before the widget is installed on the user's machine. In another embodiment, widgets are already installed on the user's machine, but are only made visible when they have been dragged from the configuration bar onto the dashboard. One skilled in the art will recognize that the configuration bar is merely an example of one type of user interface element for configuring the dashboard, and that other configuration mechanisms can be used without departing from the essential characteristics of the present invention.

As mentioned above, various types of animations can be used to emphasize and clarify transitions in connection with the present invention. For example, activation of the dashboard can be signaled by a "fly-in" animation, wherein the widgets move from the edge of the screen inwards to their respective positions in the dashboard. Simultaneously, the user interface can be darkened, blurred, distorted, or otherwise altered to indicate that it is temporarily inactive. Dismissal of the dashboard can be signaled by a "fly-out" animation, wherein the widgets move towards the edge of the screen and then appear to fly off the screen. Simultaneously, the user interface is restored to its normal state. In one embodiment, when the user drags a widget from the configuration bar onto the desktop, an animation such as a ripple effect can be shown, to emphasize that the widget has been placed onto the desktop in the selected location. The ripple effect distorts the background temporarily to give the impression that the widget is being placed into water. In one embodiment, the effect is implemented according to animation and distortion techniques described in detail in the related cross-referenced patent applications. In one embodiment, such animations are configurable by the user.

In one embodiment, more than one dashboard is available. For example, the user can configure one dashboard to contain widgets related to work, and another for widgets related to personal matters. Different trigger events (such as different key combinations) can be used for triggering the various dashboards; alternatively, the user can select from a pop-up menu which dashboard he or she wishes to activate. The system of the present invention stores state information for each of the dashboards. Different dashboards can contain one or more of the same widgets; state information for a widget can be maintained separately for each dashboard in which the widget appears, or it can be commonly maintained across all dashboards in which the widget appears. In addition, different dashboards can be available for different users of computer 102, so that each user can only access the dashboard(s) he or she created. A user can specify a dashboard as being available to other users, if desired. A user can also specify, for any or all of the dashboards he or she creates, whether other users are permitted to make changes to the dashboard(s).

In one embodiment, some or all widgets are associated with related, fully functional applications providing expanded versions of the functionality of the corresponding widgets. These widgets include a button, or icon, or other element, for quickly launching the associated application. When the user clicks on the button, the dashboard is dismissed, the normal desktop user interface is reactivated, and the associated application is automatically launched. For example, as will be described in more detail below, a music player widget can include a button for launching a fully functional music player application containing additional features beyond what is available in the widget.

In one embodiment, a button can be provided for accessing a web-site, web page, or web-based application having functionality or information related to a widget. When the user clicks on the button, the dashboard is dismissed, the normal desktop user interface is reactivated, a web browser is launched, and the web page (or the like) associated with the widget is automatically launched. For example, a stock quote widget may include a button for accessing a website that includes more detailed information on a portfolio or on a particular stock. In another embodiment, related fully functional applications, websites, web pages, or web-based applications can be accessed by other means than a button within the widget. For example, such functionality can be launched via an on-screen icon or menu, or via a keystroke or key combination.

In one embodiment, the fully functional application or related web-site provides context for a launched widget. For example, if the user has highlighted a word in a document before activating a dictionary widget, the dictionary widget's text field is automatically populated with the highlighted word. In one embodiment, a word search is automatically activated, and the results automatically displayed, so that activating the dictionary widget causes a definition to be displayed without any further user interaction. Similarly, if an email message is open on the user's screen when an address book widget is launched, the address book is automatically opened to a page corresponding to the contact information for the sender of the email message. In one embodiment, such pre-population or automatic opening is not performed under certain situations, such as for example if the widget is already open to another page or entry. In one embodiment, the user can configure the operation of the widget, including whether or not such prepopulation or automatic opening occurs and under what circumstances it should occur. One skilled in the art will recognize that there are many other situations where a widget can use context information from a currently-running application or website.

In one embodiment, some or all widgets have rollover elements; these are user interface elements that appear when the onscreen cursor is moved over the widget. The rollover elements disappear when the onscreen cursor is moved so that it is no longer over the widget. In one embodiment, rollover elements only appear if the cursor is held over the widget for at least a predetermined period of time, such as half a second. An example of a rollover element is a volume ring (not shown) for music player application.

FIGS. 4 through 17D and 26 through 32 depict examples of dashboard operations in response to various user commands; these Figures illustrate various techniques and capabilities of the present invention.

Figure 4:
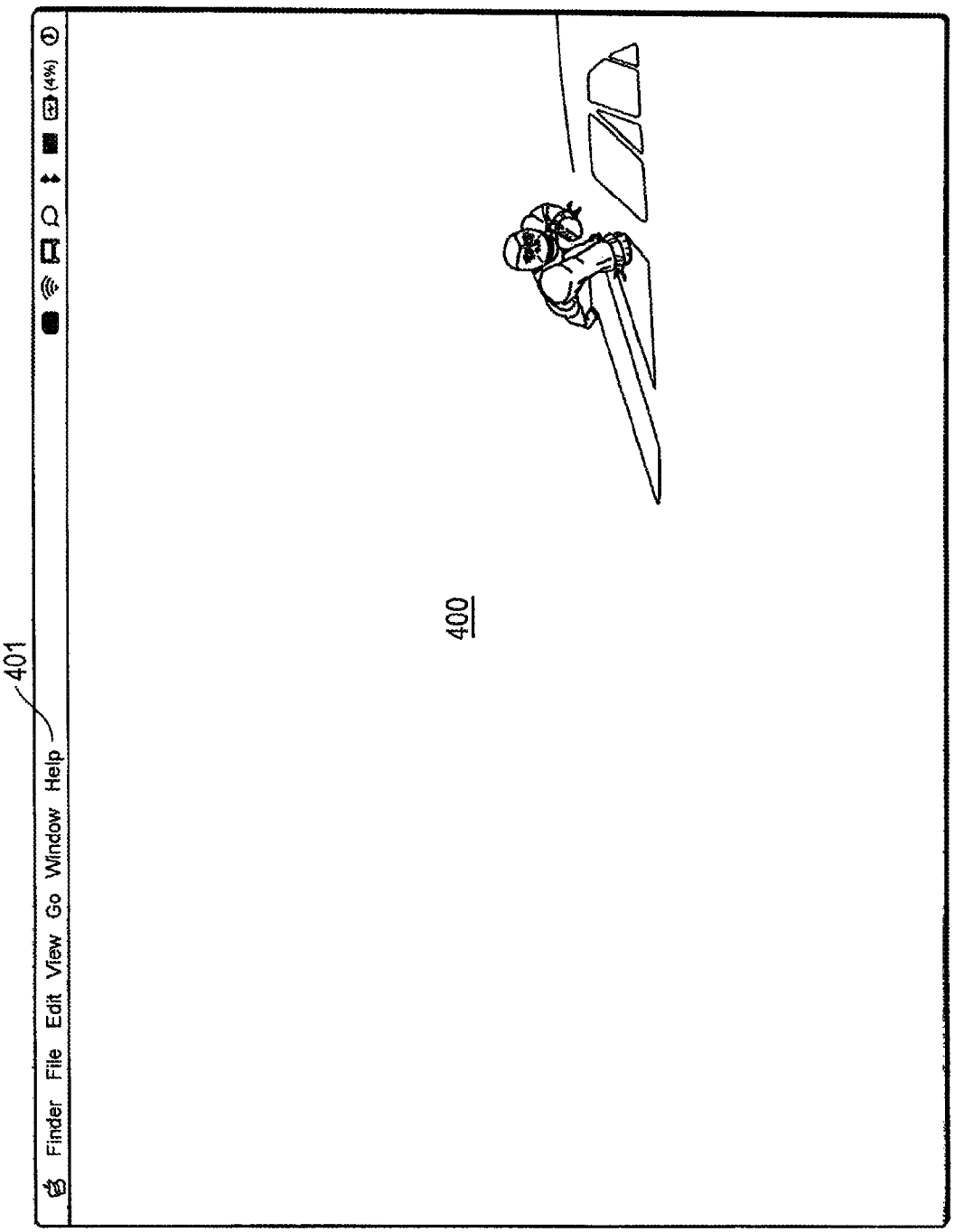
FIG. 4 is a screen shot depicting a desktop user interface prior to activation of a dashboard.

FIG. 4 depicts a desktop user interface 400 prior to activation of the dashboard. Desktop user interface 400 (referred to herein as "desktop") is a conventional user interface as may be provided by an operating system such as MacOS X. Desktop 400 has a background image, menu bar 401, and other standard features. As is known in the art, desktop 400 may also include windows, icons, and other elements (not shown).

Figure 5:
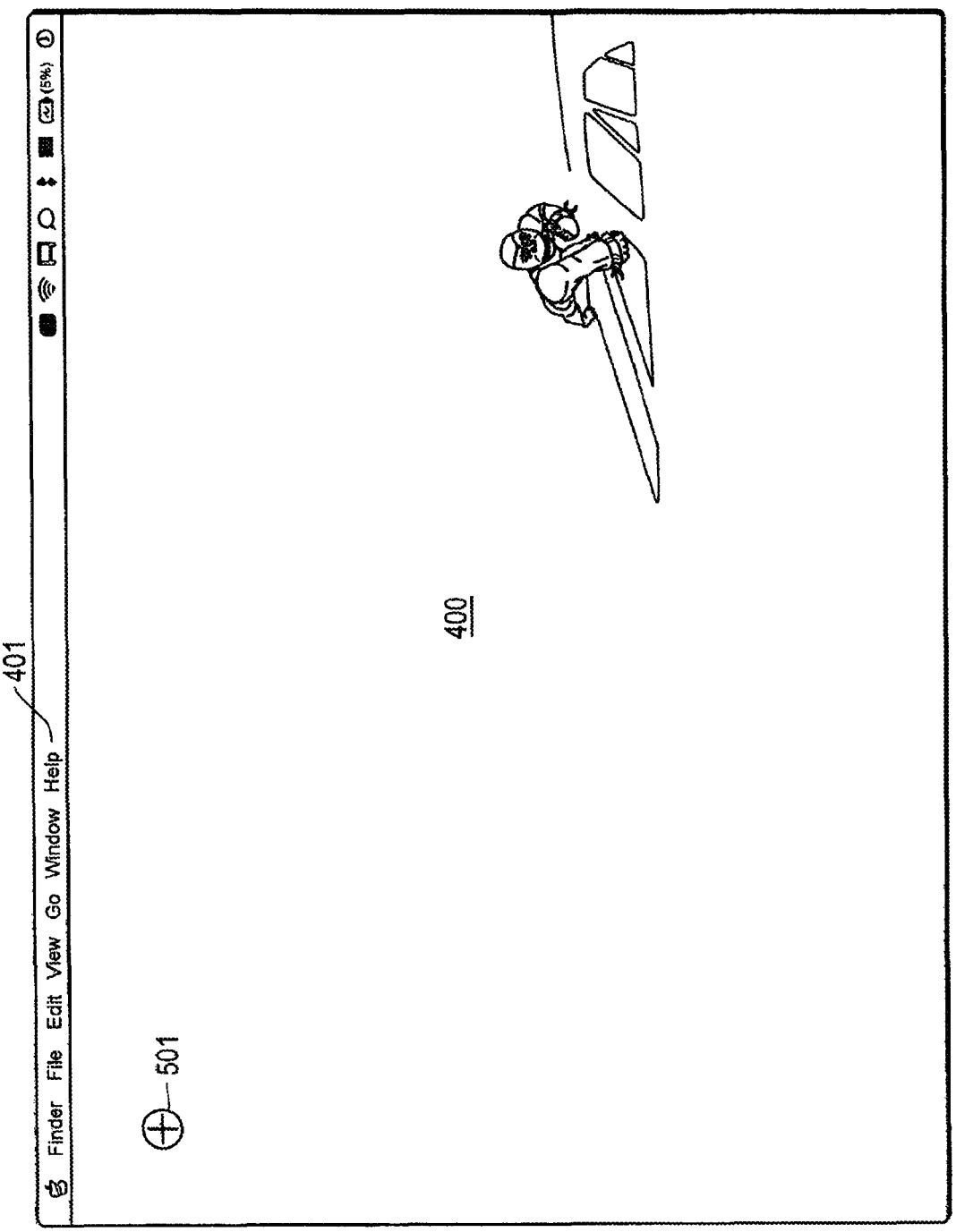
FIG. 5 is a screen shot depicting an initial state for a dashboard, according to one embodiment.

The user activates the dashboard by selecting an item from a menu, or by clicking on an icon, or by pressing a function key or key combination, or by some other means for invoking a command. FIG. 5 depicts an initial state for a dashboard, according to one embodiment. In the example of FIG. 5, a configuration icon 501 is initially displayed. Alternatively, upon activation, the dashboard can include one or more default widgets. Alternatively, if the dashboard has previously been activated and configured, the widgets are displayed as previously configured. As shown in FIG. 5, the dashboard itself is not necessarily visible as a distinct layer; rather its various components (such as widgets, icon 501, and other features) are visible. In one embodiment, these components are displayed in a transparent layer that allows desktop 400 to be seen through it. In one embodiment desktop 400 and its components are darkened (or blurred, or otherwise visually modified) while the dashboard is active, so as to emphasize that desktop 400 is temporarily inactive. The user can easily reactivate desktop 400 and dismiss the dashboard by simply clicking on an area of the screen where no dashboard element is being displayed; in one embodiment, clicking on this "negative space" causes the dashboard to be dismissed according to techniques described in more detail below. In another embodiment, other commands, key combinations, icons, or other user input is used to cause the dashboard to be dismissed. In another embodiment, desktop 400 is not visible while the dashboard is active.

In one embodiment, the user can move icon 501 to any location on the screen by dragging it, and the position of icon 501 is persistent from one invocation of the dashboard to the next.

Figure 6:
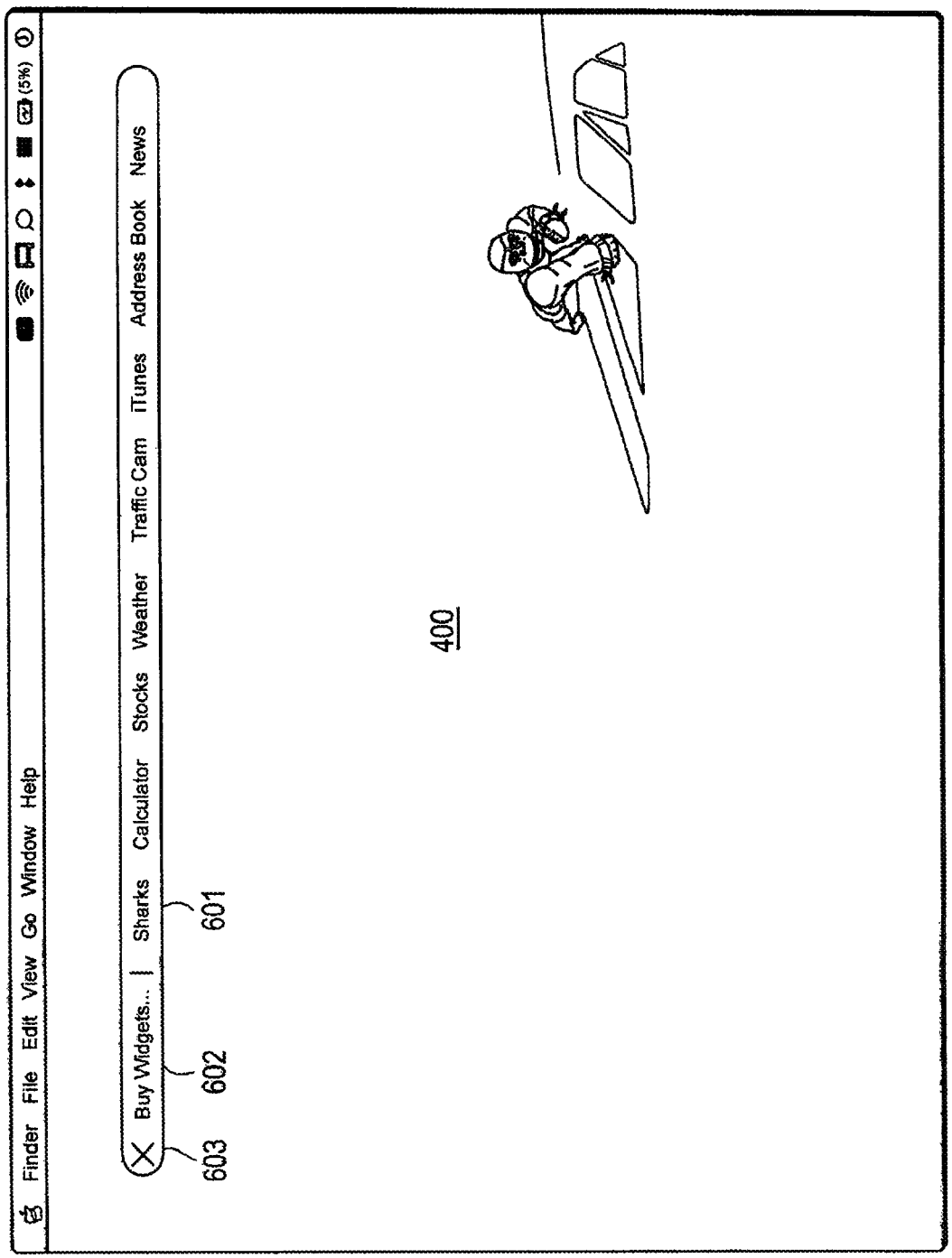
FIG. 6 is a screen shot depicting a configuration bar for a dashboard, according to one embodiment.
Figure 31:
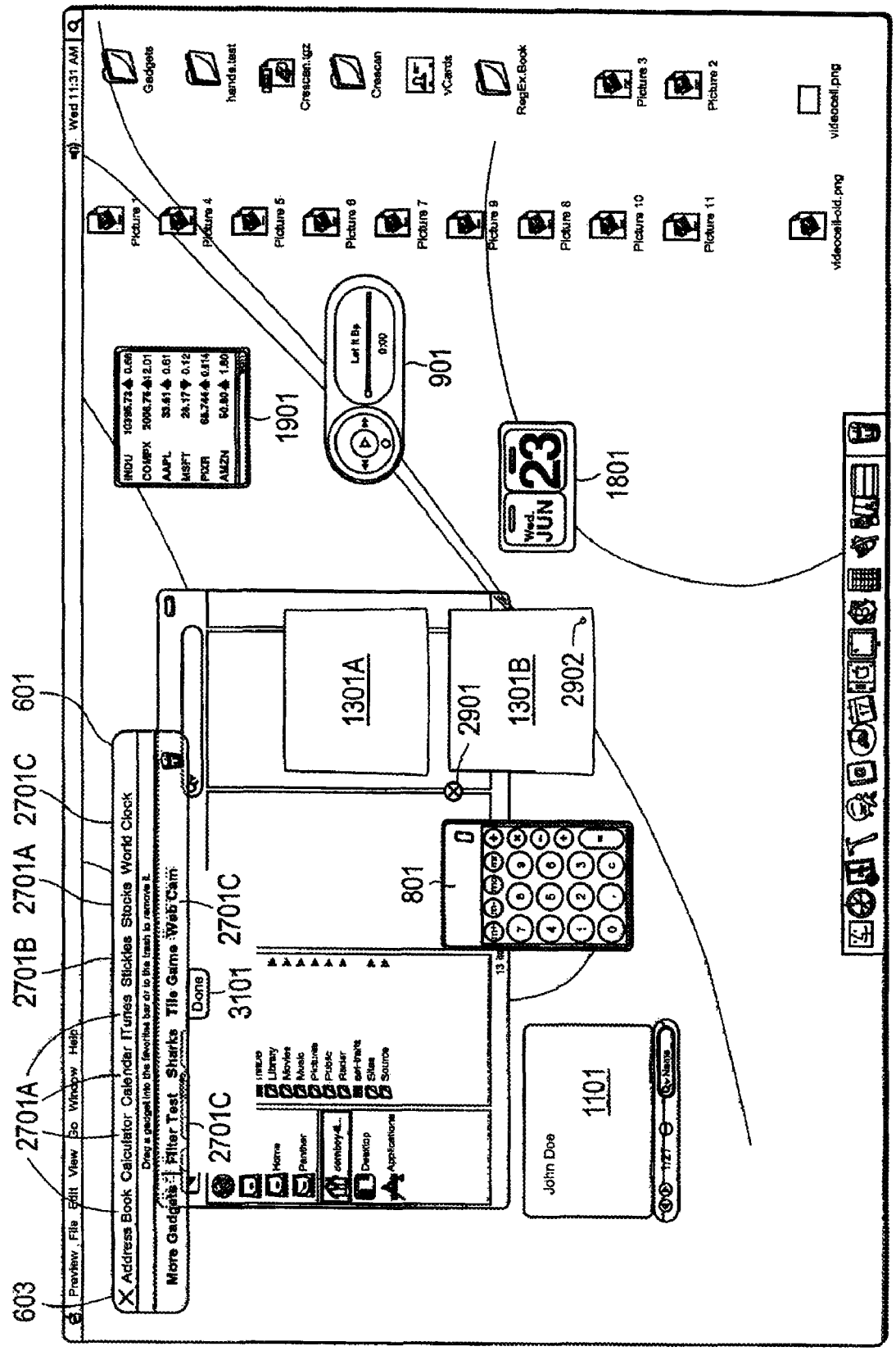
FIG. 31 is a screen shot depicting a dashboard wherein some labels in the configuration bar have changed in appearance, and wherein the dashboard includes rollover icons for closing and configuring a widget according to one embodiment.

The user clicks on icon 501 to activate configuration bar 601, as shown in FIG. 6. Configuration bar 601 provides access to various widgets that can be placed on the dashboard. In one embodiment, a text label is shown for each available widget. In another embodiment, an icon is shown for each available widget. If many widgets are available, they may be arranged hierarchically by type, or alphabetically, or by any other categorization methodology. For example, a number of categories may be displayed; clicking on one of the categories causes a pull-down menu to be displayed, listing a number of widgets in that category. In one embodiment, a buy command 602 is also available, allowing the user to select widgets from an online store or website. One skilled in the art will recognize that the particular configuration and appearance of configuration bar 601 in FIG. 6 is merely exemplary, and that many other arrangements are possible. The user can dismiss configuration bar 601 by clicking on dismissal icon 603. Referring now briefly to FIG. 31, a Done button 3101 can also be provided for dismissing configuration bar 601.

In one embodiment, the user can move configuration bar 601 to any location on the screen by dragging it, and the position of configuration bar 601 is persistent from one invocation of the dashboard to the next. Also, in one embodiment the state of configuration bar 601 (open or closed) is persistent from one invocation of the dashboard to the next.

Figure 7:
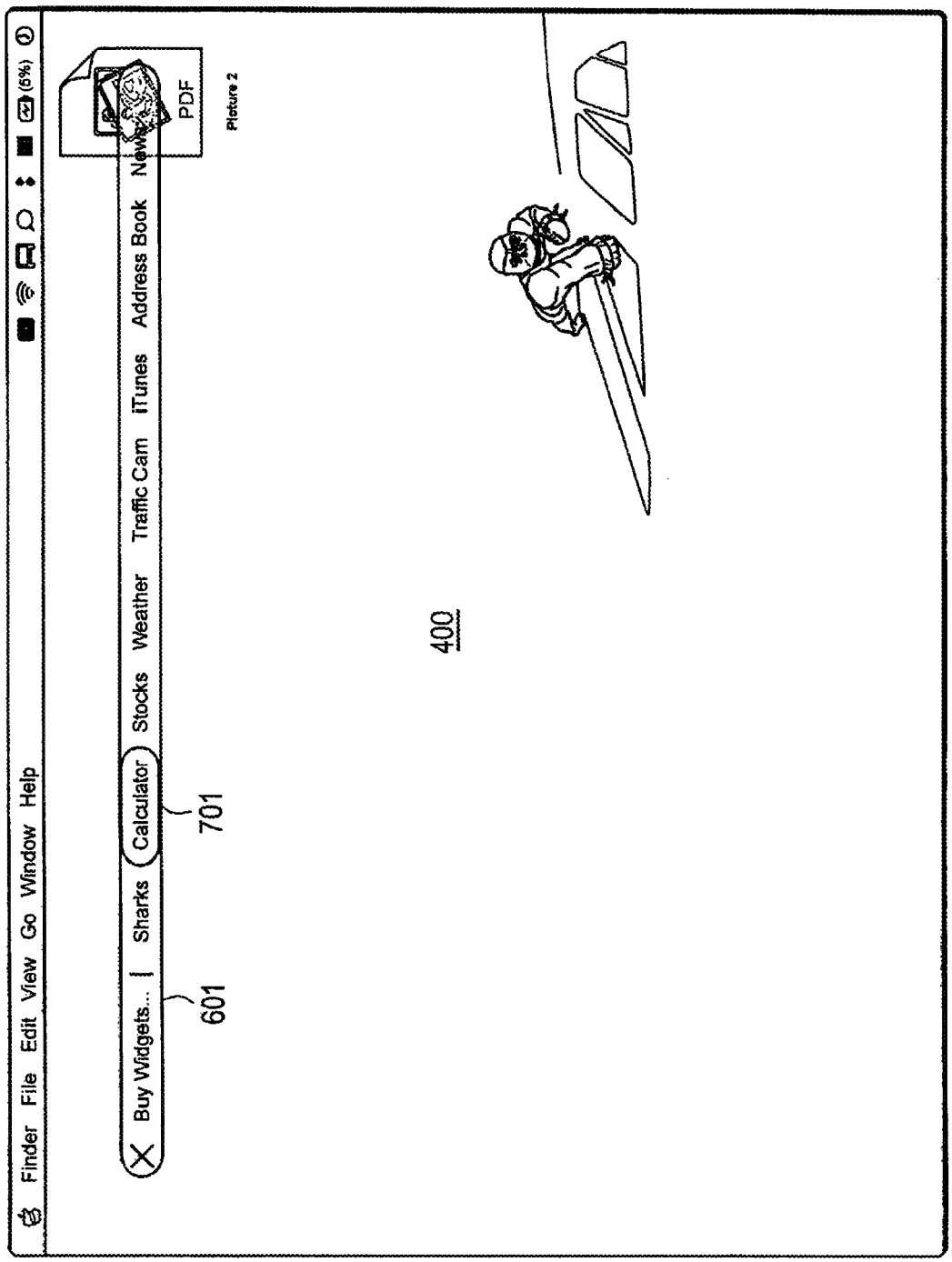
FIG. 7 is a screen shot depicting user selection of a widget from the configuration bar, according to one embodiment.
Figure 8:
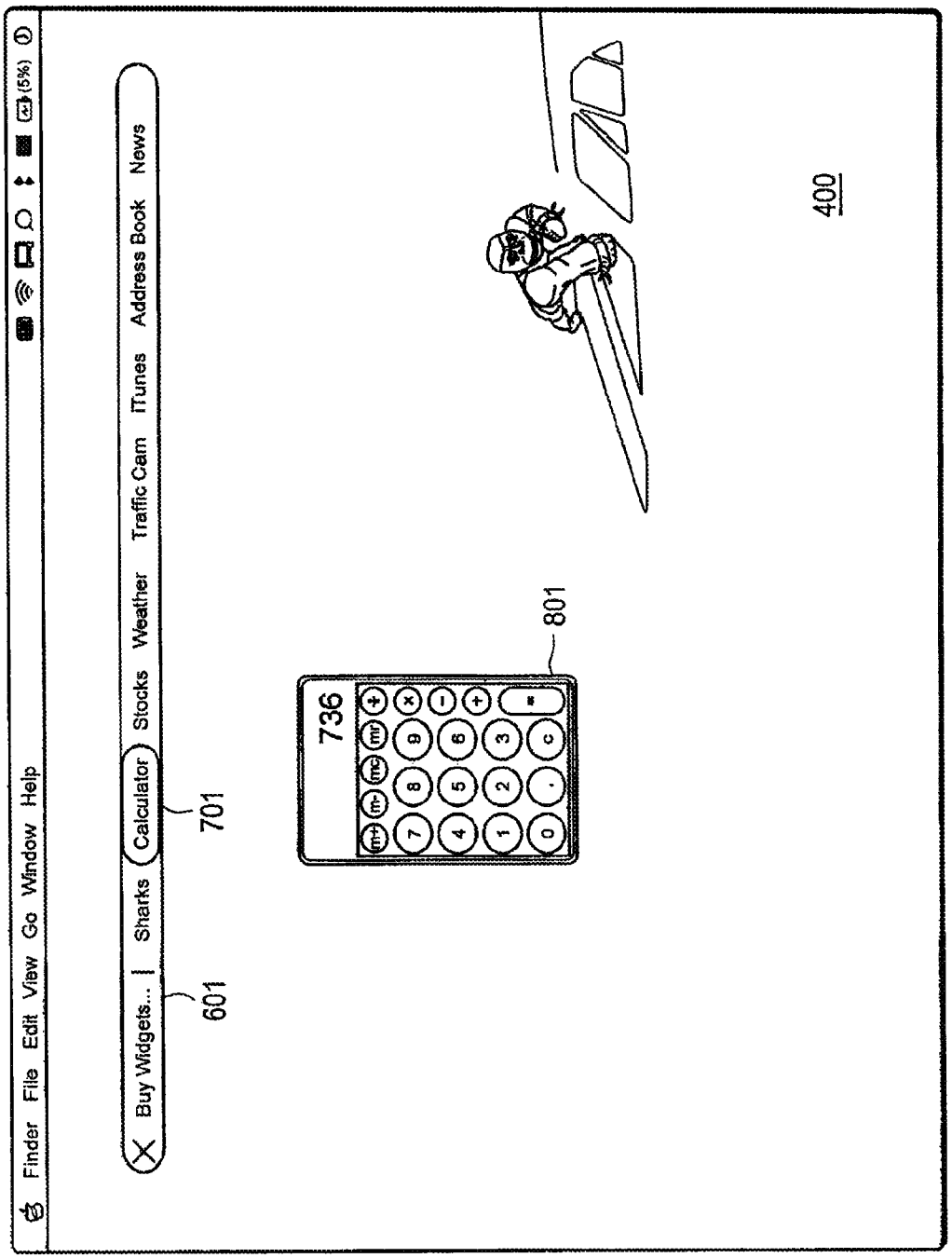
FIG. 8 is a screen shot depicting a dashboard including a calculator widget, according to one embodiment.

The user can drag widgets from configuration bar 601 onto the surface of the dashboard (in other words, anywhere on the screen), using standard drag-and-drop functionality for moving objects on a screen. FIG. 7 depicts user selection of a calculator widget from the configuration bar, according to one embodiment. Calculator label 701 is highlighted, to indicate that it has been selected by the user. FIG. 8 depicts the dashboard after the calculator widget 801 has been placed on the screen. In one embodiment, an animation, such as a ripple animation, is shown when the user "drops" widget 801 by releasing a mouse button (or equivalent input device) to place widget 801 at the desired location. The user can move widget 801 after it has been placed, to any other desired location, or can remove widget 801 from the screen, for example by dragging it off the screen, or dragging it back onto configuration bar 601, or by invoking a remove command. The position, state, and configuration of widget 801 are preserved when the dashboard is dismissed, so that these characteristics are restored the next time the dashboard is activated.

In one embodiment, multiple instances of some widgets can be activated, by dragging the widget from configuration bar 601 onto the dashboard surface two or more times. In another embodiment, only one instance of each widget can be activated. In another embodiment, some widgets can have multiple instances and others cannot.

Once calculator widget 801 has been placed on the dashboard, the user can interact with it by entering numbers via a mouse or other pointing device, or via a keyboard. Conventional operations for calculator applications are available.

Figure 9:
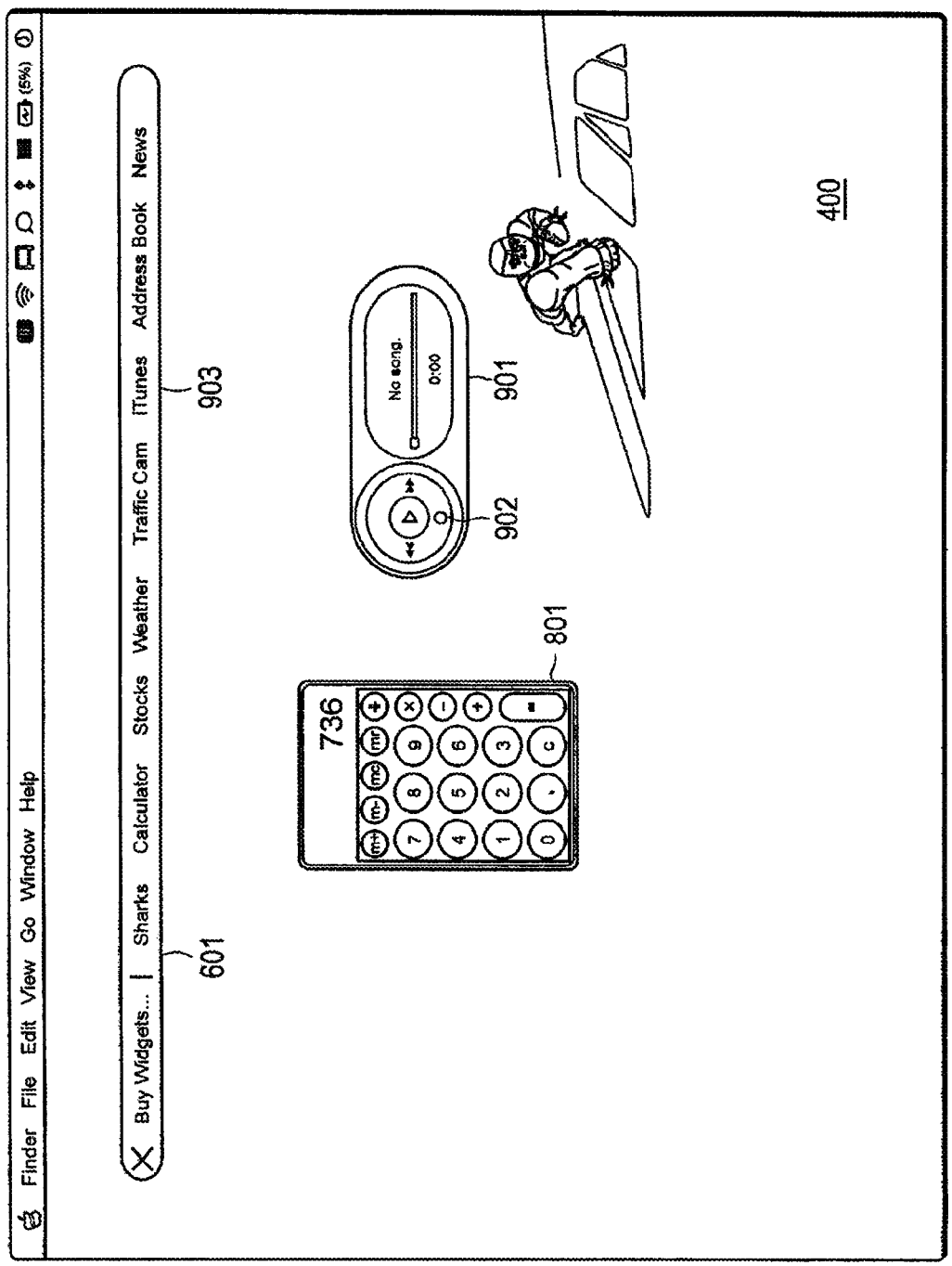
FIG. 9 is a screen shot depicting a dashboard including a calculator widget and a music player widget, according to one embodiment.

FIG. 9 depicts the screen after the user has dragged both a calculator widget 801 and a music player widget 901 onto the dashboard, according to one embodiment. Music player widget 901 is placed by clicking and dragging from "iTunes" label 903 in configuration bar 601. Music player widget 901, in this embodiment, provides a subset of the functionality associated with a fully functional music player application. In one embodiment, music player widget 901 includes button 902 for activating a fully functional music player application. Thus, the user can easily launch an application that provides enhanced functionality with respect to a widget.

Figure 10:
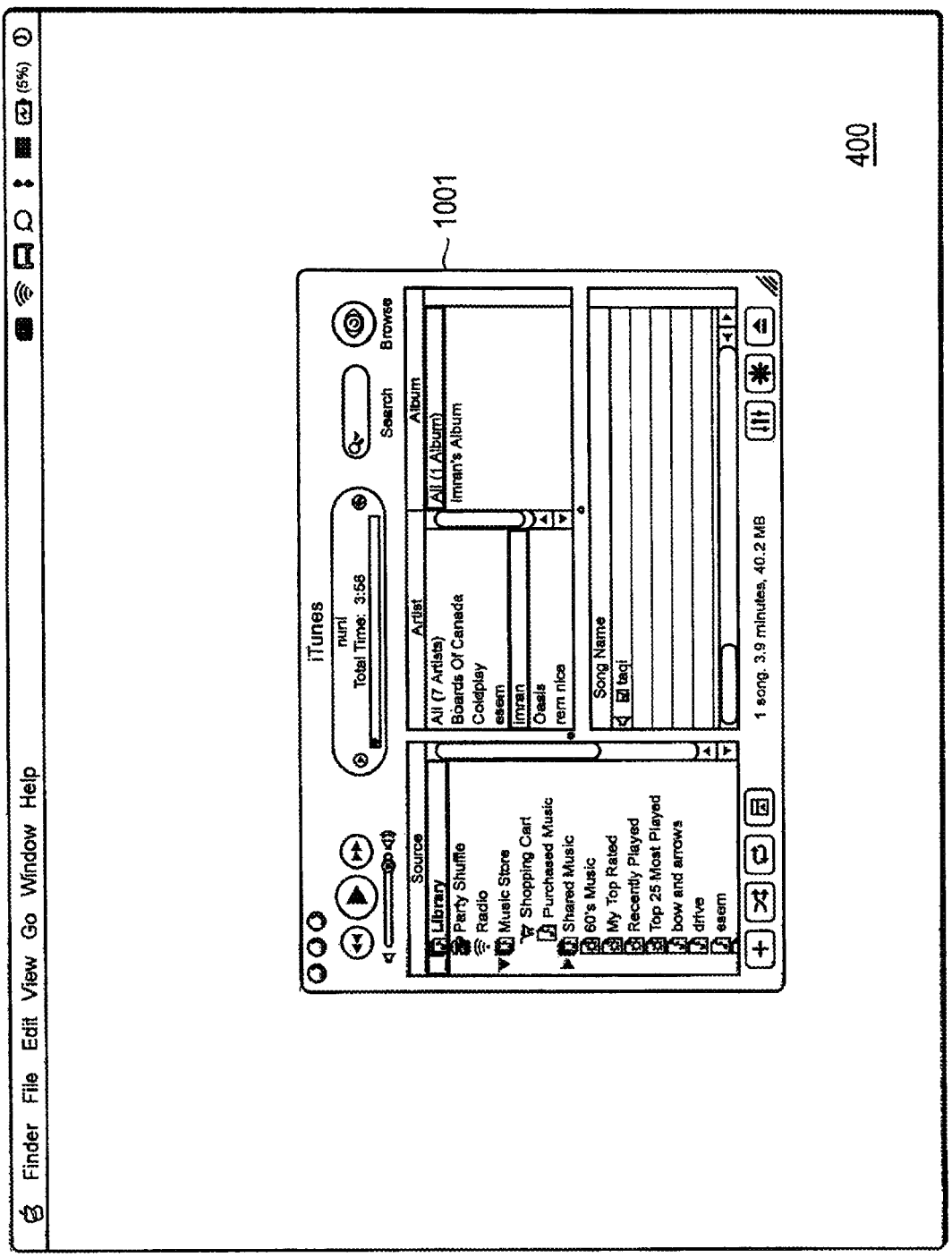
FIG. 10 is a screen shot depicting activation of a music player application as invoked by a music player widget, according to one embodiment.

In one embodiment, in response to the user clicking button 902 to activate the full music player application, the dashboard is dismissed, the normal desktop 400 is restored, and the full music player application is launched. All of these steps take place automatically, without requiring additional user intervention. FIG. 10 depicts the screen after the user has activated the full music player application 1001 by clicking on button 902 in music player widget 901, according to one embodiment. The dashboard has been dismissed, and the various elements of desktop 400, including menu bar 401, are once again active.

Figure 11:
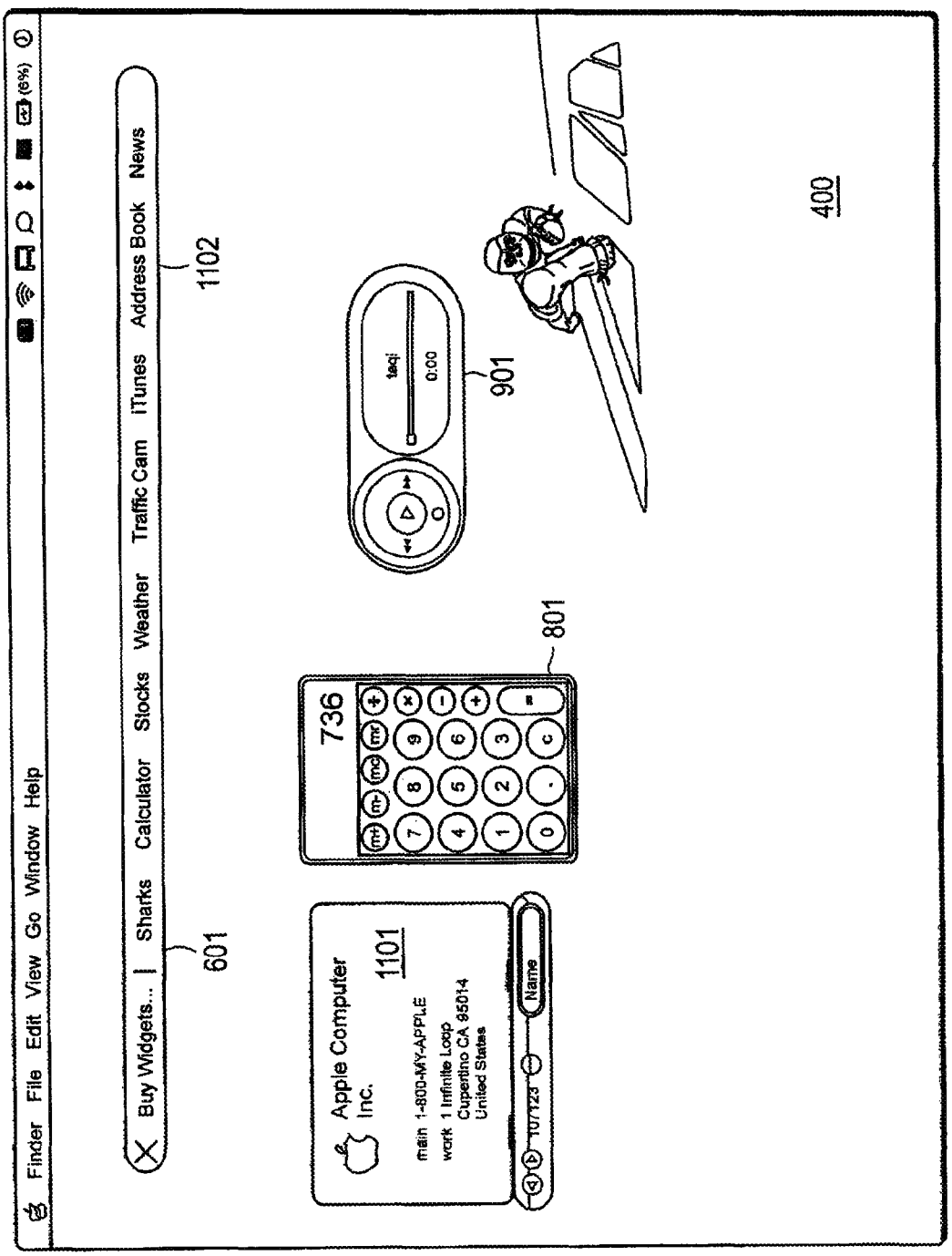
FIG. 11 is a screen shot depicting a dashboard including a calculator widget, a music player widget, and an address book widget, according to one embodiment.

In FIG. 11, the user has reactivated the dashboard (thus restoring widgets 801 and 901 in their previous states and locations), and has placed an address book widget 1101 by dragging it from label 1102. Again, in one embodiment, a ripple animation is displayed when widget 1101 is dropped onto its location on the dashboard.

Figure 12:
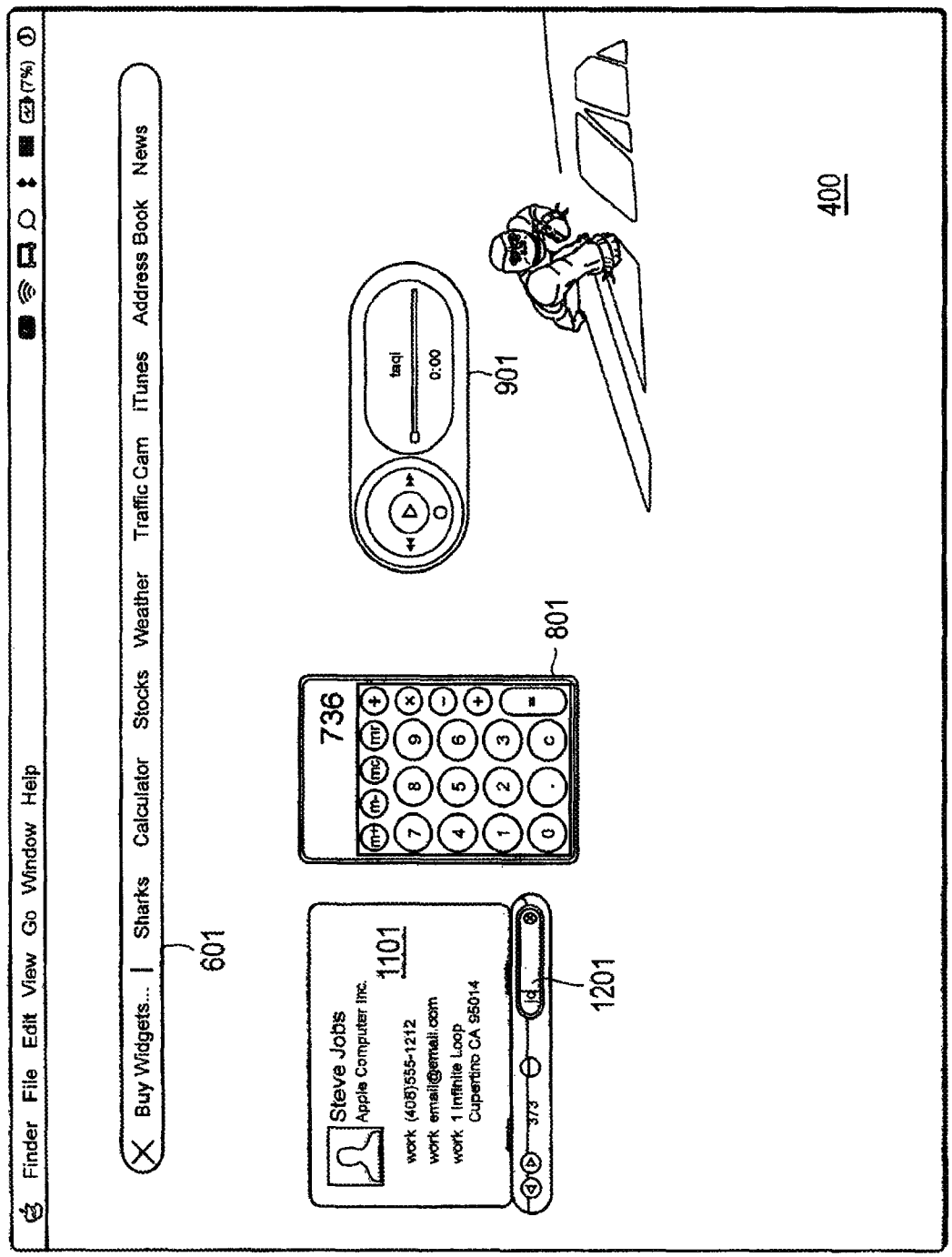
FIG. 12 is a screen shot depicting operation of an address book widget, according to one embodiment.

The user can interact with address book widget 1101 as he or she would normally interact with an address book application. For example, as shown in FIG. 12, the user can type in the first few letters of a person's name in field 1201; once sufficient information has been entered to identify an individual, that individual's address card is displayed.

Figure 13:
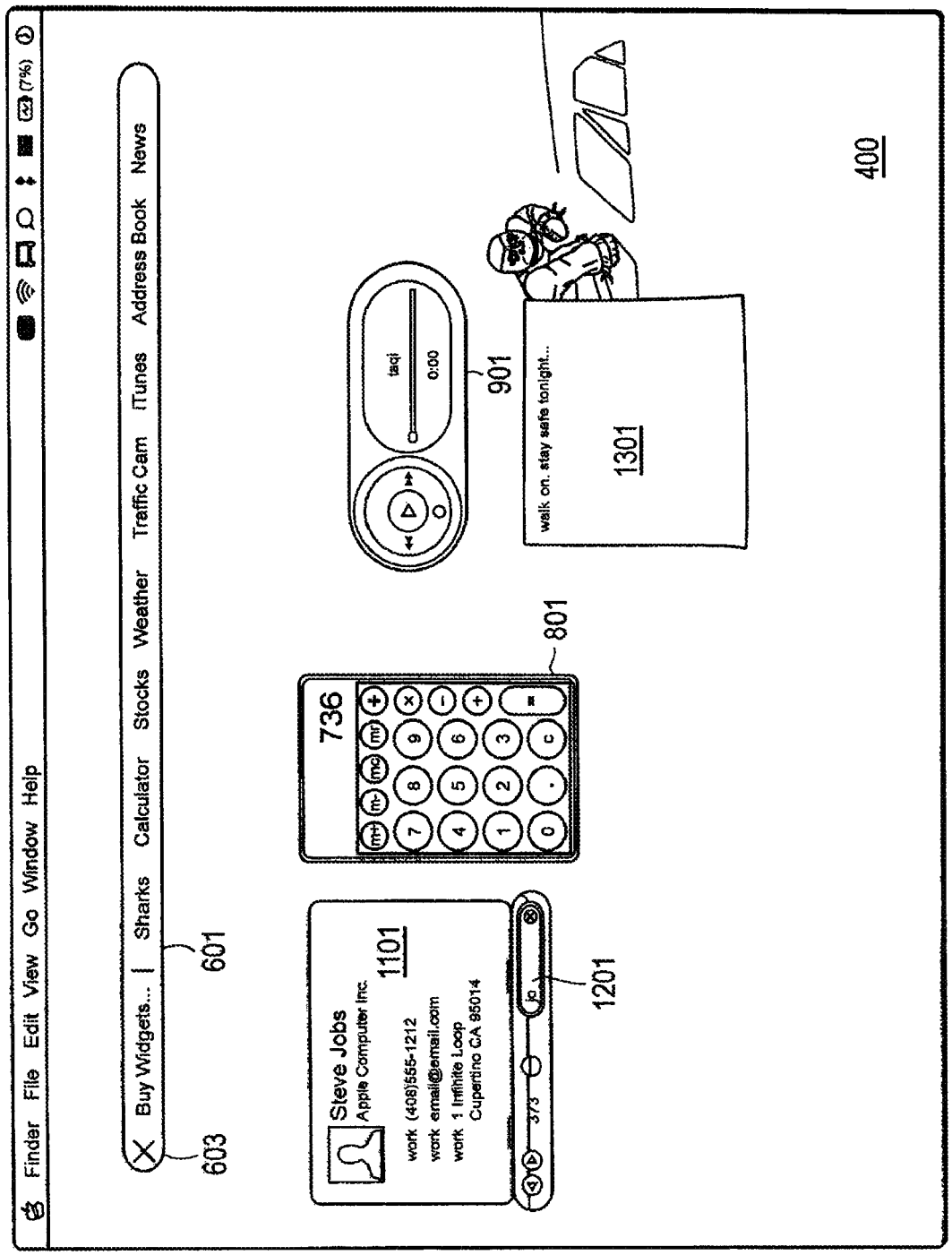
FIG. 13 is a screen shot depicting a dashboard including a number of widgets including a notes widget, according to one embodiment.

FIG. 13 depicts the dashboard after a number of widgets have been placed, including notes widget 1301, calculator widget 801, music player widget 901, and address book widget 1101. In one embodiment, double-clicking in notes widget 1301 causes it to enter an edit mode wherein text can be entered or edited. When not in edit mode, widget 1301 can be moved around the dashboard. In other embodiments, other types of user actions (for example pressing modifier keys) can be used to distinguish between text editing operations and widget-dragging operations.

Figure 14:
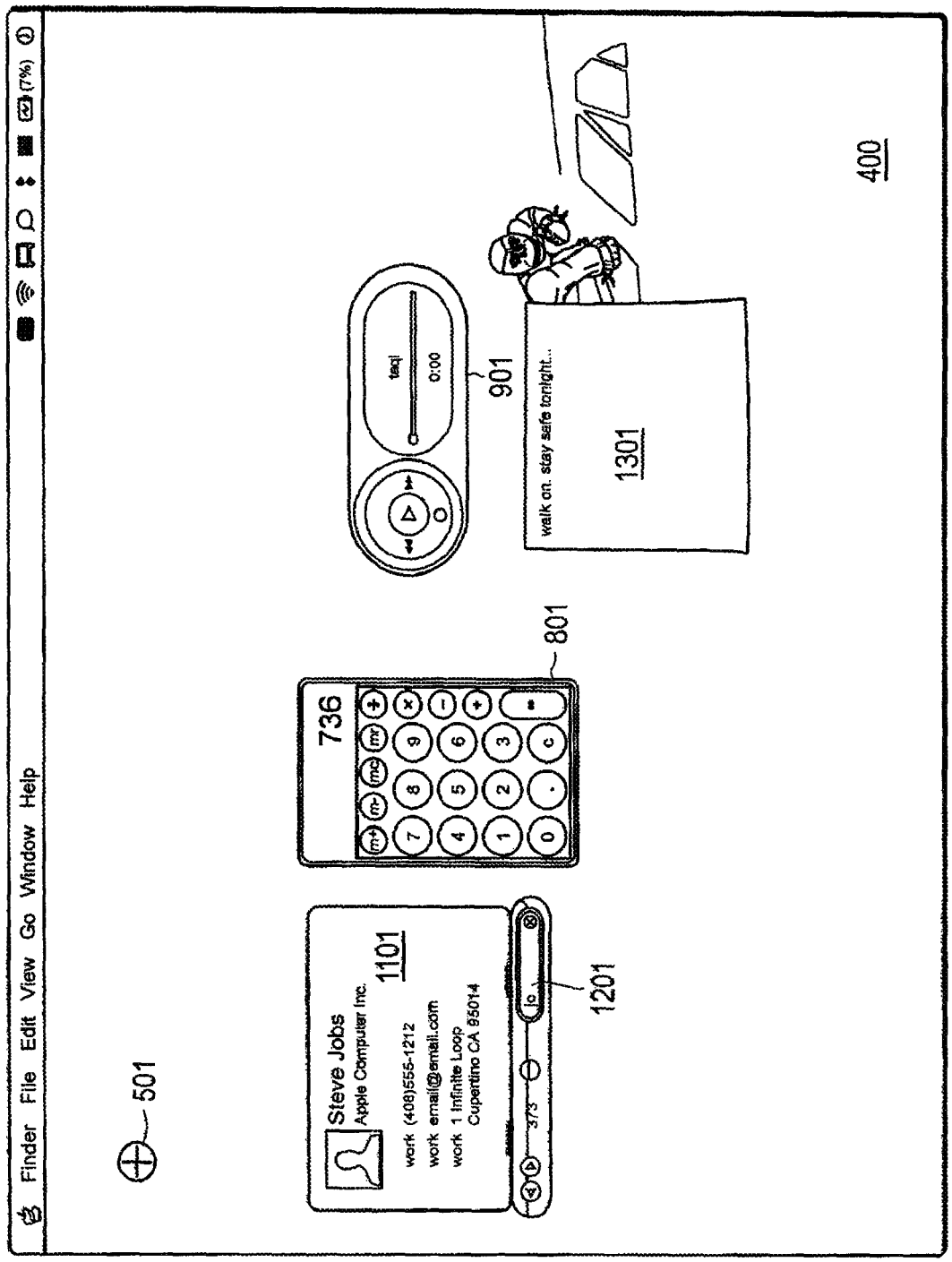
FIG. 14 is a screen shot depicting a dashboard where the configuration bar has been closed, according to one embodiment.

The user can dismiss configuration bar 601 by clicking on dismissal icon 603. FIG. 14 depicts a dashboard after configuration bar 601 has been closed, according to one embodiment. Configuration icon 501 is displayed, which allows the user to reactivate configuration bar 601 as desired.

Figure 15:
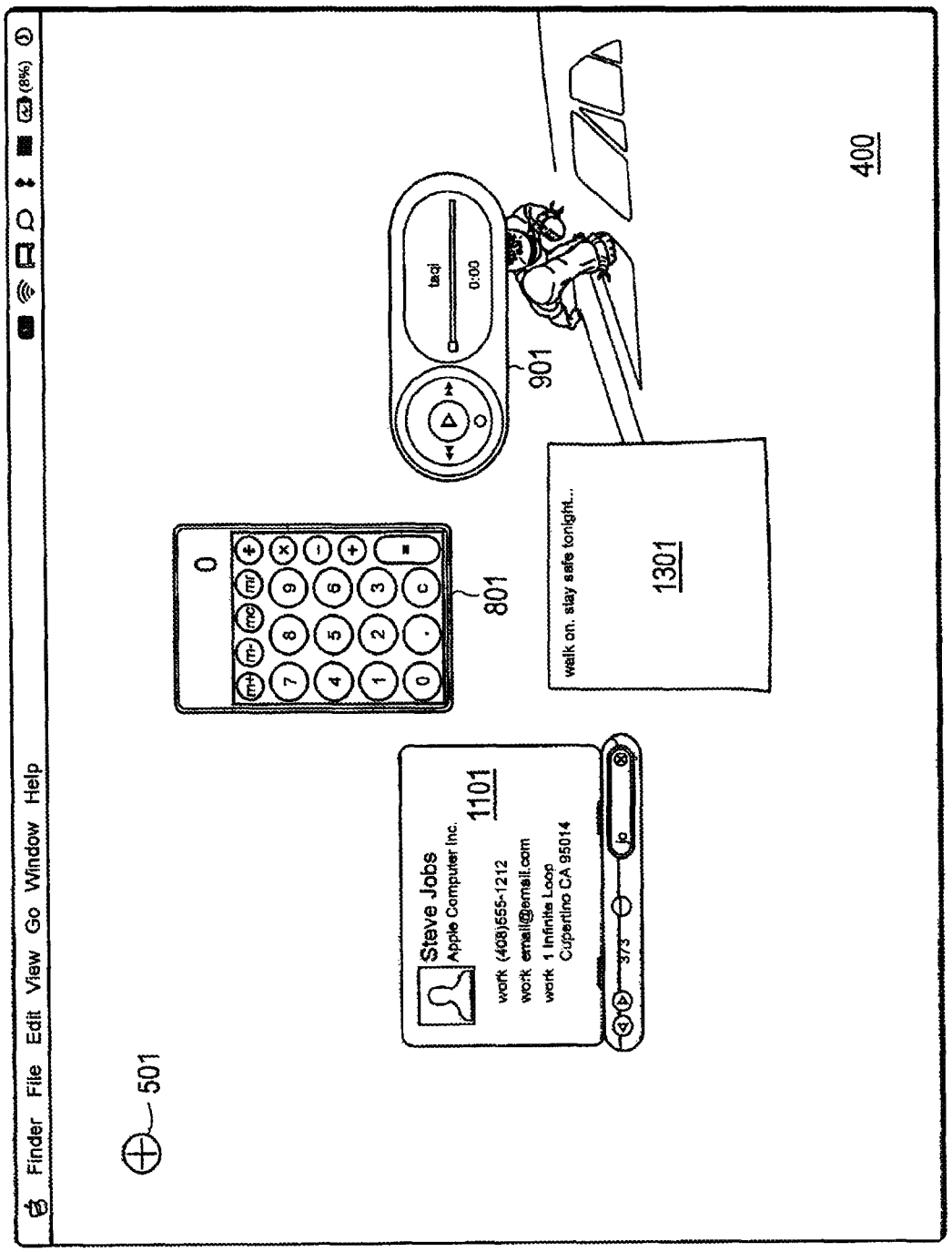
FIG. 15 is a screen shot depicting a dashboard wherein widgets have been moved to new positions.

The user can move widgets around the screen as desired. Widget locations are preserved when the dashboard is dismissed, so that the widgets reappear at the same location where they were left, when the dashboard is activated. FIG. 15 depicts the dashboard after widgets 801, 901, 1101, 1301 have been moved to new positions.

Figure 16A:
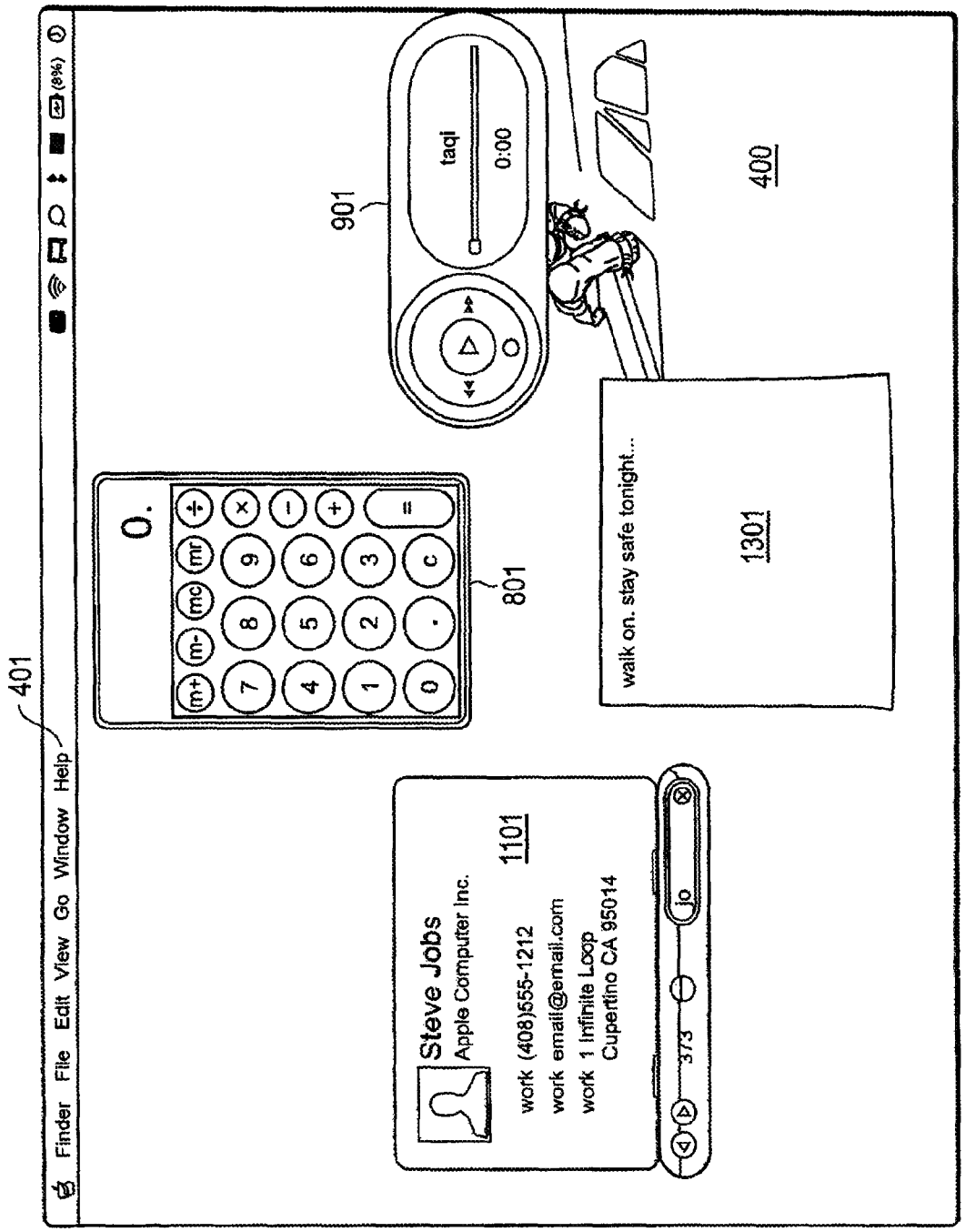
FIGS. 16A through 16C are screen shots depicting a transition animation for dismissing the dashboard, according to one embodiment.
Figure 16B:
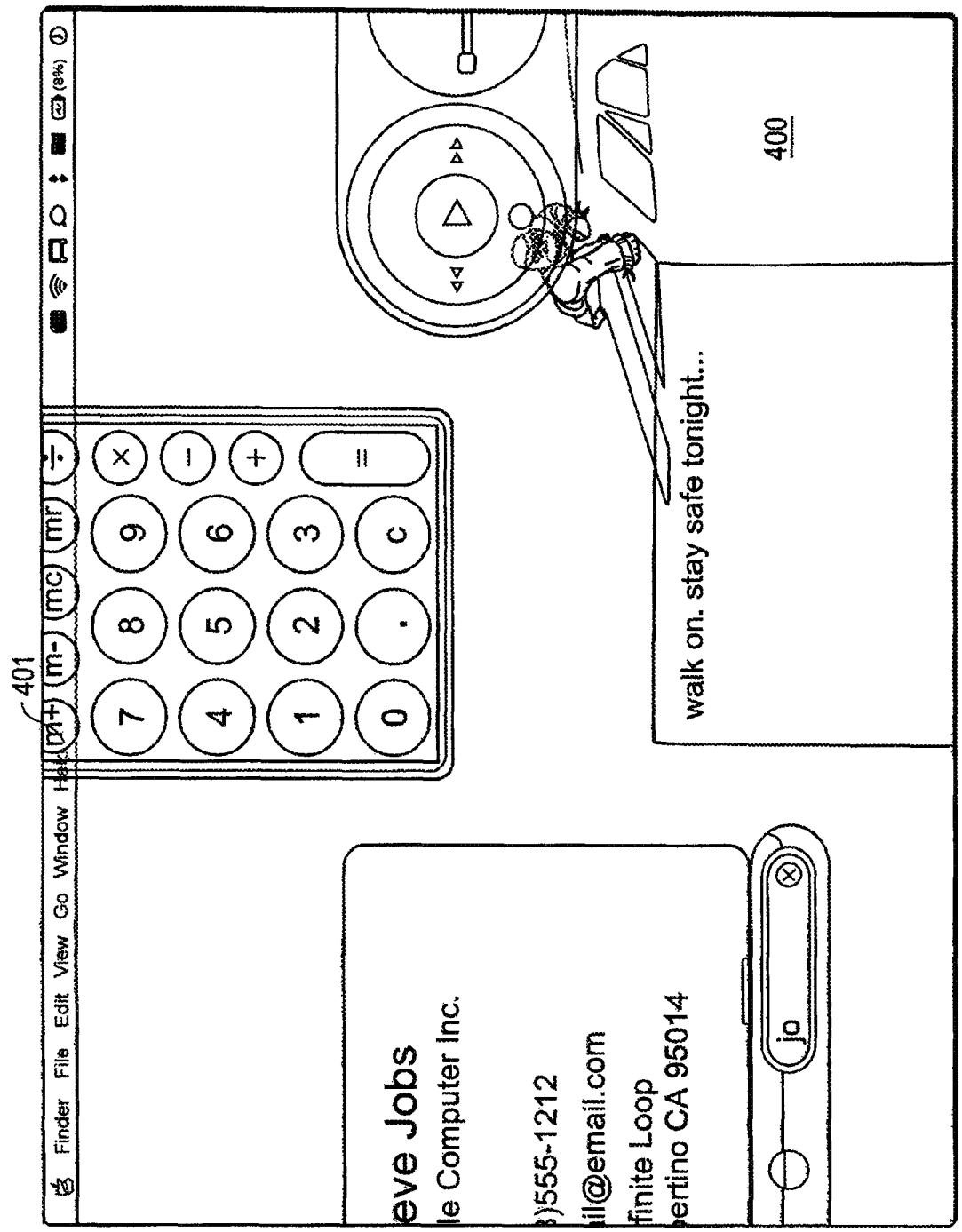
Figure 16C:
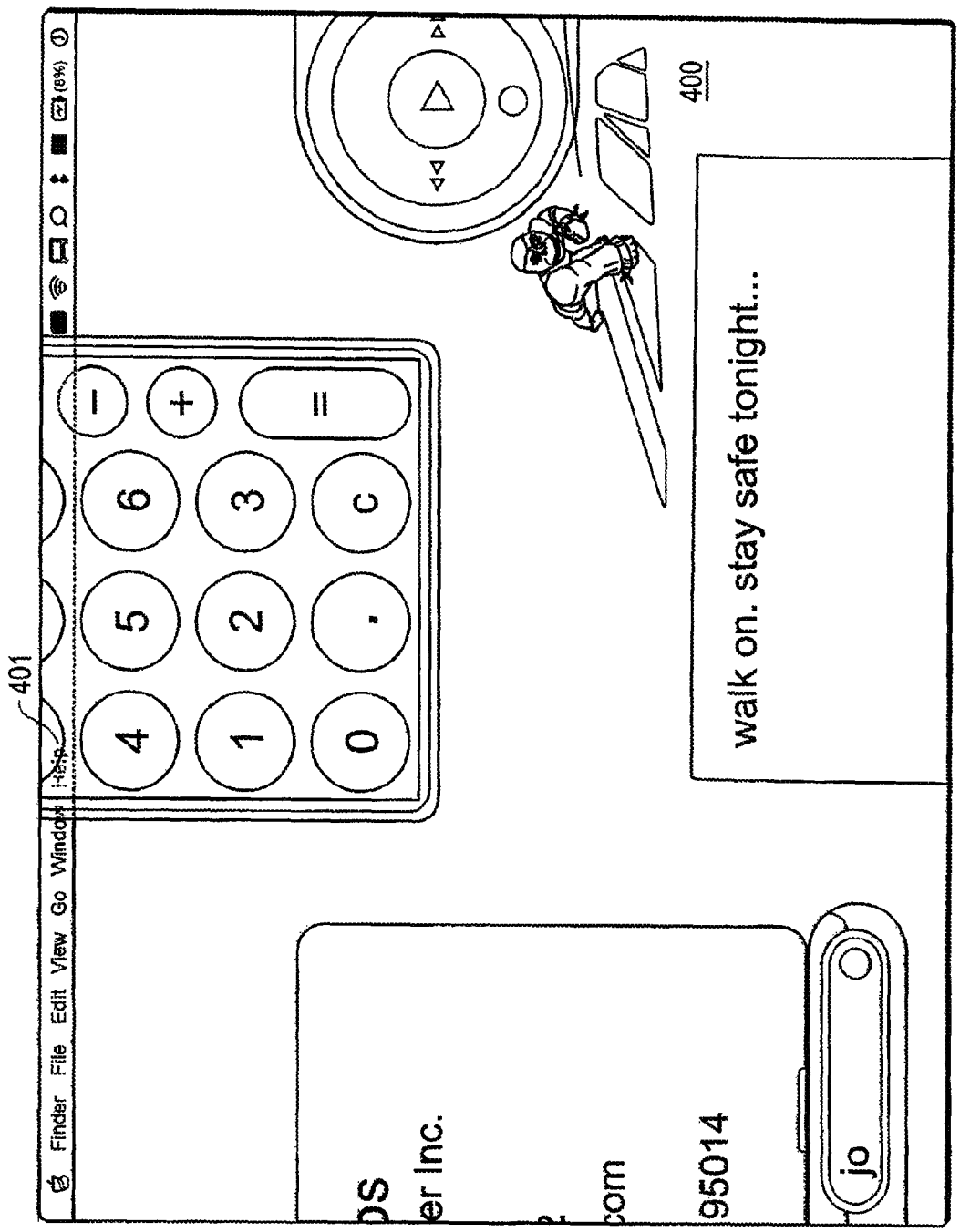
Figure 17A:
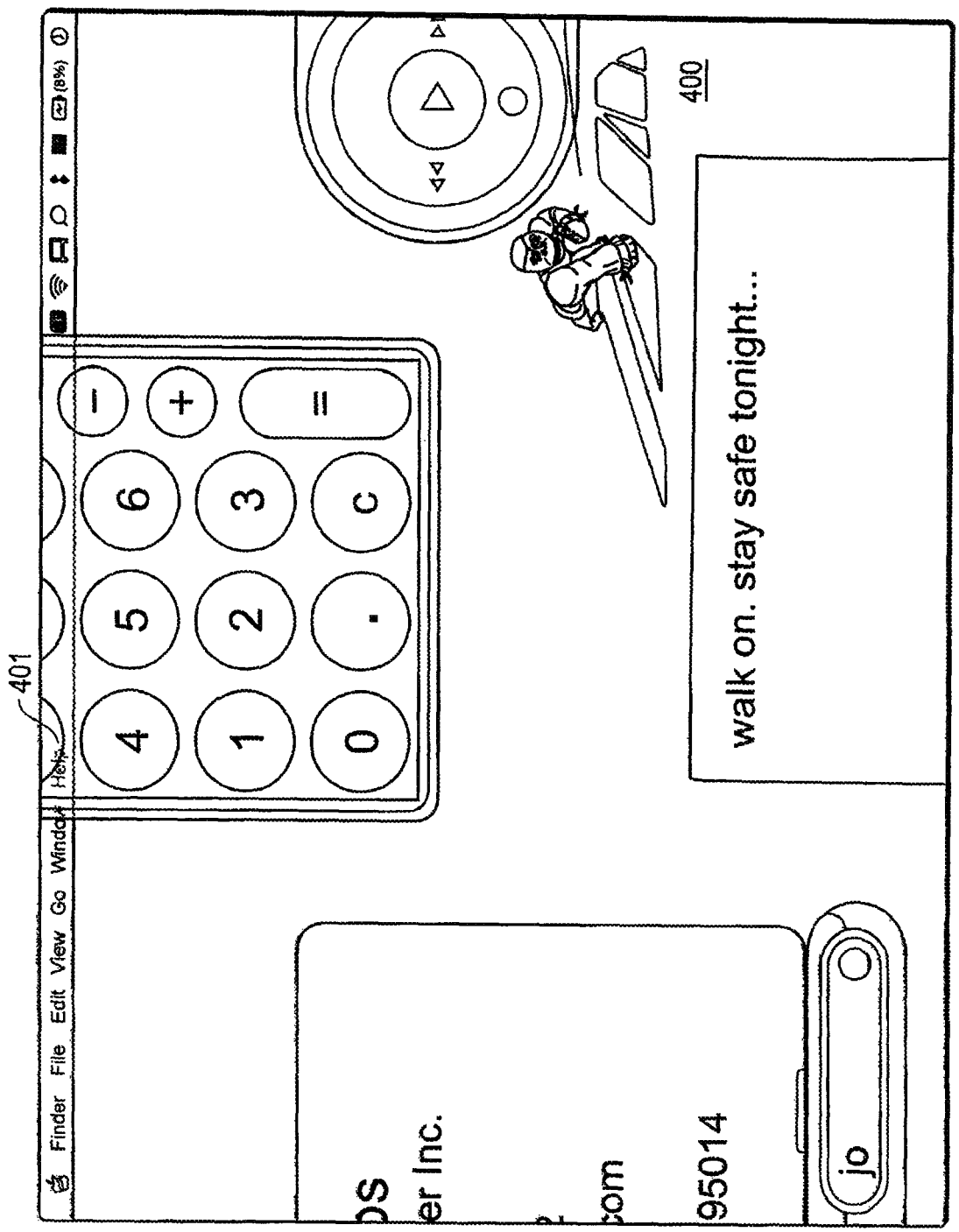
FIGS. 17A through 17D are screen shots depicting a transition animation for activating the dashboard, according to one embodiment.
Figure 17B:
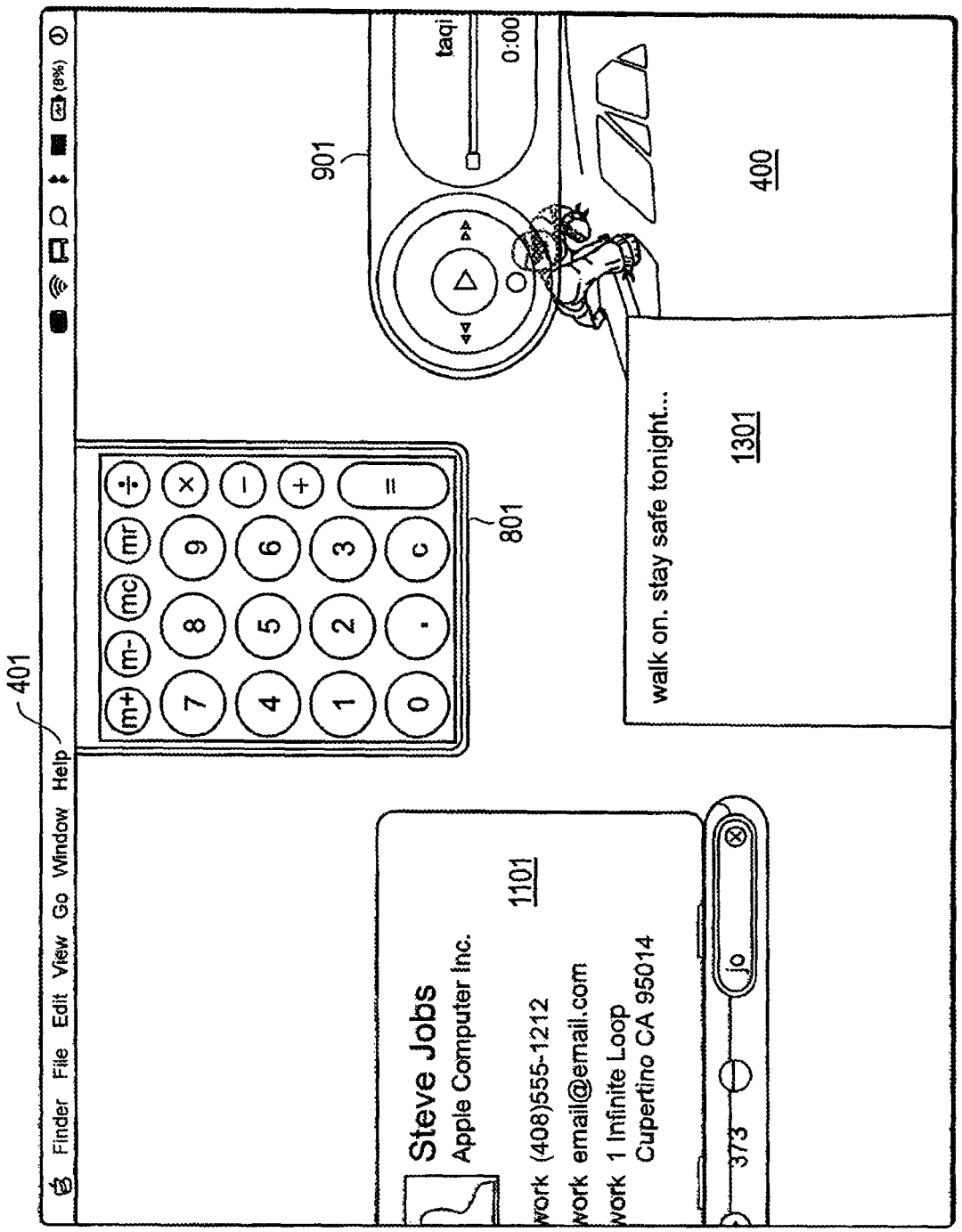
Figure 17C:
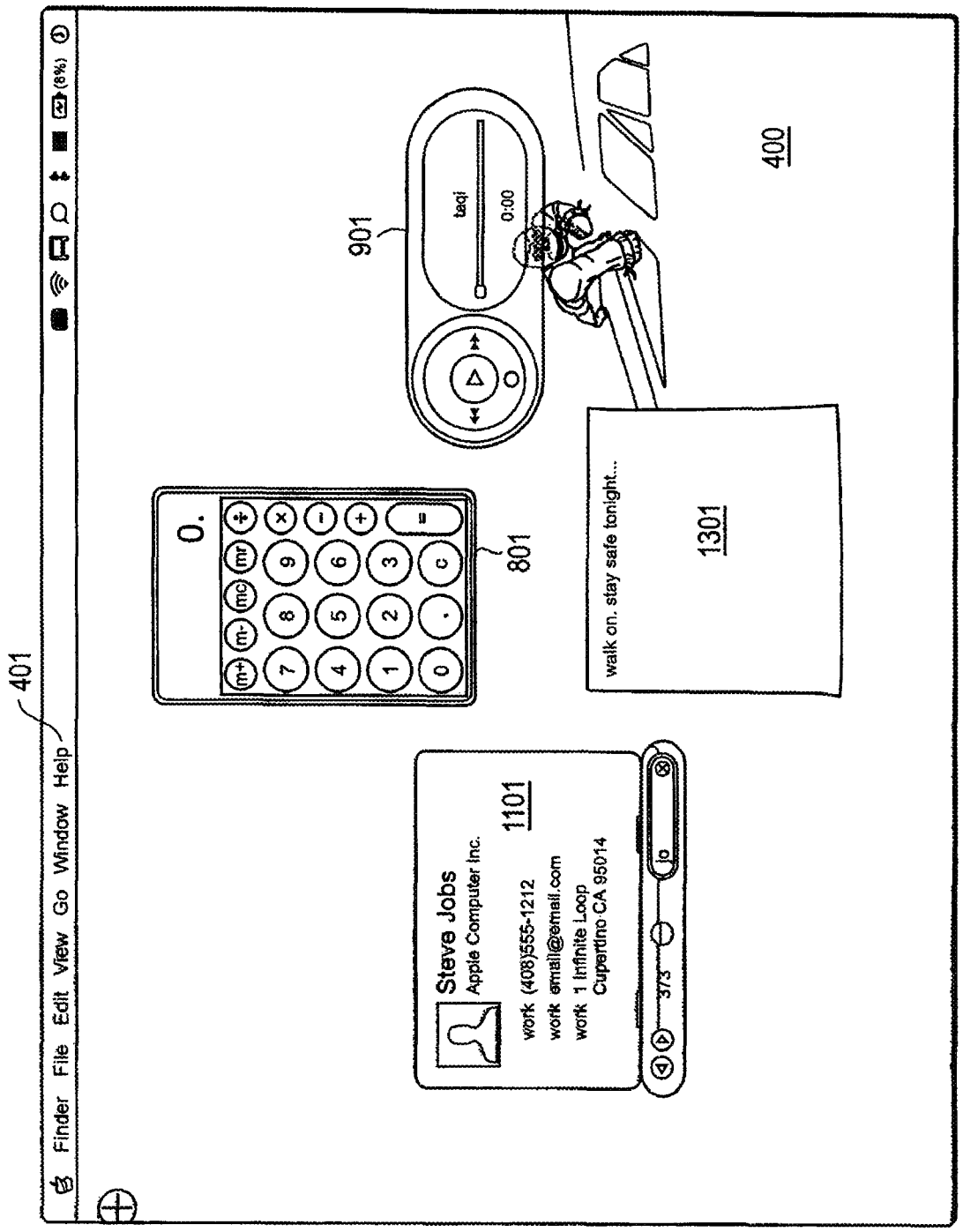
Figure 17D:
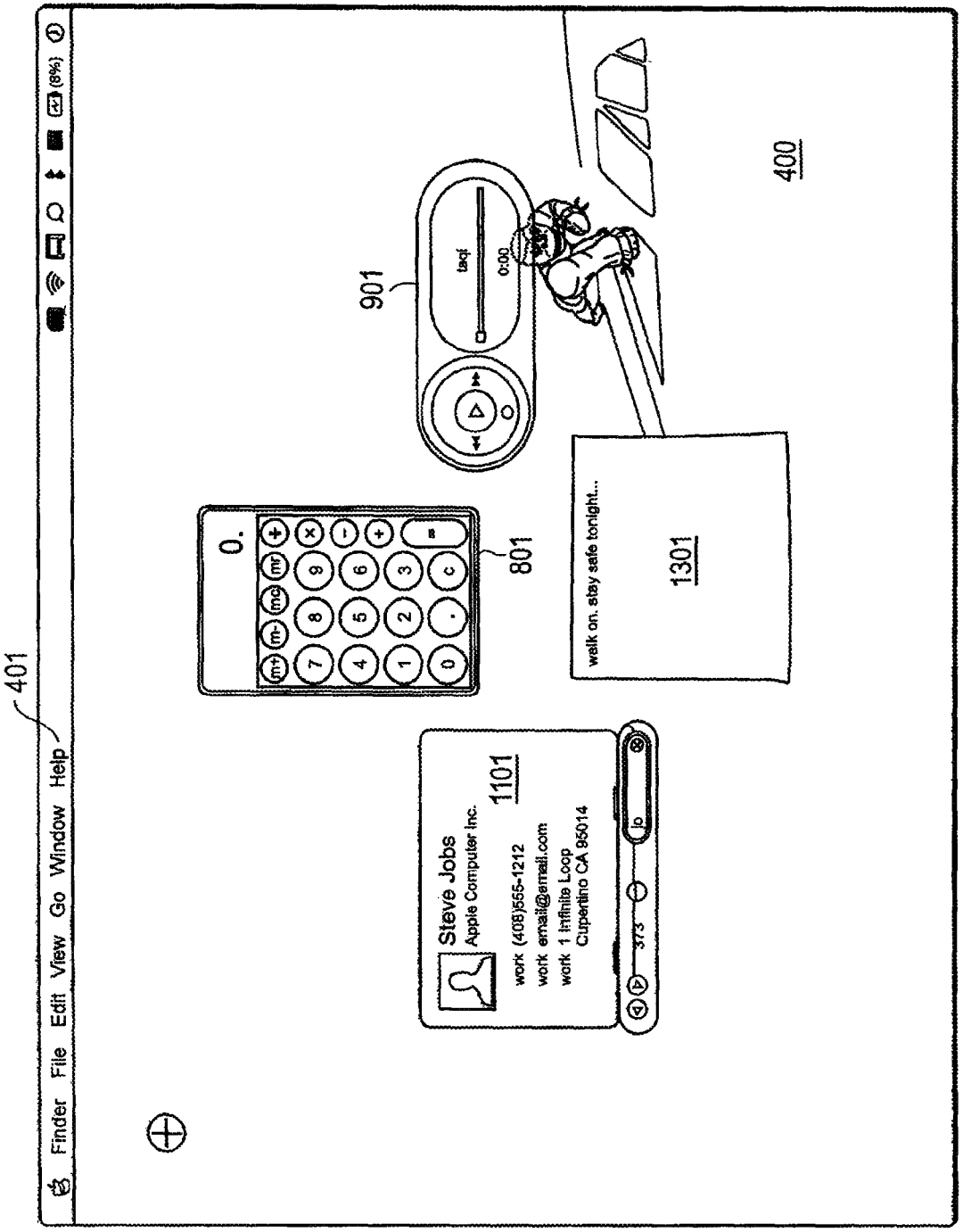

As discussed above, in one embodiment a transition animation is played when the dashboard is dismissed. FIGS. 16A through 16C are screen shots depicting a "fly-out" transition animation, wherein widgets 801, 901, 1101, 1301 appear to fly off the edges of the screen when the dashboard is dismissed. While they are flying off the edges of the screen, widgets 801, 901, 1101, 1301 grow in size and fade, so as to reinforce the appearance of movement and transition. At the same time, desktop 400 and its features (such as menu bar 401) are restored to their normal, non-faded appearance.

As discussed above, in one embodiment a transition animation is played when the dashboard is activated. FIGS. 17A through 17D are screen shots depicting a "fly-in" transition animation, wherein widgets 801, 901, 1101, 1301 appear to fly in from the edges of the screen when the dashboard is activated. Widgets 801, 901, 1101, 1301 are faded and enlarged when they first appear at the screen edges; they reduce in size and become more solid in appearance while they are flying in, so as to reinforce the appearance of movement and transition. At the same time, desktop 400 and its features (such as menu bar 401) gradually fade into the background.

In one embodiment, the system of the present invention includes the capability to alert the user when a widget needs attention or has new information to display to the user, even if the dashboard is not currently active. For example, an icon on a "Dock", or taskbar, or other user interface element commonly associated with a desktop user interface, can blink or bounce or otherwise indicate an alert condition. A distinctive sound can also be played. Alternatively, a dialog box can be presented, or a text alert can be displayed. Whatever form it may take, the alert can be of a generalized type or it may indicate the specific widget that issued the alert, and may even have additional information specifying the nature of the alert. The user can then activate the dashboard (either by a dashboard activation command as described above, or by clicking on an icon or button associated with the alert) to see the widget that issued the alert. Alternatively, the dashboard can automatically be activated in such a situation, or a dialog box can be presented to allow the user to indicate whether or not the dashboard should be activated.

For example, a package tracking widget may issue an alert when a package has been delivered. The alert may be generalized, or it may indicate that the package tracking widget is the source of the alert, or it may even provide the delivery information. The user can dismiss the alert, or activate the dashboard to see the widget and interact with it to obtain more information. As another example, a traffic webcam widget can issue an alert when an accident has occurred on the route covered by the webcam.

Figure 26:
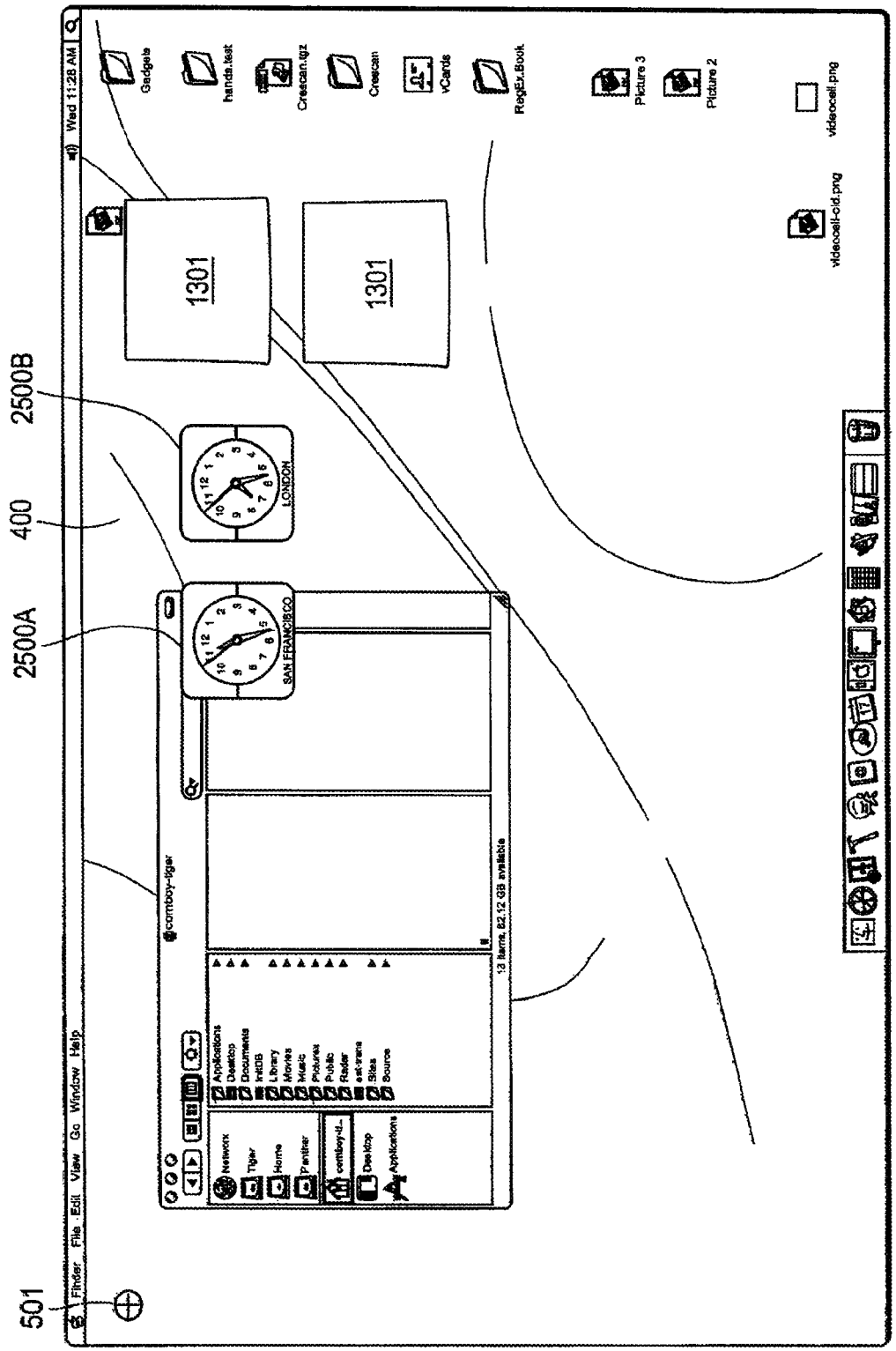
FIG. 26 is a screen shot depicting a dashboard where the configuration bar has been closed, according to one embodiment.

In one embodiment, configuration bar 601 has several possible states. Referring now to FIG. 26, there is shown an example of the dashboard where the configuration bar is closed, so that configuration icon 501 is displayed. Two stickies widgets 1301 are currently being displayed, along with two clock widgets 2500A, 2500B.

Figure 27:
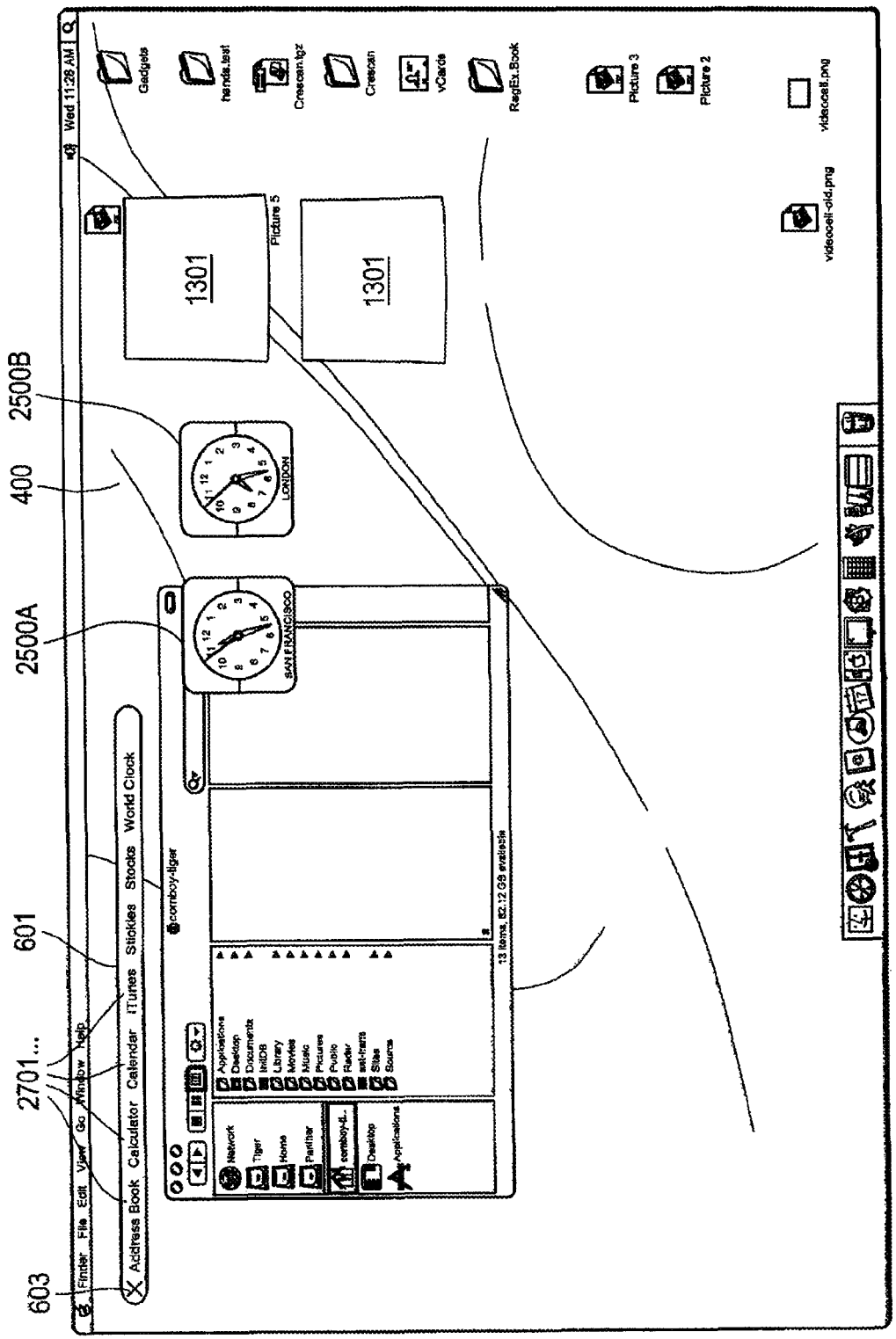
FIG. 27 is a screen shot depicting a dashboard where the configuration bar has been opened to show favorite widgets, according to one embodiment.
Figure 28:
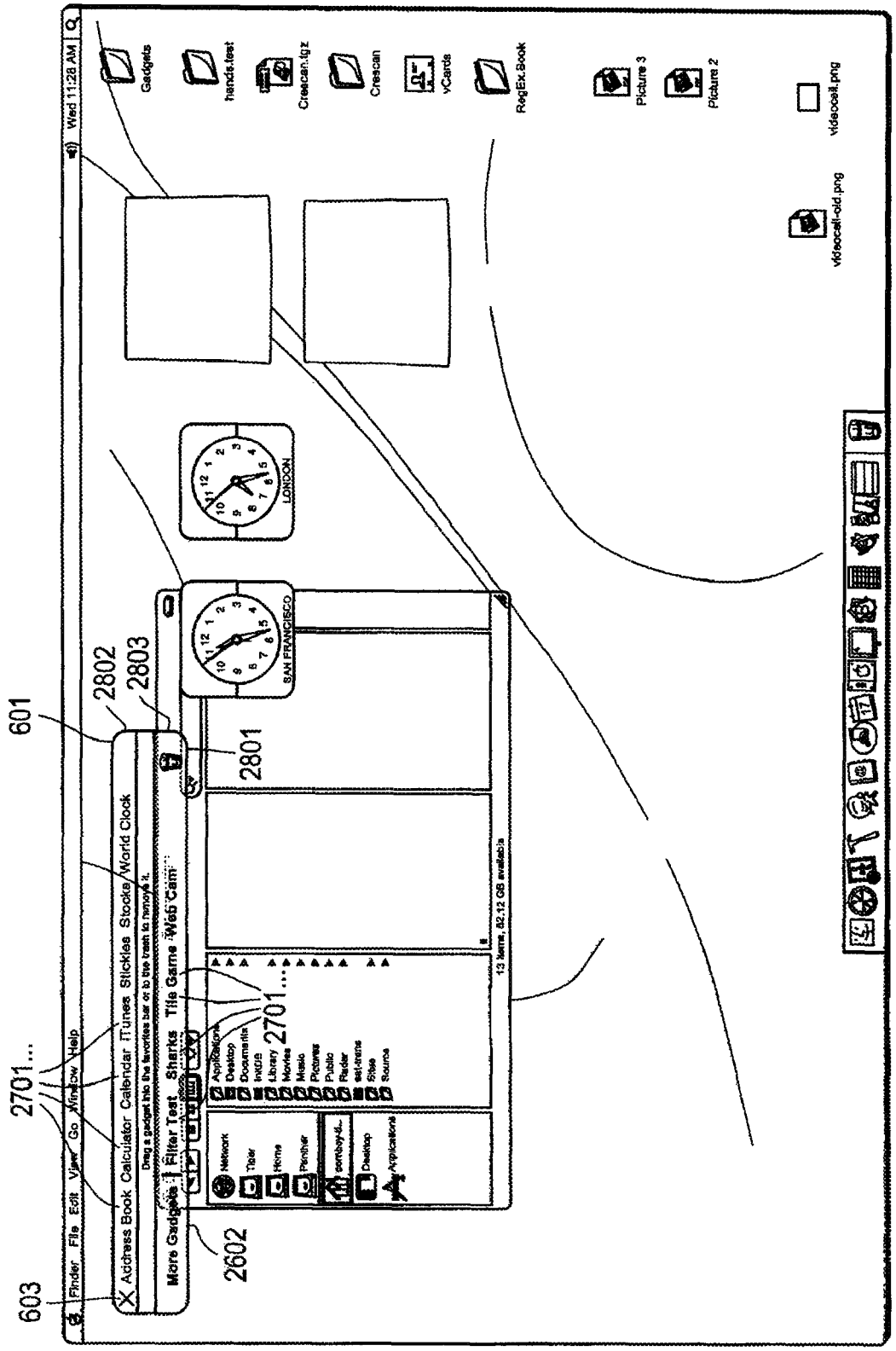
FIG. 28 is a screen shot depicting a dashboard where the configuration bar has been opened to allow access to additional widgets, according to one embodiment.

Clicking on configuration icon 501 causes configuration bar 601 to be displayed in a first state, as shown in FIG. 27. The first state includes labels 2701 for various widgets that are designated as "favorites"; in one embodiment, these are a subset of all of the widgets currently installed on the user's machine. Thus, in this state, the user is presented with only those widgets that are commonly needed. As will be seen, the user is able to configure this view so that it includes any desired subset of installed widgets. In one embodiment, configuration bar 601 in this state includes a "More" label or icon. The user clicks on this label or icon to cause configuration bar 601 to expand to its second state, as shown in FIG. 28. Dismissal icon 603 causes configuration bar 601 to be dismissed, reverting to configuration icon 501 as shown in FIG. 26. In one embodiment, the on-screen position of icon 603 matches that of icon 501, so that the user can easily open and close configuration bar 601 without moving the cursor around.

The user can drag labels 2701 onto the dashboard surface to place widgets onto the dashboard. As described above, in one embodiment a distinctive animation, such as a ripple effect, is shown to reinforce the notion that the widget is being placed at the specified location.

Referring now to FIG. 28, there is shown an example of configuration bar 601 in its second, expanded state, providing access to additional widgets as well as the favorite widgets that were presented in the first state. In this state, configuration bar 601 has two sections 2802, 2803. Section 2802 includes labels 2701 for favorite widgets; this includes the same subset of widgets that is included in the first state of configuration bar 601, as shown in FIG. 27. Section 2803 includes labels 2701 for other widgets that are not included in the set of favorite widgets. Dragging a label 2701 from section 2802 to 2803 causes the corresponding widget to be removed from the favorites subset. Dragging a label 2701 from section 2803 to 2802 causes the corresponding widget to be added to the favorites subset. Dragging a label 2701 from either section 2802 or 2803 onto the dashboard surface causes the corresponding widget to be placed at the specified location. Dragging a label 2701 from either section 2802 or 2803 onto trash icon 2801 causes the label 2701 to be removed from configuration bar 601; in one embodiment, this also causes the corresponding widget to be removed from the dashboard (if it is currently open). In one embodiment, dragging a label 2701 onto trash icon 2801 also causes the corresponding widget to be deleted from the user's machine, or made unavailable. In one embodiment, the user is presented with a dialog box to confirm that he or she wishes to delete the widget. In one embodiment, the user can also drag widgets onto trash icon 2801 to cause the widgets to be closed, dismissed, and/or uninstalled. More gadgets label 2602 provides access to a website, online store, or other resource for obtaining and installing additional widgets; in one embodiment it offers functionality that is similar to buy command 602 as described above in connection with FIG. 6

In one embodiment the state of configuration bar 601 is persistent from one invocation of the dashboard to the next.

Figure 30:
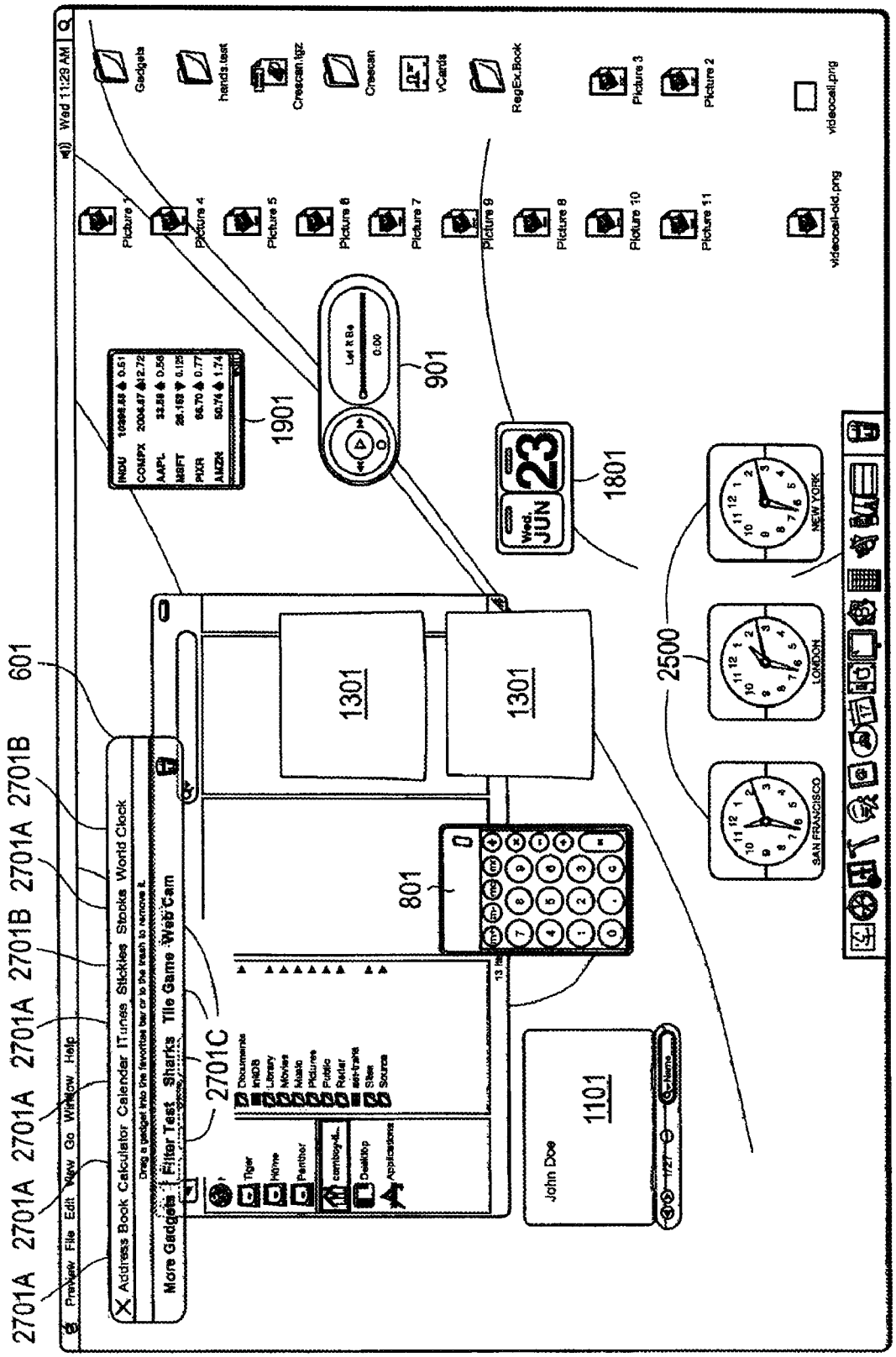
FIG. 30 is a screen shot depicting a dashboard wherein some labels in the configuration bar have changed in appearance, according to one embodiment.

Referring now to FIG. 30, there is shown an example of a dashboard wherein some labels 2701A in configuration bar 601 have changed in appearance, while other labels 2701B, 2701C are unchanged, according to one embodiment. In one embodiment, when a widget is open, its corresponding label 2701 on configuration bar 601 changes in appearance; for example, it is grayed out or displayed in some other color. In another embodiment, label 2701 is grayed out (or otherwise changed) only if the widget is a single-instance widget (as described above); for multiple-instance widgets, label 2701 remains unchanged when the widget is opened. Such a technique provides an indication to the user as to which labels 2701 can be used to activate a widget (either because they are not currently open or because they are multiple-instance widgets) and which labels 2701 are currently inactive (because they correspond to single-instance widgets that have already been opened). In the example of FIG. 30, address book 1101, calculator 801, calendar 1801, music player 901, and stock quote widget 1901 are open, single-instance widgets; therefore their corresponding labels 2701A are grayed-out. Stickies 1301 and clock 2500 are open, multiple-instance widgets; therefore their corresponding labels 2701B are unchanged. Labels 2701C are also unchanged, since they correspond to widgets that are not currently open.

In another embodiment, labels 2701 corresponding to open multiple-instance widgets have a different appearance than labels 2701 corresponding to widgets that are not currently open.

In another embodiment, when a widget is opened, its label 2701 is removed from configuration bar 601. When the widget is closed, its label 2701 is restored in configuration bar 601. In another embodiment, when a single-instance widget is opened, its label 2701 is removed from configuration bar 601, but when a multiple-instance widget is opened, its label 2701 remains on configuration bar 601. When the single-instance widget is closed, its label 2701 is restored in configuration bar 601. Removing and/or restoring labels 2701 can be accompanied by animations to reinforce the transition from configuration bar 601 onto dashboard surface and vice versa. For example, when closing a widget, the widget can appear to be sucked into configuration bar 601 as the corresponding label 2701 is restored.

If a widget is deleted or removed (by dragging it or its label to trash icon 2801, for example), its label 2701 is removed from configuration bar 601.

Figure 29:
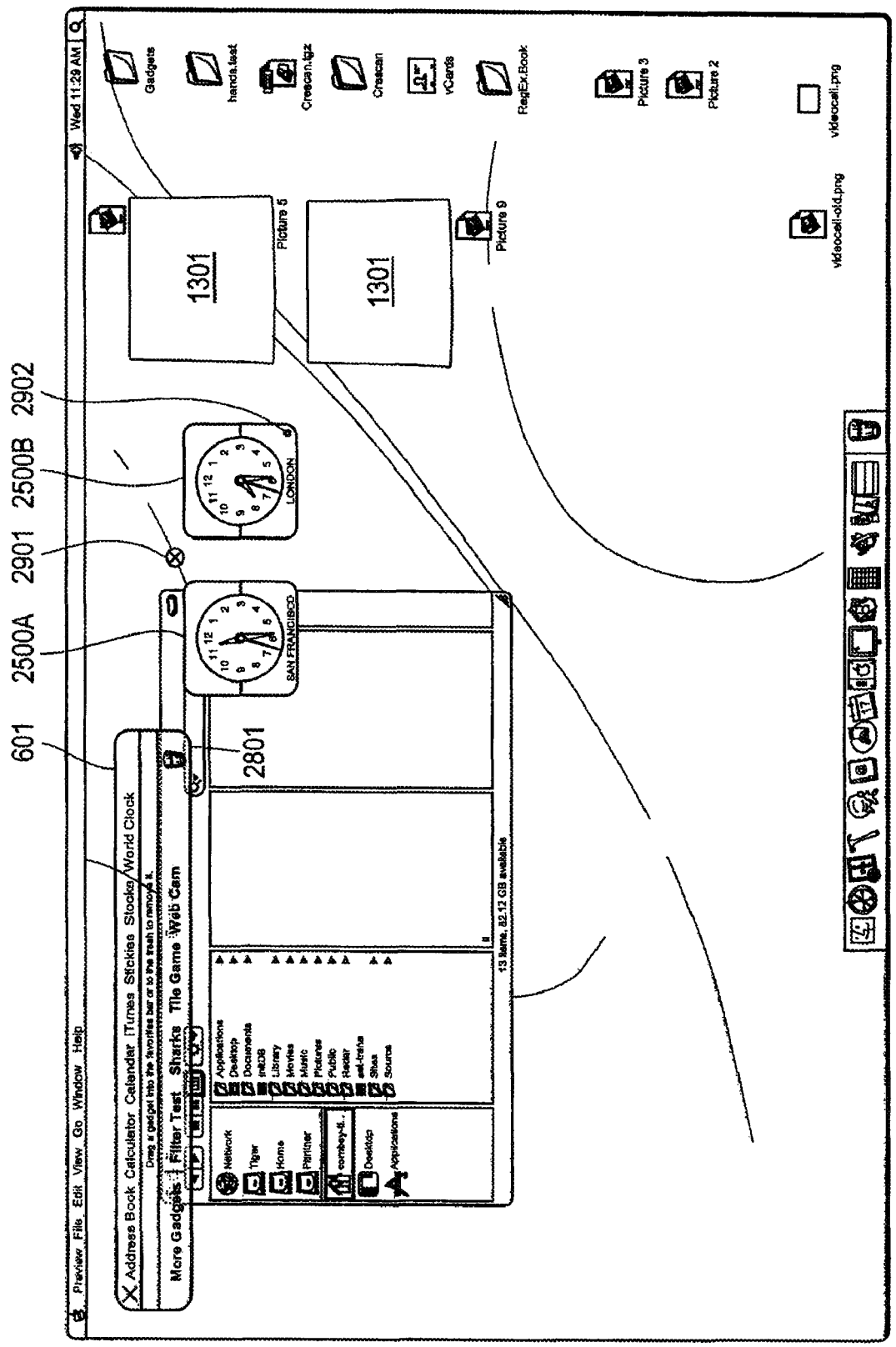
FIG. 29 is a screen shot depicting a dashboard including rollover icons for closing and configuring a widget, according to one embodiment.

In one embodiment, the user can close a widget by clicking on a close icon, or by dragging the widget back to configuration bar 601. Referring now to FIG. 29, there is shown a screen shot depicting a dashboard including close icon 2901 for closing widget 2500B. In one embodiment, icon 2901 is a rollover icon; it appears when the user has positioned the cursor over widget 2500B, and it disappears when the cursor is no longer positioned over widget 2500B. In one embodiment, rollover icon 2901 only appears if the cursor is held over widget 2500B for at least a predetermined period of time, such as half a second. In one embodiment, when a widget is closed, an animation is played to reinforce the notion that the widget is closing. For example, the widget may be momentarily distorted in such a way that it appears to be sucked into close icon 2901, or onto configuration bar 601, before it disappears from the screen. Other types of animations or effects may also be used, such as a fade, or a wipe, or a shrinking effect. In one embodiment, the user can configure which effect is desired, or if no effect is desired.

Widget 2500B also includes preferences icon 2902 for accessing preferences controls for widget 2500B. In one embodiment, icon 2902 is a rollover icon; it appears when the user has positioned the cursor over widget 2500B, and it disappears when the cursor is no longer positioned over widget 2500B (although it continues to be visible when the cursor is moved over to icon 2902). In one embodiment, icon 2902 only appears if the cursor is held over widget 2500B for at least a predetermined period of time, such as half a second. Clicking on icon 2902 causes preferences controls to be displayed. In one embodiment, preferences are entered using a conventional dialog box (not shown) as is known in the art. In another embodiment, clicking on icon 2902 causes widget 2500B to appear to flip over, revealing its reverse side, which contains preferences controls.

Figure 32:
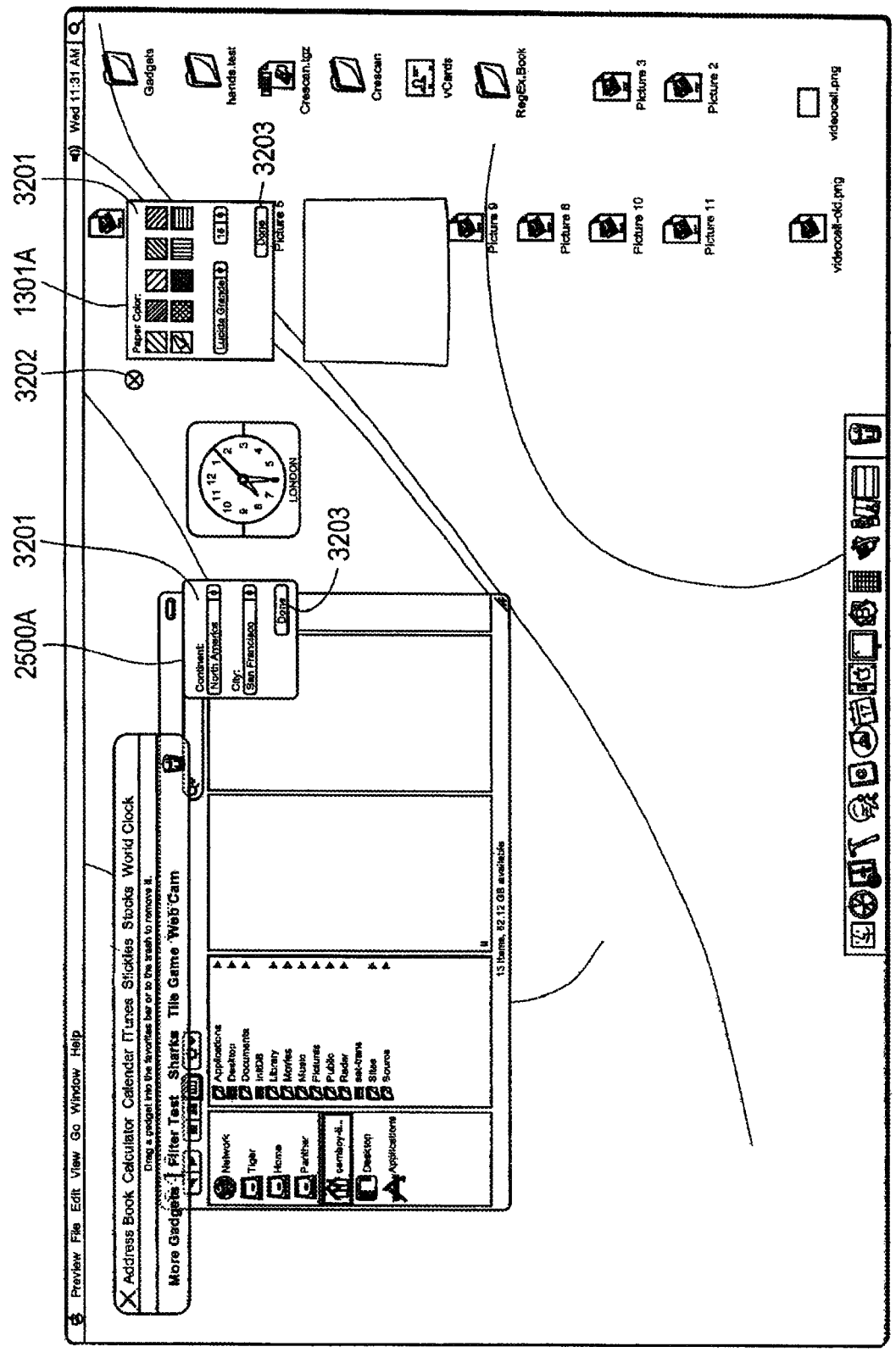
FIG. 32 is a screen shot depicting a dashboard showing preferences controls for two widgets, according to one embodiment.

Referring now to FIG. 32, there is shown an example of the dashboard where two widgets 2500A and 1301A have been flipped over, revealing preferences controls 3201. In the example, preferences controls 3201 include menus for selecting a location (for clock widget 2500A), and paper color selector and font selector (for stickies widget 1301A). One skilled in the art will recognize that any type of controls, menus, fields, or other elements can be included in preferences controls 3201. The user can dismiss preferences controls 3201 by clicking on Done button 3203 or on close box 3202. In one embodiment, close box 3202 is a rollover icon, so that it is only visible when the cursor is positioned over widget 1301A (although it continues to be visible when the cursor is moved over to close box 3202). In one embodiment, when preferences controls 3201 are dismissed, a flip-over animation is again played, and the normal appearance of the widget is restored (reflecting any changes that were made via preferences controls 3201).

Referring now to FIG. 31, there is shown another example of a dashboard wherein some labels 2701A in configuration bar 601 have changed in appearance, while other labels 2701B, 2701C are unchanged, according to one embodiment. Address book 1101, calculator 801, calendar 1801, music player 901, and stock quote widget 1901 are open, single-instance widgets; therefore their corresponding labels 2701A are grayed-out. Stickies 1301A and 1301B are open, multiple-instance widgets; therefore their corresponding label 2701B is unchanged. Labels 2701C, including world clock label, are also unchanged, since they correspond to widgets that are not currently open. In FIG. 31, the cursor (not shown) is positioned over stickies widget 1301B, so that close box 2901 and preferences icon 2902 are displayed, as described above in connection with FIG. 29.

In the example of FIG. 31, configuration bar 601 includes Done button 3101, which dismisses configuration bar 601 and restores configuration icon 501. Thus, Done button 3101 performs the same action as dismissal icon 603.

In one embodiment, flipping a widget over reveals other information, fields, or controls in addition to (or instead of) preferences fields and controls. One skilled in the art will recognize that the reverse side of a widget can include any type of auxiliary information, fields, or controls, and is not limited to a mechanism for accessing preferences controls.

Widget Installation

In one embodiment, widgets are preinstalled on the user's computer, so that dragging them onto the dashboard merely makes them active. In another embodiment, widgets are not preinstalled, but are installed in response to the user dragging them onto the dashboard. In another embodiment, dragging a widget onto the desktop causes code for the widget to be downloaded from a remote server and installed on the user's machine. In another embodiment, installing a widget in this manner also causes a fully functional application containing related functionality to be automatically installed as well (although the user can be given the option to decline such an installation); for example, installing a music player widget can cause a fully functional music player application to be installed as well. Authentication and payment may be prerequisites for such operations in some embodiments.

For example, referring briefly to FIG. 28, in one embodiment the user clicks on more gadgets label 2602 to access an online widget store or website where widgets are available for purchase or for free download. The user selects widget(s) for installation on his or her machine, and pays via credit card (if required). The online store or website is dismissed, the selected widget(s) are downloaded and installed, the dashboard is automatically reactivated, and the selected widget appears in configuration bar 601, ready to be dragged onto the dashboard surface. Alternatively the new widget can automatically be placed on the dashboard surface. Thus, the present invention provides an easy, seamless way to install widgets.

In one embodiment, an online store or free distribution site is provided for making widgets 303 available. Available widgets 303 can be viewed, previewed, selected and installed from a website, or from a configuration option within the dashboard. In one embodiment, users can pay for widgets 303 using a credit card or any other conventional means for online purchases. Widgets 303 are transmitted and installed on the user's computer according to conventional means. In one embodiment, widgets 303 are installed according to techniques describe in related U.S. Utility patent application Ser. No. 10/874,829, for "User Interface for Assisting in the Installation of an Asset," filed Jun. 22, 2004, the disclosure of which is incorporated herein by reference.

In one embodiment, widgets such as 801 are implemented using HTML technology with enhancements that are more fully described below and in the related cross-referenced applications. One skilled in the art will recognize, however, that any graphics technology can be used for implementing widgets such as 801.

In one embodiment, widgets 303 are encrypted into a flat file that is expandable in memory, either in whole or in parts. Widget 303 contents are indexed so that particular resources can be accessed as needed. Widgets 303 may be encrypted according to any conventional encryption technology.

In one embodiment, clients 302 have complete control of resource loading of the WebView. When a relative resource is requested, the client 302 converts the protocol to one specific to the process. In one embodiment, the NSURL Protocol in Foundation is used to fetch data from the encrypted source.

Software Architecture

Figure 3:
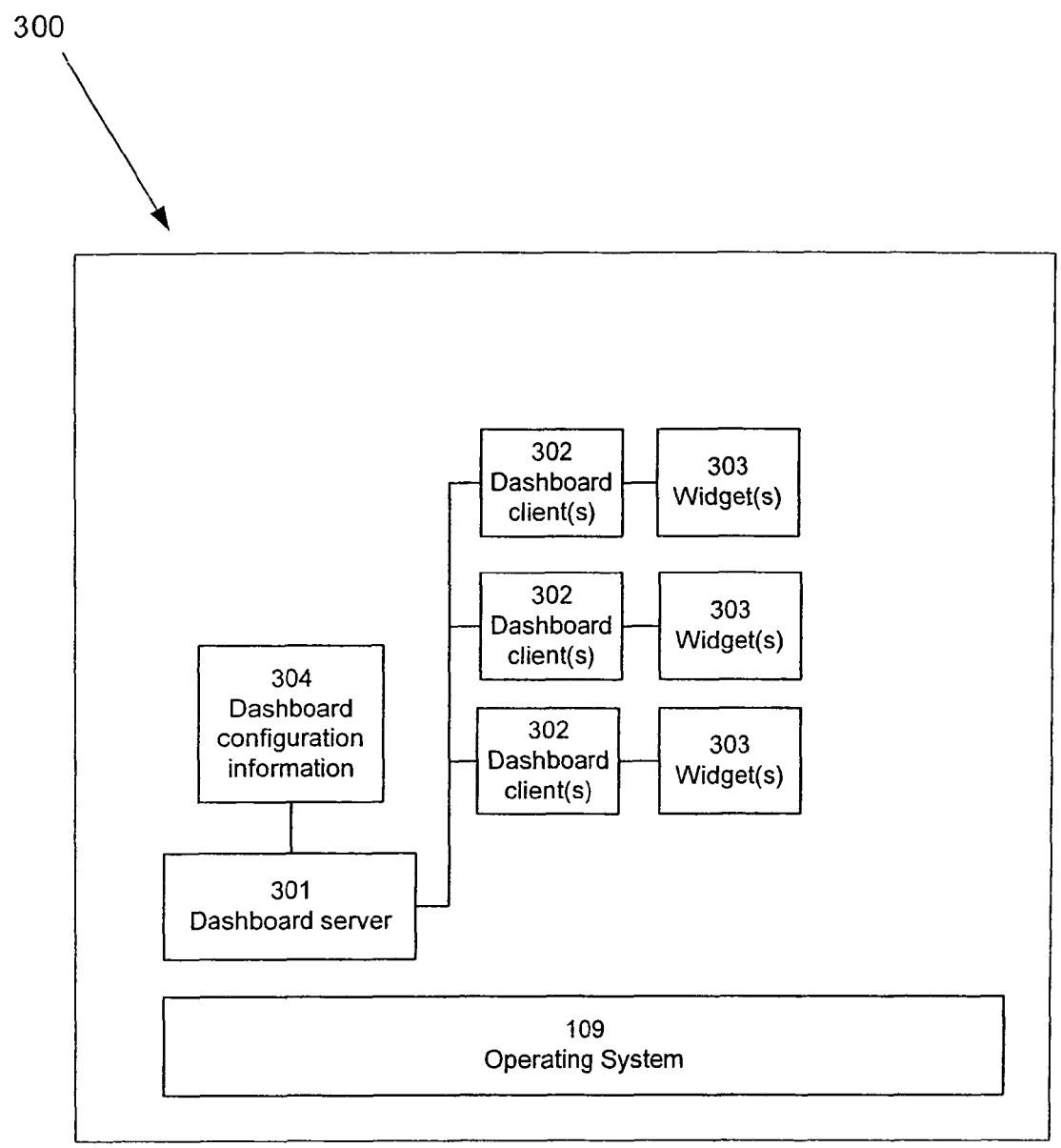
FIG. 3 is a block diagram depicting a software architecture for implementing the present invention according to one embodiment.

Referring now to FIG. 3, there is shown an example of a software architecture 300 for implementing the present invention according to one embodiment. In the embodiment, the present invention operates in connection with an operating system 109 as described above.

In one embodiment, software architecture 300 includes dashboard server 301, dashboard client(s) 302, and widget(s) 303. Dashboard configuration information 304 is used by server 301 and/or clients 302 to specify the configuration options for displaying widgets 303. All of the dashboard configuration information, including access levels and the like (if applicable), is stored in dashboard configuration information 304. As described above, such information may include dashboard configuration information for two or more dashboards configured by the same user or by different users.

In one embodiment, widgets 303 are displayed using HTML and related web technology. Dashboard server 301 manages and launches dashboard client 302 processes. Each dashboard client 302 loads a widget 303, which in one embodiment is an HTML webpage and related resources needed to display the page. In one embodiment, a client 302 is initiated for each widget 303 to be displayed. In one embodiment, clients 302 display widgets 303 without a conventional window frame, menu bar, or other components typically associated with on-screen windows; this provides a clean, straightforward display of the overall dashboard that avoids confusion and clutter. Clients 302 display widgets 303 by rendering web pages into a "WebView"; the size of each WebView is defined as metadata associated with the corresponding widget 303. Server 301 is a window server that provides data for rendering a layer that can be overlaid on the normal desktop of the user interface. Widgets 303 are rendered into the separate layer, and then that layer is drawn on top of the normal desktop, so as to partially or completely obscure the desktop while the dashboard is active.

Dashboard Server 301

Dashboard server 301 is a lightweight process that can stand alone or be imbedded in another process. Server 301 can be located at computer 102, or at remote server 107. Server 301 provides the following functionality:

Non-widget UI. In one embodiment, server 301 handles user inter-face functionality that is not directly related to widgets. This includes, for example: activation; deactivation; dashboard background; background animations; and the like.

Window management. In one embodiment, server 301 acts as a lightweight window server for the dashboard client 302 processes. Windows are created in server 301 process and then passed to dashboard clients 302. Operations performed on windows go through dashboard server 301. Such operations include, for example: resizing; moving; fetching of position and size; and the like. One advantage to having window operations pass through server 301 is that server 301 can then react to widget 303 changes and update the overall environment. For example, server 301 can cause displayed widgets 303 to bounce off of each other, stick to sides of the screen, snap to grids, or the like.

Fast login. In one embodiment, dashboard clients 302 are launched and then rendered into a window from dashboard server 301. Since this can take some time, dashboard server 302 provides an initial image to be rendered in the window while client 302 is launched, so as to improve visual feedback and to make initial activation animation appear instantaneous. As dashboard clients 302 load and render, they take over the window and draw their content.

Event management. In one embodiment, server 301 acts as an event server as well as a window server. Events come from the operating system window server to dashboard server 301 and are routed to the appropriate dashboard client 302. This indirection allows for a variety of features, including: server-side dragging (even if a dashboard client 302 is hung); filtering of events; insertion of server-generated events; and the like. Dashboard clients 302 communicate with server 301 to describe control regions, so that server 301 can initiate server-side drags correctly.

Loading widgets 303. In one embodiment, server 301 is responsible for loading widgets 303. It maintains the list of widgets 303 to load when starting up. In one embodiment, the dashboard client 302 corresponding to a particular widget 303 is not launched until the first time the dashboard is activated.

Arbitration of widgets 303. In one embodiment, server 301 is the arbitrator of dashboard clients 302. It controls the process and passes information to and from each widget 303. If a widget 303 crashes, dashboard server 301 relaunches the process automatically. It also prevents crash loops where a widget 303 crashes repeatedly at startup. In one embodiment, all communication to a widget 303 goes through dashboard server 301 first.

CoreImage integration. In one embodiment, server 301 uses Core-Image technology, as described in related U.S. Utility patent applications cross-referenced above. Filters are applied to the background window of the server to provide spotlight and ripple effects.

Widget 303 preference management. In one embodiment, server 301 stores, in configuration information 304 that is stored according to a conventional file system, preferences associated with widgets 303, and vends those preferences to widgets 303.

Dashboard Client 302

In one embodiment, each client 302 is a lightweight process that uses, for example, objects defined as part of a development environment such as Cocoa Application Framework (also referred to as the Application Kit, or AppKit), described for example at Mac OS X Panther Release Notes Cocoa Application Framework, available at "http://developer.apple.com/documentation/ReleaseNotes/Cocoa/AppKit.ht ml"). Clients 302 can be implemented as simplified browser screens that omit conventional interface features such as a menu bar, window frame, and the like. In one embodiment, clients 302 provide the following functionality in implementing the present invention:

Control of the WebView. Client 302 creates a WebView and attaches the HTML of widget 303 to the WebView. Client 302 acts as the delegate for user interface requests made by the WebView. In one embodiment, client 302 overrides much of AppKit's default behavior as it regards to communication to server 301 and event handling. WebViews are generic controls for viewing and manipulating HTML and XHTML; they are described, for example, at Web Kit Reference for Objective-C, available at "http://developer.apple.com/documentation/Cocoa/Reference/WebKit/ObjC_classic/index.html".

JavaScript extensions. In one embodiment, client 302 inserts a custom object in the JavaScript runtime of the WebView. This allows for a variety of extensions for widgets 303, including without limitation: copy/cut/paste; getting/setting preferences; notifications when preferences have changed; opening a linked application (for example, a widget 303 may include a button or other trigger that causes a corresponding application to be launched); quitting; moving/resizing; and the like.

Managing Plug-ins. Some widgets 303 use native code as part of their implementations. In one embodiment, client 302 includes the capability to interface with such native code and/or with databases and data stores available locally or remotely. In one embodiment, widgets 303 also have the ability to create a custom AppKit NSView. A widget developer can use a custom view to enable other types of animations, such as OpenGL views, plug-ins such as Flash, and the like.

In one embodiment, plug-ins are implemented as follows. An Obj-C bundle is loaded from a resources folder associated with widget 303. The bundle has two methods on its Principal Class:

-(id) initWithWebView:(WebView*)webview;
-(void) windowScriptObjectAvailable:(WebScriptObject *)windowScriptObject (this allows the plugin to add JavaScript extensions before the web page has loaded); initWithWebView is called when the Dashboard Client starts up, and webViewLoaded is called when the page finishes loading. The developer of a plug-in can use the WebKit's scripting APIs to extend the JavaScript for a particular widget 303.

Widget 303 Format

In one embodiment, each widget 303 is implemented as an HTML file. The HTML file can reference other local and remote resources such as style sheets, other HTML files, JavaScript files, images, and the like. Widgets 303 can be implemented using, for example, a flat bundle file format or a packaged HTML file format.

Flat Bundle. The Flat Bundle format has the following directory structure:
My.widget (directory/Bundle)
Info.plist (file)
My.html (file)
My.png (file)
English.lproj (optional directory)
Localizable.strings (file)

The Info.plist describes widget 303. It also provides an identifier for widget 303, and points to the main HTML file and default PNG file. The default PNG file is used as a temporary display while dynamic elements are loaded from server 301. An example of a structure for Info.plist is as follows:

| Key | Type | Description/Value |
| --- | --- | --- |
| CFBundleIdentifier | CFString. | com.apple.widget <widget name> |
| CFBundleName | CFString | name of the widget |
| MainHTML | CFString | name of main HTML resource |
| Width | CFNumber | default width of the widget |
| Height | CFNumber | default height of the widget |
| DefaultImage | CFString | resource name of default PNG |
| Plugin (optional) | CFString | resource name of native plugin |

My.html can reference any other local resource as well. In one embodiment, the resources are specified relative to the HTML file's location.

My.png can have any name, based on the "DefaultImage" key in the Info.plist. This image is rendered by server 301 if there is no cached representation.

The English.lproj and other localizable directories are for localizable strings.

Widget 303 Location

In one embodiment, widgets 303 are stored locally in storage device 106 such as a hard drive. Per-machine widgets 303 are stored at, for example:
/Library/Widgets/
/Applications/Widgets/

Widgets 303 can also be made available on a per-user basis, particularly in situations where more than one user uses the same computer 102. Per-user widgets 303 are stored, for example, at:
~/Widgets
~/Library/Widgets/

One skilled in the art will recognize that these configurations are merely exemplary, and that any other file format or directory structure can be used.

Widget 303 Development

In one embodiment, widgets 303 can be developed using WebKit, described, for example, at Web Kit Reference for Objective-C, available at "http://developer.apple.com/documentation/Cocoa/Reference/WebKit/ObjC_classic/index.html". Additional functionality can also be provided, such as the ability to drag to and from web pages, detect control regions, stop plug-ins and timers from firing when the dashboard is hidden, and the like. In one embodiment, such additional functionality is provided using an enhanced Canvas architecture, as described in related U.S. Provisional patent application Ser. No. 60/583,125, for "Procedurally Expressing Graphic Objects for Web Pages," filed Jun. 25, 2004, the disclosure of which is incorporated herein by reference. In addition, web extensions that are well known in the art can be used for providing additional functionality such as drag-and-drop capability, detection of control regions, and the like.

For widgets that involve additional, more detailed rendering than is available from WebKit/HTML, a <canvas> tag is provided. A CoreGraphics context is fetchable from the <canvas> tag, and JavaScript is then used to draw into the context and effectively the HTML page. Detailed description of this implementation can be found in the related applications.

Remote Server 107 Access

In one embodiment, some or all widgets 303 communicate with a remote server 107 in order to perform their functions. For example, a weather widget requests current weather data from a remote server 107, while a package tracking widget requests current data regarding package locations from a remote server 107. Such communication takes place according to well-known techniques for requesting and receiving information across a network such as the Internet: widget 303 or client 302 forms a request for data, and transmits the request according to HTTP or some other network protocol; server 107 responds to the request with the information; and widget 303 uses the information in forming the output that will be displayed to the user. In one embodiment, these operations take place in response to JavaScript code within widget 303. Server 107 can be a resource that is available generally to the public, or it can be a proprietary source of information to which the user has been given access. Where appropriate, authorization and/or user verification can be required before server 107 transmits requested information. If desired, the information can be transmitted across a secure channel and/or encrypted prior to transmission, according to techniques that are well known in the art.

EXAMPLES OF WIDGETS 303

The following is a list of examples of widgets 303 that can be provided using the techniques of the present invention. One skilled in the art will recognize that many other types of widgets 303 can be provided.

- buddy list
- calculator
- date book
- dictionary
- online music store and music player
- movie show times
- news feed
- package tracker
- rolodex
- sports scores
- stickies
- stock quotes
- webcam
- weather
- world clock
- currency converter
- online auction viewer and tool
- lottery
- mini inbox for receiving email
- puzzle
- telephone directory (e.g., yellow pages)

FIGS. 18 through 25 depict examples of some of these types of widgets 303. One skilled in the art will recognize that the particular layout, appearance, and arrangement of each of these widgets 303 are merely exemplary. In particular, any or all of these widgets 303 can include a button for accessing a fully functional application having expanded functionality, as described above in connection with FIGS. 9 and 10.

Figure 18:
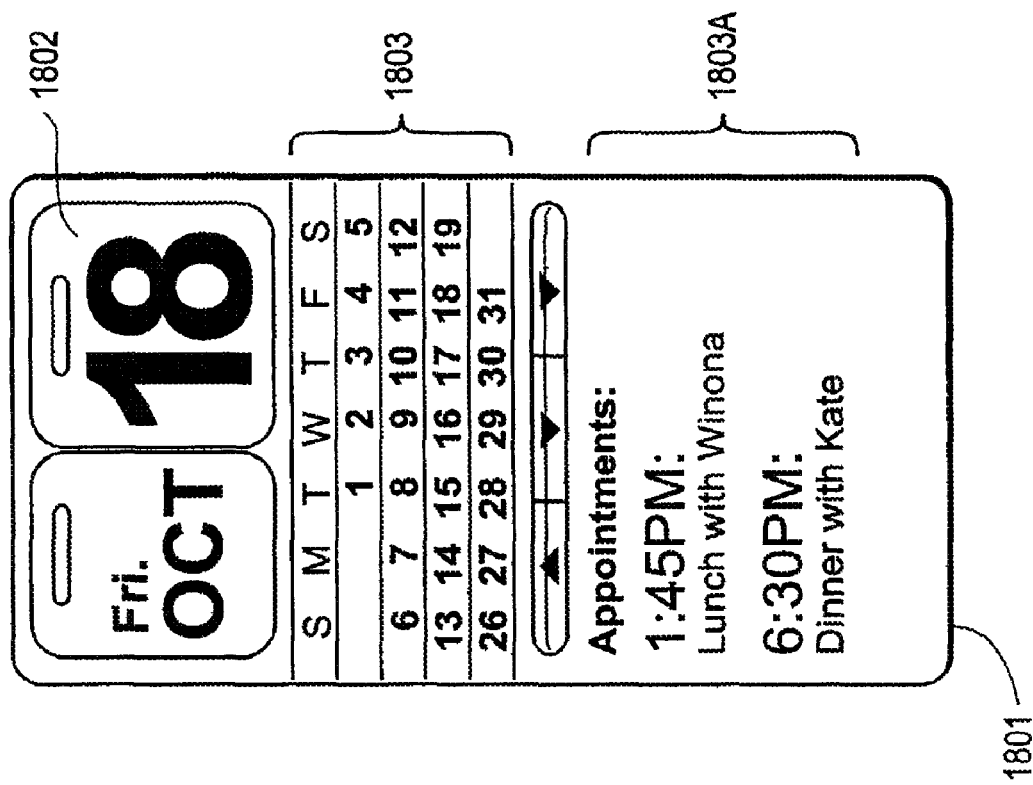
FIG. 18 is an example of a calendar widget according to one embodiment.

FIG. 18 depicts an example of a calendar widget 1801 according to one embodiment, including current date 1802, calendar display 1803 showing current month, and appointments 1803A. In one embodiment, data for the calendar is stored locally at computer 102; in another embodiment, widget 1801 retrieves calendar data from a remote server 107.

Figure 19:
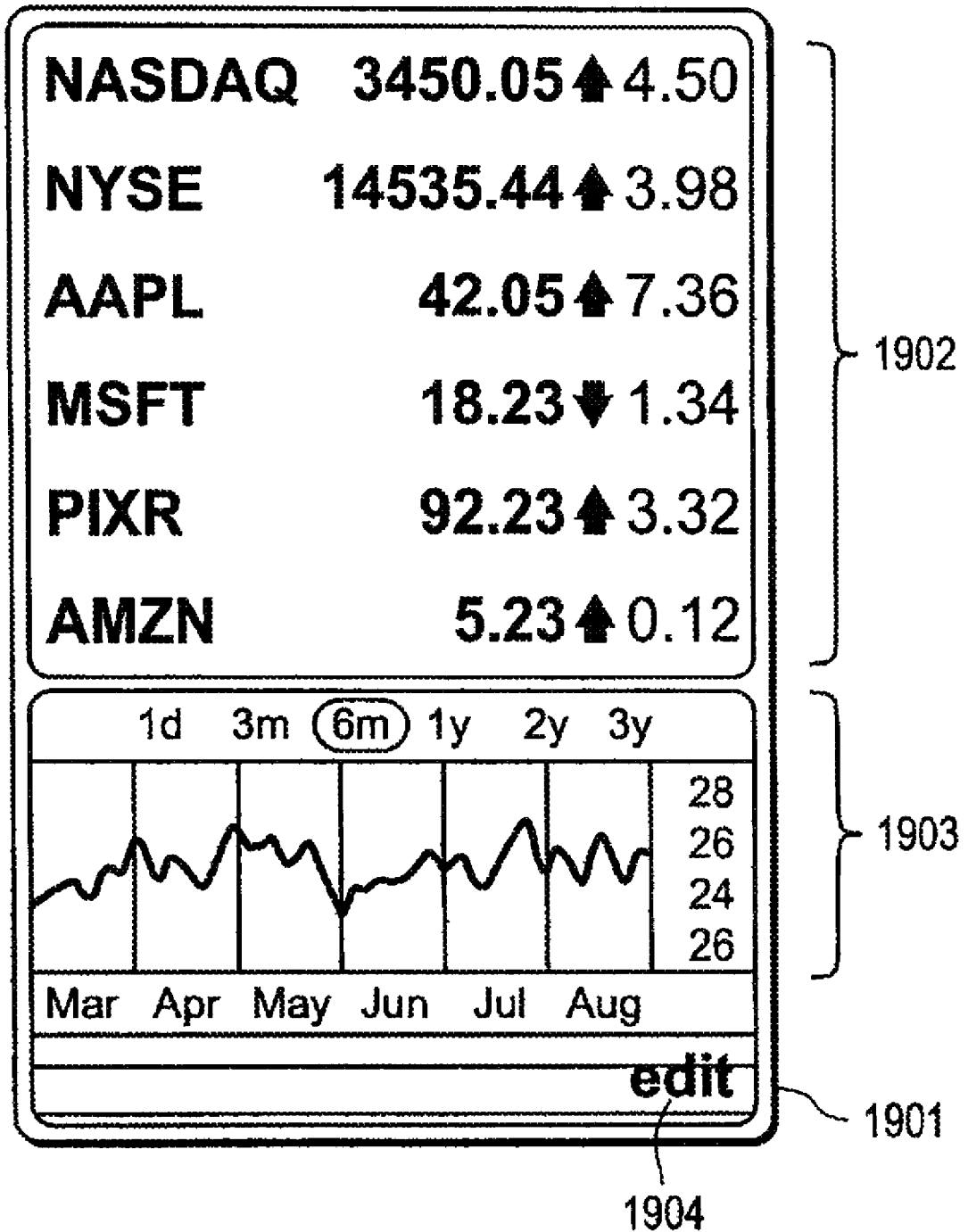
FIG. 19 is an example of a stock quote widget according to one embodiment.

FIG. 19 depicts an example of a stock quote widget 1901 according to one embodiment, including several stock quotes 1902, a graph 1903 for a selected stock, and an edit button 1904 for making changes to the stocks to be included in widget 1901. In one embodiment, widget 1901 retrieves stock quote data from a remote server 107.

Figure 20:
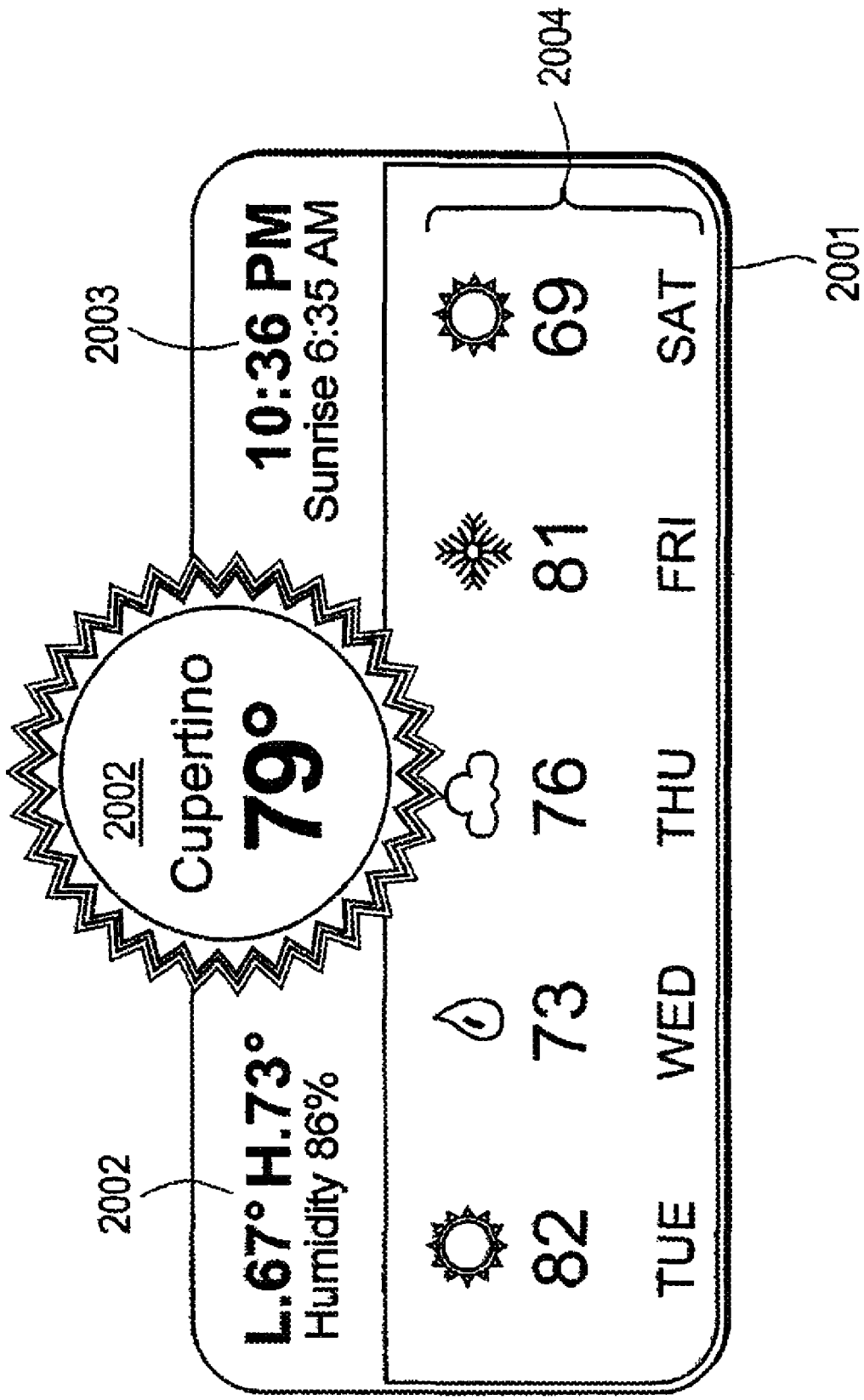
FIG. 20 is an example of a weather widget according to one embodiment.

FIG. 20 depicts an example of a weather widget 2001 according to one embodiment, including current temperature conditions 2002, current time 2003, and forecast 2004. Widget 2001 can be configured to show weather information for any one or more locations of interest to the user. In one embodiment, widget 2001 retrieves weather data from a remote server 107.

Figure 21:
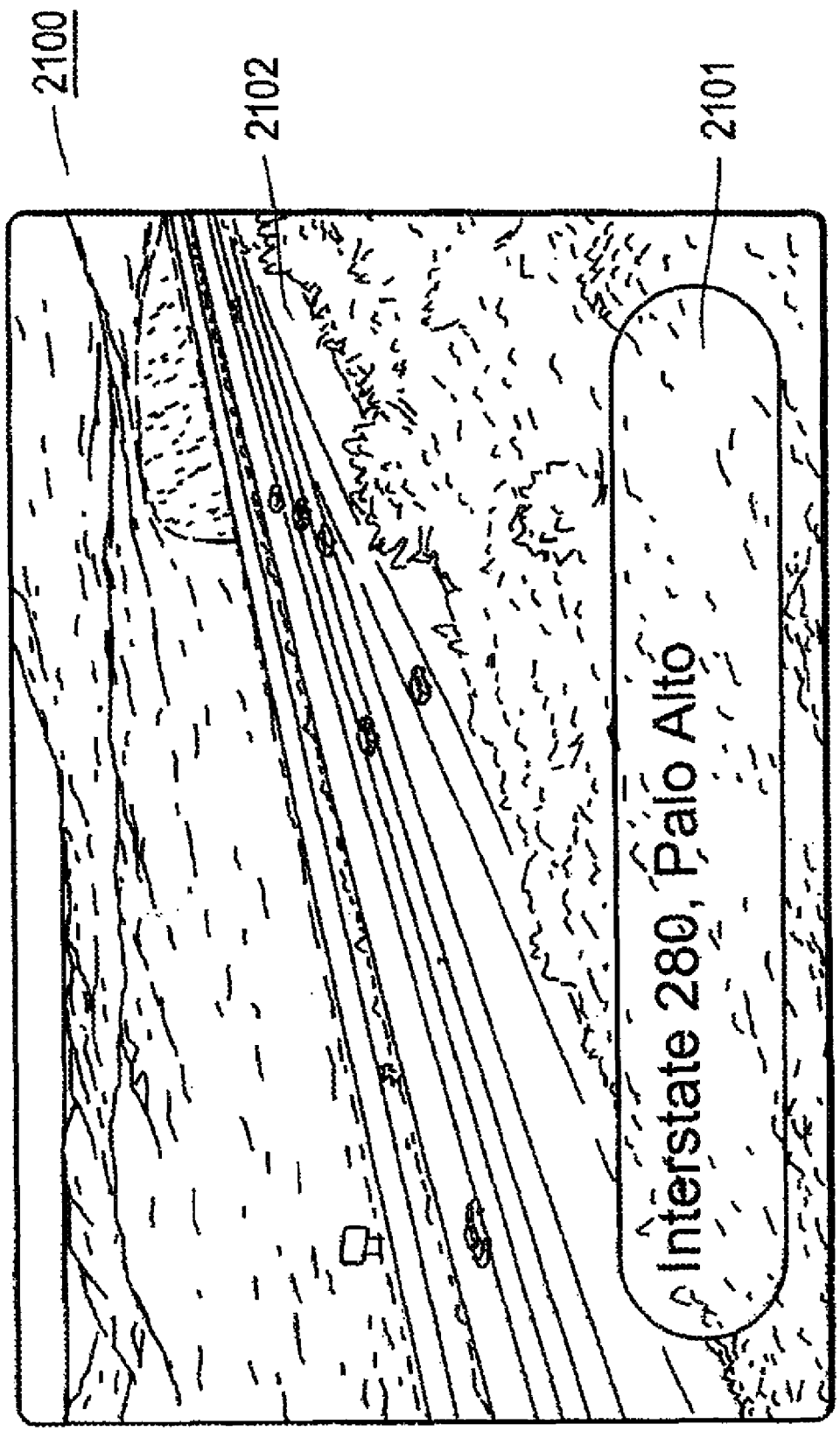
FIG. 21 is an example of a traffic webcam widget according to one embodiment.

FIG. 21 depicts an example of a traffic webcam widget 2100, including a current photograph 2102 (or live video feed) of a specified location, and an identifier 2101 of the location according to one embodiment. Widget 2100 can be configured to show images for any one or more locations of interest to the user. In one embodiment, widget 2100 retrieves photographs and/or video from a remote server 107.

Figure 22:
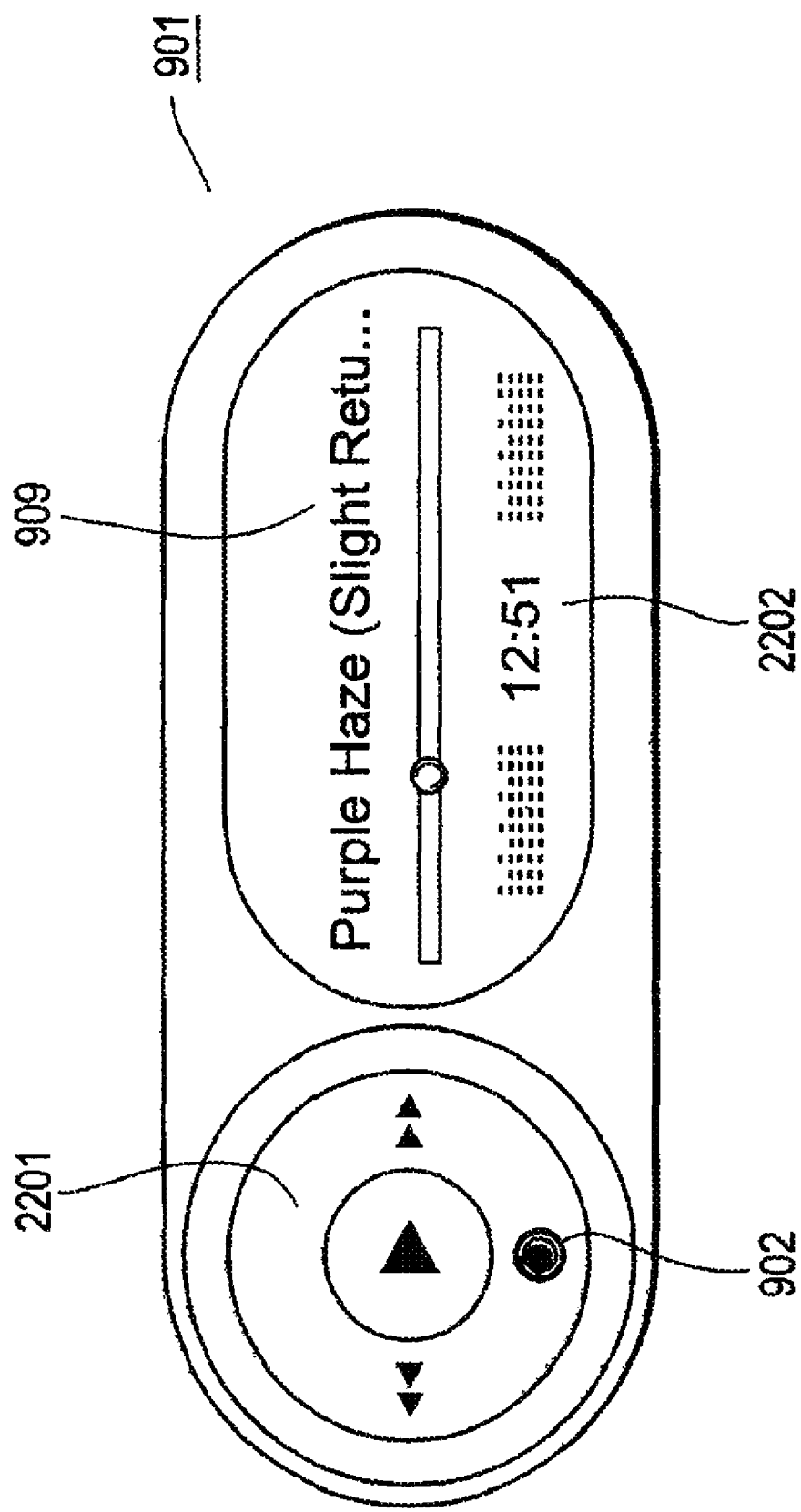
FIG. 22 is an example of a music player widget according to one embodiment.

FIG. 22 depicts an example of a music player widget 901 according to one embodiment, including now-playing indicator 909, counter 2202, controls 2201 for pausing, playing, rewinding, and fast-forwarding, and button 902 for accessing a fully functional music player application, as described above in connection with FIGS. 9 and 10. In one embodiment, widget 901 retrieves music data from a remote server 107.

Figure 23:
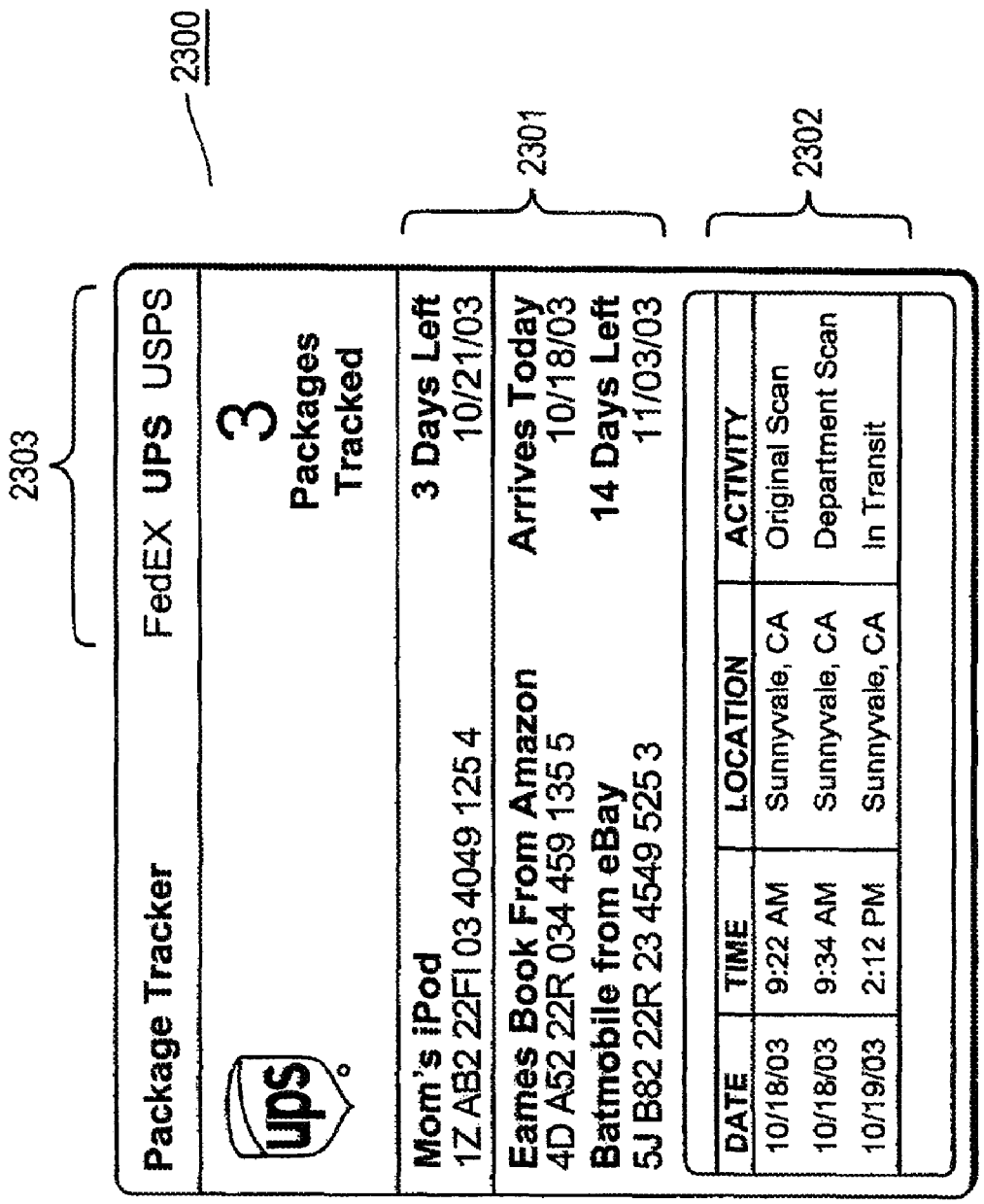
FIG. 23 is an example of a package tracking widget according to one embodiment.

FIG. 23 depicts an example of a package tracking widget 2300 according to one embodiment, including a list of delivery services 2303, one of which is currently selected. Package tracking information 2301 for the selected delivery service is shown, including a name for each item being delivered, current status, tracking number, and the date of the last update for that item. Detailed tracking info 2302 is shown for a selected item in 2301. The user can configure widget 2300 to add items to be tracked, format the results, and the like. In one embodiment, widget 2300 retrieves package tracking data from a remote server 107.

Figure 24:
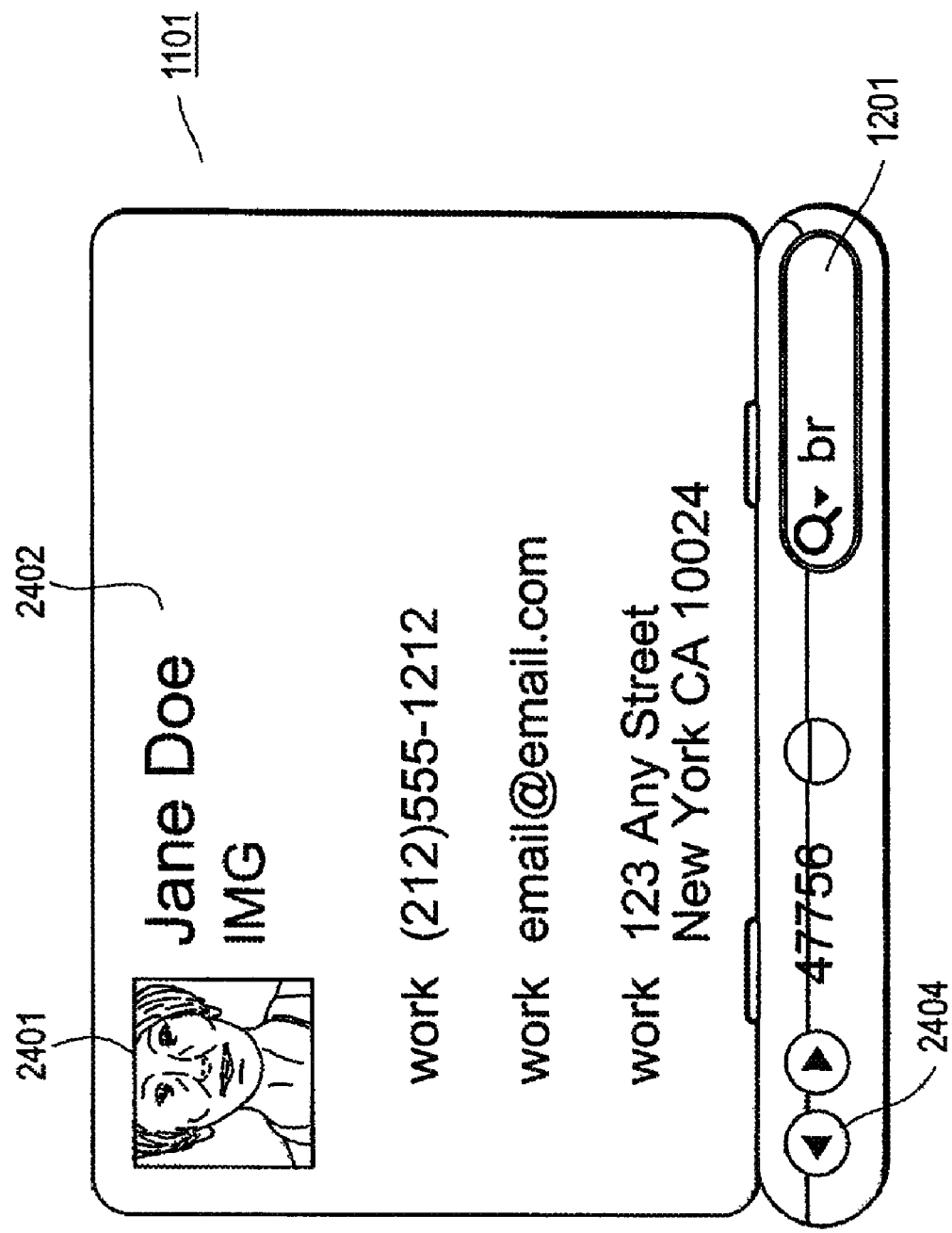
FIG. 24 is an example of an address book widget according to one embodiment.

FIG. 24 depicts an example of an address book widget 1101 according to one embodiment. Widget 1101 includes the following information for an individual: a name 2402, photograph 2401, and contact information 2403. Arrows 2404 allow the user to navigate to other records in the address book. Search field 1201 allows the user to search for names that begin with or include the search terms. In one embodiment, data for the address book is stored locally at computer 102; in another embodiment, widget 1101 retrieves address book data from a remote server 107.

Figure 25:
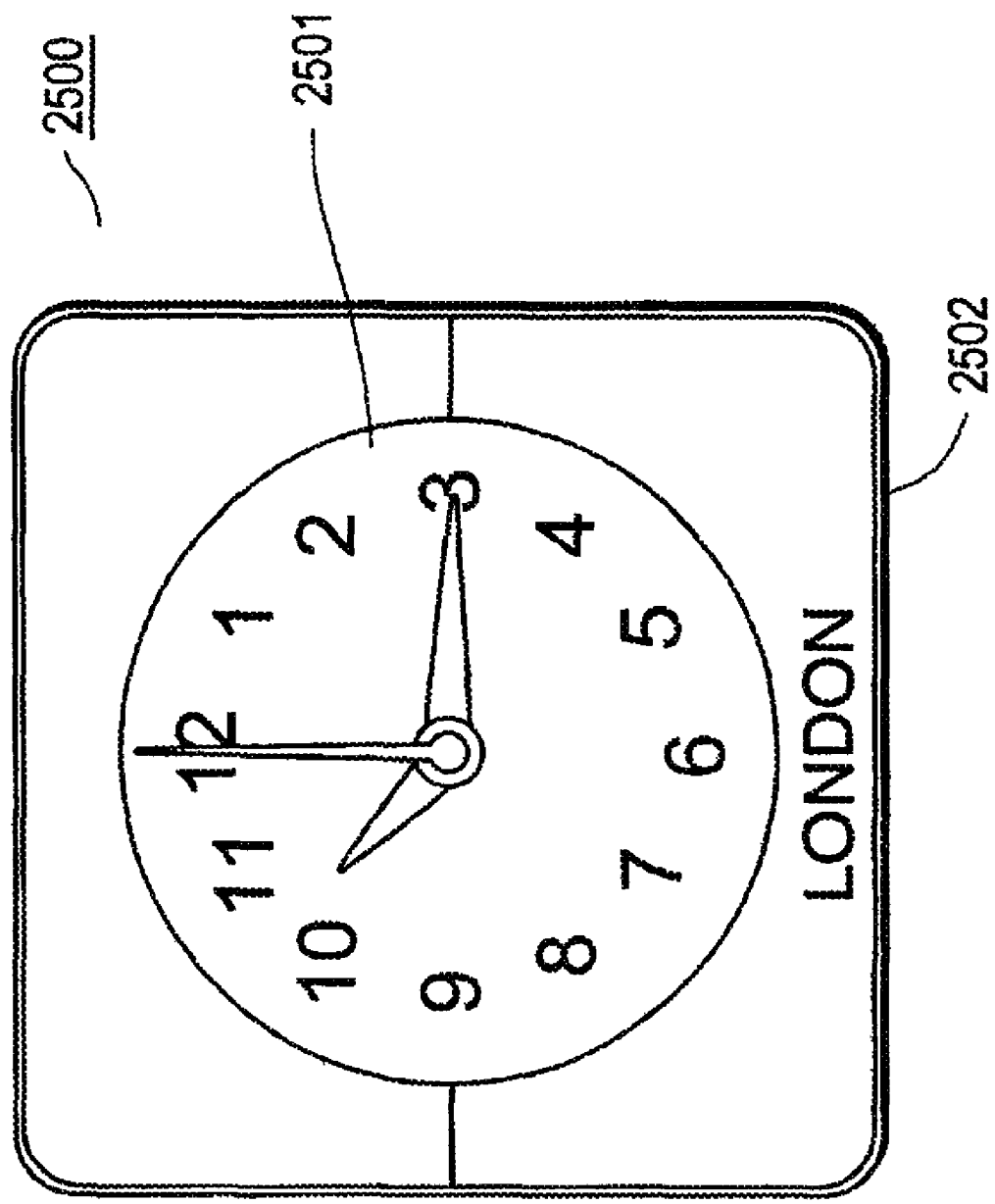
FIG. 25 is an example of a clock widget according to one embodiment.

FIG. 25 depicts an example of a clock widget 2500 according to one embodiment, including a current time display 2501 (which can take any form, digital and/or analog), and a location 2502 corresponding to the current time display 2501. The user can configure widget 2500 to change the time, location, and/or format of the display.

In one embodiment, clock widget 2500 changes in appearance according to the time of day. For example, a light-colored face can be shown during the day, and a dark face can be shown at night. Referring again to FIG. 26, clock widget 2500A has a light-colored face because the local time in San Francisco is 11:28 am, while clock widget 2500B has a dark face because the local time in London is 7:28 pm. In one embodiment, other distinguishing visual characteristics are used to denote day and night. In one embodiment, local times from 6:00 am to 6:00 pm are indicated as being daytime, while local times from 6:00 pm to 6:00 am are indicated as being night time. In another embodiment, actual sunrise and sunset times are used for controlling the appearance of clock widget 2500 (based on the selected location for the clock widget 2500, and further based on sunrise/sunset information retrieved from stored tables or from a resource such as a website). In another embodiment, a continuous gradation is used, so that times near sunset or sunrise are shown in some gradation between the dark and light-colored faces; such times may also be shown in a pinkish hue to further reinforce the sunset or sunrise time period.

Figure 33:
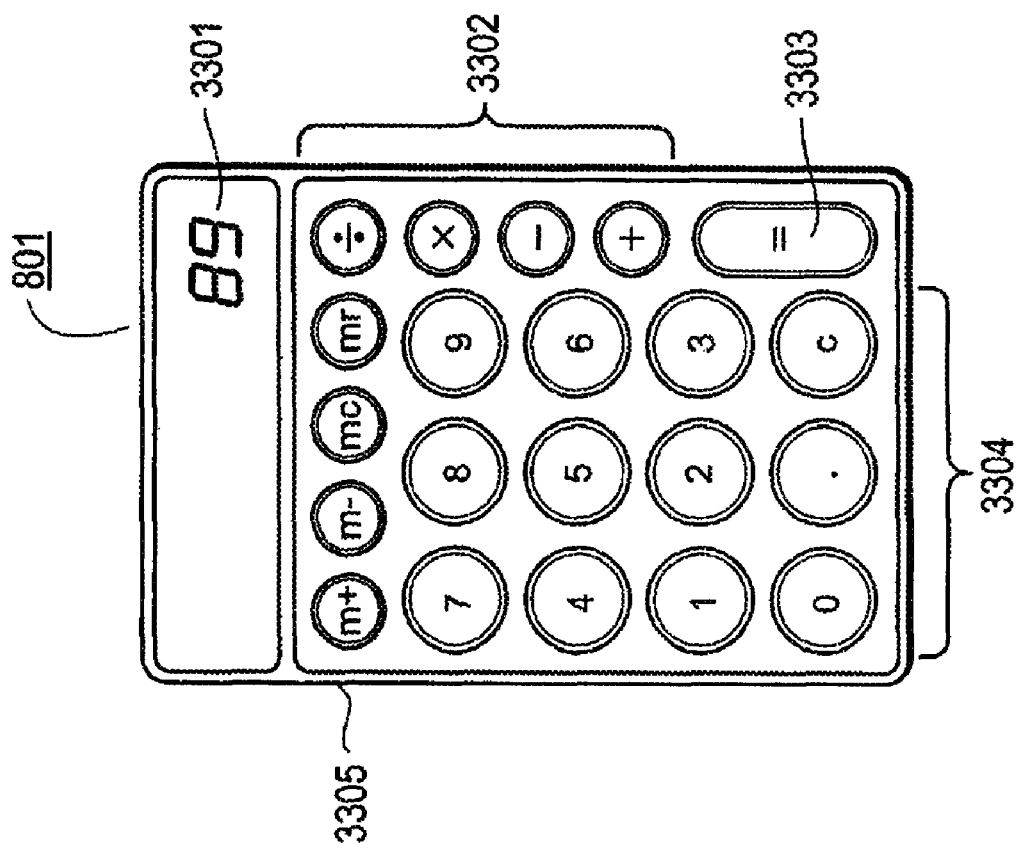
FIG. 33 is an example of a calculator widget according to one embodiment.

FIG. 33 depicts an example of a calculator widget 801 according to one embodiment, including numeric display 3301, keypad 3304, arithmetic operator keys 3302, memory keys 3305, and equals key 3303. Keys 3302, 3303, 3304, and 3305 generally function in a manner similar to that of conventional calculators and calculator accessories, except as noted herein. Display 3301 shows results of calculations in a manner similar to that of conventional calculators and calculator accessories, except as noted herein.

In one embodiment, display 3301 lights up, or otherwise changes in appearance, to indicate that calculator widget 801 is active. For example, display 3301 may light up when the user first clicks somewhere within widget 801, and may stay lit until the user dismisses widget 801 or clicks somewhere outside widget 801. While display 3301 is lit, widget 801 is active and can receive user input via the onscreen cursor or via a keyboard or other input device.

In one embodiment, operator keys 3302 light up when lit, and stay lit until the next key is pressed, so as to remind the user what operation is being performed. For example, in FIG. 33 the division operator key 3302 is lit, signifying that the user has clicked on that key, and reminds the user that the current operation is a division operation. In one embodiment, operator key 3302 stays lit until another operator key 3302 is pressed, or until the clear button is pressed, or until equals key 3303 is pressed; in another embodiment, operator key 3302 stays lit until any other key is pressed.

Figure 34A:
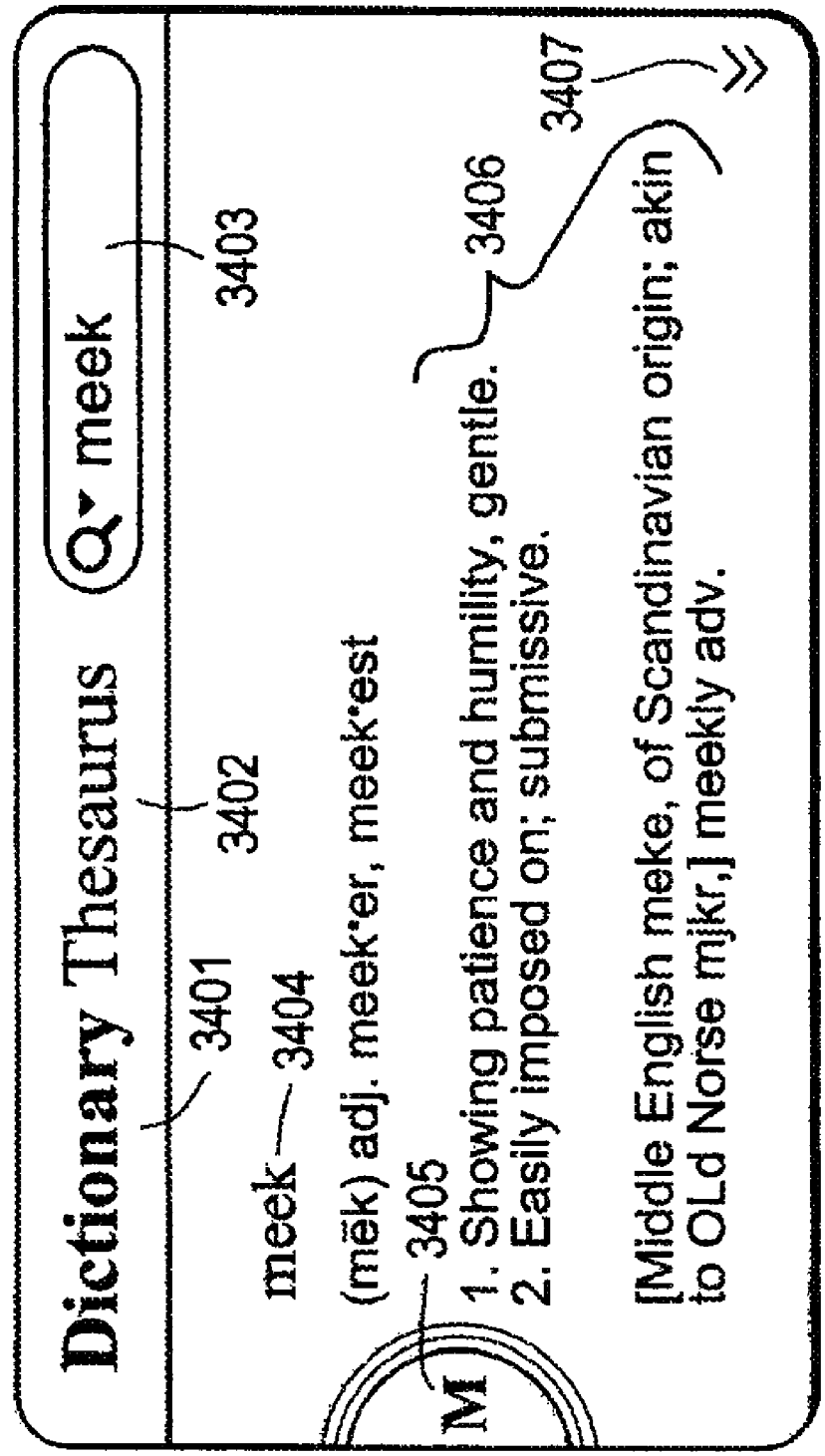
FIGS. 34A and 34B depict an example of a dictionary/thesaurus widget according to one embodiment.
Figure 34B:
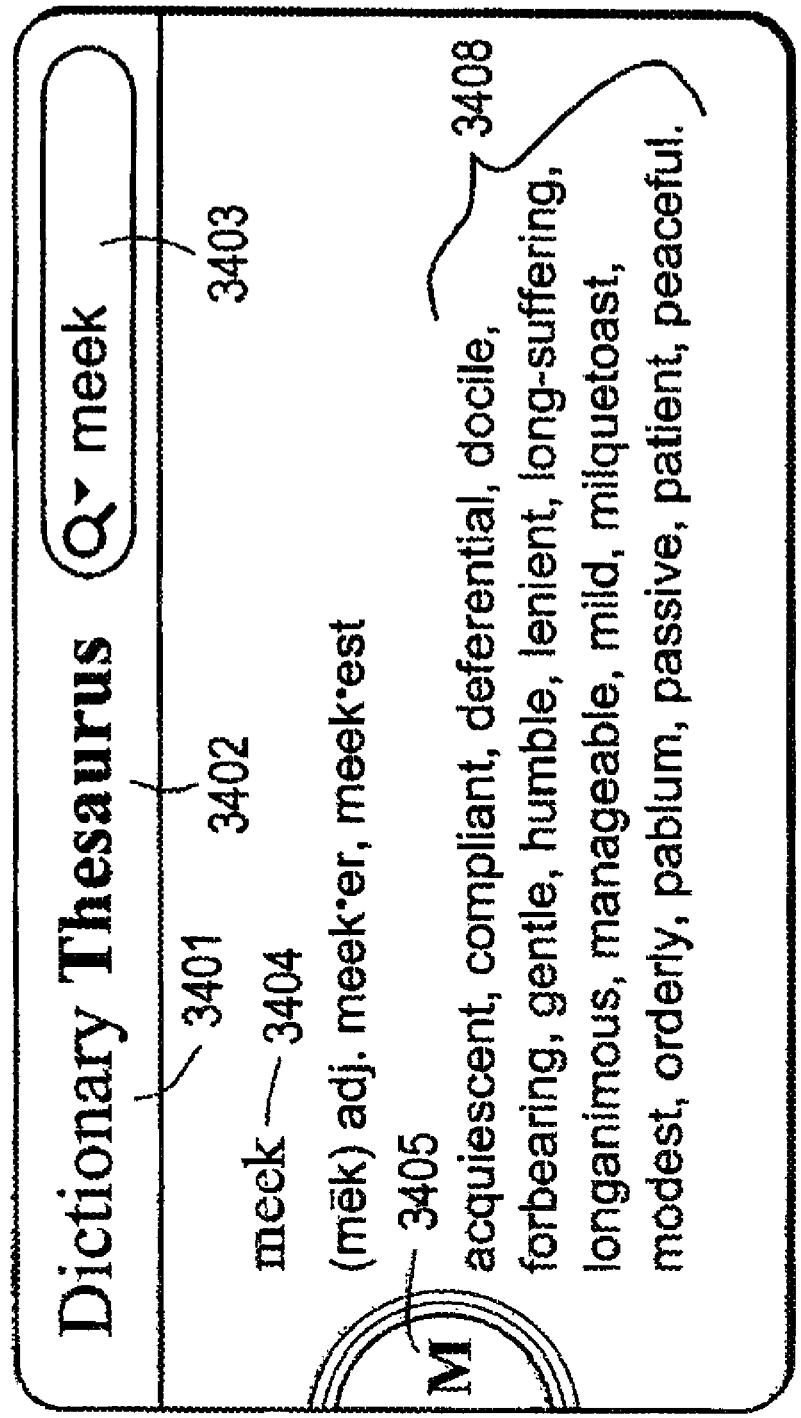

Referring now to FIGS. 34A and 34B, there is shown an example of a dictionary/thesaurus widget 3400 according to one embodiment. A user can type a word in text input field 3403, and can select dictionary or thesaurus functionality by clicking on text labels 3401 or 3402, respectively, to see either definition 3406 or synonyms 3408. If either definition 3406 or synonyms 3408 do not fit within the bounds of widget 3400, widget 3400 can auto-resize accordingly, or can display arrows 3407 for accessing the rest of the information. Thumb index 3405 can also be presented, allowing the user to quickly access other words that appear on the same dictionary page as the entered word. In one embodiment, a reverse lookup dictionary (not shown) can also be provided (the user enters a definition or part thereof, and widget 303 responds with one or more words that match the entry). In one embodiment, data for the dictionary/thesaurus is stored locally at computer 102; in another embodiment, the dictionary/thesaurus widget retrieves its data from a remote server 107.

In one embodiment, the dashboard is also available to a user from a remote location. Configuration information for the user's dashboard is stored at a remote server, pursuant to a user command or automatically. The user can then log in from a remote computer or other device, and be presented with a web page that duplicates the user's dashboard as it would be viewed from his or her own computer. Widgets 303 are provided via HTML pages per the extended functionality described above. The user can interact with widgets 303 in the same manner as from his or her own computer.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

In particular, one skilled in the art will recognize that other architectures and graphics environments may be used, and that the present invention can be implemented using graphics tools and products other than those described above. In particular, the client/server approach is merely one example of an architecture for providing the dashboard functionality of the present invention; one skilled in the art will recognize that other, non-client/server approaches can also be used.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work toothers skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. In a computer system including a display screen comprising an area displaying a user interface, a computer-implemented method for presenting a unified interest layer, the computer-implemented method comprising:
using the computer system to perform the steps of:
executing an operating system that provides a user interface for receiving user interactions;
executing at least one user application that is configured to receive a user interaction through the user interface provided by the operating system;
executing a layer server for activation of the unified interest layer separately from the execution of the at least one user application;
executing within the unified interest layer at least one layer application, wherein each layer application is a client of the layer server;
activating a configuration bar that comprises categories of layer applications responsive to receiving a command at the layer server to configure the unified interest layer;
responsive to receiving a command at the layer server to access a selected category, displaying within the configuration bar one or more layer applications included in the selected category; and
responsive to receiving a command at the layer server to add the layer application to the unified interest layer, adding a layer application from the selected category to the unified interest layer.

2. The method of claim 1, wherein the user interface comprises a plurality of windows.

3. The method of claim 1, further comprising:
responsive to determining that a predetermined period of time has transpired without user input at the at least one layer application, dismissing the unified interest layer.

4. The method of claim 1, further comprising:
receiving user input at the layer server to configure the unified interest layer according to a user provided layer configuration;
providing the unified interest layer according to the user provided layer configuration; and
saving the layer configuration.

5. The method of claim 1, further comprising:
displaying a transitional animation to place a layer application dragged from the configuration bar to a position on the unified interest layer.

6. The method of claim 5, wherein the transitional animation comprises a ripple animation.

7. The method of claim 1, further comprising:
responsive to a command at the layer server to drag a layer application from the configuration bar to a position on the unified interest layer:
automatically retrieving, from a remote server, software code for the layer application; and
installing the software code for the layer application.

8. The method of claim 1, wherein the configuration bar comprises a plurality of categories of layer applications, and wherein:
receiving at the layer server a command to drag at least one layer application from the configuration bar comprises:
receiving at the layer server a command to access layer applications within one of the categories;
displaying commands within the selected category; and
receiving at the layer server a command to drag at least one layer application from the selected category to a position in the unified interest layer.

9. The method of claim 4, wherein saving the layer configuration comprises:
saving at least one of a position, size, and configuration for each layer application.

10. The method of claim 1, further comprising:
receiving at the layer server a command to activate the configuration bar, the configuration bar having at least two active states; and
responsive to receiving a command at the layer server to switch the state of the configuration bar, switching between the at least two active states;
wherein:
in the first state the configuration bar displays a first region comprising at least one label corresponding to a favorite layer application; and
in the second state the configuration bar displays the first region comprising at least one label corresponding to a favorite layer application and a second region comprising at least one label corresponding to a non-favorite layer application.

11. The method of claim 10, further comprising:
responsive to receiving at the layer server a command to move a layer application between the first and second regions from the client of the layer application, moving the layer application according to the command.

12. The method of claim 10, wherein:
in the second state the configuration bar further displays a delete icon for deleting a layer application; and
responsive to receiving at the layer server a command to move a layer application to the delete icon from the client of the layer application, deleting the layer application.

13. The method of claim 10, further comprising:
responsive to receiving at the layer server a command to move a layer application from one of the regions to the unified interest layer from the client of the layer application, displaying the layer application in the unified interest layer.

14. The method of claim 10, further comprising:
responsive to receiving at the layer server a command to move a layer application from the unified interest layer to one of the regions from the client of the layer application, removing the layer application from the unified interest layer and displaying a label corresponding the layer application in the specified region.

15. The method of claim 1, wherein the configuration bar comprises labels identifying the one or more layer applications.

16. The method of claim 15, wherein a label corresponding to a currently-active layer application is shown in a first visual format, and a label corresponding to a currently-inactive layer application is shown in a second visual format.

17. The method of claim 16, wherein the first visual format is grayed-out.

18. The method of claim 15, wherein at least one layer application is capable of being instantiated multiple times, and at least one layer application is not capable of being instantiated multiple times, and wherein:
a label corresponding to a currently-active layer application that is not capable of being instantiated multiple times is shown in a first visual format; and a label corresponding to a currently-active layer application that is capable of being instantiated multiple times is shown in a second visual format.

19. The method of claim 18, wherein the first visual format is grayed-out.

20. The method of claim 15, wherein at least one layer application is capable of being instantiated multiple times, and at least one layer application is not capable of being instantiated multiple times, and wherein:
a label corresponding to a currently-active layer application that is not capable of being instantiated multiple times is shown in a first visual format;
a label corresponding to a currently-active layer application that is capable of being instantiated multiple times is shown in a second visual format; and
a label corresponding to a currently-inactive layer application is shown in a third visual format.

21. The method of claim 20, wherein the first visual format is grayed-out.

22. The method of claim 1, further comprising displaying the unified interest layer over the inactivated user interface.

23. The method of claim 22, wherein displaying the unified interest layer comprises displaying the unified interest layer in such a manner that at least a portion of the inactivated user interface is still visible.

24. The method of claim 22, further comprising, concurrently with displaying the unified interest layer, displaying a miniature representation of the user interface.

25. The method of claim 1, further comprising:
temporarily inactivating the user interface by modifying a visual characteristic of the user interface.

26. The method of claim 25, wherein modifying a visual characteristic of the user interface comprises performing at least one selected from the group consisting of:
fading the user interface;
darkening the user interface;
brightening the user interface;
blurring the user interface;
changing a color saturation of the user interface;
displaying the user interface in black and white;
distorting the user interface; and
shrinking the user interface.

27. The method of claim 1, further comprising displaying a miniature representation of the user interface within the at least one layer application.

28. The method of claim 1, wherein the displayed user interface comprises a task bar, the method further comprising:
displaying, in the task bar, an icon representing a layer application;
wherein:
the first trigger event comprises a user action with respect to the icon; and
displaying the at least one layer application comprises displaying the layer application represented by the icon.

29. The method of claim 28, further comprising highlighting the displayed icon to indicate an alert in connection with the layer application represented by the icon.

30. The method of claim 1, wherein the at least one layer application is associated with a user application that is configured to receive a user interaction through the user interface provided by the operating system, and wherein a trigger event comprises a user command to launch the user application associated with the at least one layer application, the method further comprising:
responsive to the user interface being reactivated, launching the user application associated with the layer application.

31. The method of claim 30, wherein the user command to launch the user application associated with a layer application comprises user activation of a button in the layer application.

32. The method of claim 1, further comprising:
responsive to receiving a first trigger event:
displaying a first transitional animation for inactivating the user interface and introducing the at least one layer application of the unified interest layer; and
responsive to receiving a second trigger event:
displaying a second transitional animation for dismissing the at least one layer application and restoring the user interface.

33. The method of claim 32, wherein each transitional animation comprises one selected from the group consisting of:
a fly-in animation;
a fly-out animation;
a zoom-in animation; and
a zoom-out animation.

34. The method of claim 1, wherein at least one of the layer applications is movable.

35. The method of claim 34, wherein, responsive to receiving at the layer server user input moving a first layer application on top of a second layer application from a client of the first layer application, automatically moving the second layer application to make room for the first layer application.

36. The method of claim 1, wherein displaying the at least one layer application comprises displaying at least one layer application at a position previously selected by the user.

37. The method of claim 1, wherein the layer application is editable.

38. The method of claim 1, wherein the at least one layer application overlaps another layer application.

39. The method of claim 1, wherein at least one layer application comprises one selected from the group consisting of:
a calendar application;
a calculator application;
a music player application;
an address book application;
a notes application;
a stock quote application;
a weather application;
a traffic application;
a package tracking application;
a contact manager application; and
a clock application.

40. The method of claim 1, further comprising:
reactivating the user interface by restoring the user interface to a state substantially identical to its state at the time of inactivation.

41. The method of claim 1, wherein the at least one layer application responds to user input.

42. The method of claim 1, wherein the area displaying a user interface occupies substantially the entire display screen.

43. The method of claim 1, wherein the at least one layer application receives data from a remote server that is distinct from the layer server.

44. In a computer system including a display screen comprising an area displaying a user interface, a computer-implemented method for presenting a unified interest layer, the computer-implemented method comprising:
using the computer system to perform the steps of:
executing an operating system that provides a user interface for receiving user interactions;

executing at least one user application that is configured to receive a user interaction through the user interface provided by the operating system;

executing a layer server for activation of the unified interest layer separately from the execution of the at least one user application;

executing within the unified interest layer at least one layer application;

displaying a configuration bar in a first state responsive to receiving a command at the layer server to configure the unified interest layer, the first state comprising a first region including at least one identifier corresponding to a favorite layer application;

displaying the configuration bar in a second state responsive to receiving a command at the layer server to switch to the second state, the second state comprising the first region including the at least one identifier corresponding to the favorite layer application and a second region comprising at least one identifier corresponding to a non-favorite layer application.

45. A computer program product for presenting a unified interest layer in a computer system including a display screen comprising an area displaying a user interface, the computer program product comprising:

a computer-readable medium; and computer program code, encoded on the medium, for:

executing an operating system that provides a user interface for receiving user interactions;

executing at least one user application that is configured to receive a user interaction through the user interface provided by the operating system;

executing a layer server for activation of the unified interest layer separately from the execution of the at least one user application;

executing within the unified interest layer at least one layer application, wherein each layer application is a client of the layer server;

activating the unified interest layer responsive to receiving a command at the layer server to activate the unified interest layer;

activating a configuration bar that comprises categories of layer applications responsive to receiving a command at the layer server to configure the unified interest layer;

responsive to receiving a command at the layer server to access a selected category, displaying within the configuration bar one or more layer applications included in the selected category; and responsive to receiving a command at the layer server to add the layer application to the unified interest layer, adding a layer application included in the selected category to the unified interest layer.

46. The computer program product of claim 45, further comprising computer program code, encoded on the medium, for:

responsive to receiving a trigger event at the layer server for dismissing the unified interest layer:

dismissing the at least one layer application of the unified interest layer thereby preventing the at least one layer application from receiving any further user interaction; and reactivating the user interface provided by the operating system and the least one user application.

47. The computer program product of claim 45, further comprising computer program code, encoded on the medium, for:

receiving user input at the layer server to configure the unified interest layer according to a user provided layer configuration;

providing the unified interest layer according to the layer configuration; and saving the layer configuration.

48. A system for presenting a unified interest layer in a computer system including a display screen, the system comprising:

an operating system configured to provide a user interface for receiving user interactions and executing at least one user application that is configured to receive a user interaction through the user interface;

a layer server configured to:

activate the unified interest layer separately from the execution of the at least one user application;

execute within the unified interest layer at least one layer application, wherein each layer application is a client of the layer server;

activate a configuration bar that comprises categories of layer applications responsive to receiving a command to configure the unified interest layer;

display within the configuration bar one or more layer applications included in a selected category responsive to receiving a command to access the selected category; and add a layer application included in the selected category to the unified interest layer responsive to receiving a command at the layer server to add the layer application to the unified interest layer.

49. The system of claim 48, wherein:

the layer server is further configured to receive a trigger event for dismissing the unified interest layer; and responsive to receiving the trigger event, the layer server:

dismisses the unified interest layer; and reactivates the user interface.

50. The system of claim 49 wherein the layer server is further configured to:

configure the unified interest layer according to a user provided layer configuration; and provide the unified interest layer according to the user provided layer configuration; and save the layer configuration in a storage device.

51. A computer program product for presenting a unified interest layer in a computer system including a display screen comprising an area displaying a user interface, the computer program product comprising:

a computer-readable medium; and computer program code, encoded on the medium, for:

executing an operating system that provides both a user interface for receiving user interactions;

executing at least one user application that is configured to receive a user interaction through the user interface provided by the operating system;

executing a layer server for activation of the unified interest layer separately from the execution of the at least one user application;

executing within the unified interest layer at least one layer application;

displaying a configuration bar in a first state responsive to receiving a command at the layer server to configure the unified interest layer, the first state comprising a first region including at least one identifier corresponding to a favorite layer application;

displaying the configuration bar in a second state responsive to receiving a command at the layer server to switch to the second state, the second state comprising the first region including the at least one identifier corresponding to the favorite layer application and a second region comprising at least one identifier corresponding to a non-favorite layer application.

52. In a computer system including a display screen comprising an area displaying a user interface, a computer-implemented method for presenting a unified interest layer, the computer-implemented method comprising:
using the computer system to perform the steps of:
executing an operating system that provides a user interface for receiving user interactions;
executing a user application that is configured to receive a user interaction through the user interface provided by the operating system;
executing a layer server for activation of the unified interest layer separately from the execution of the user application;
executing a layer application within the unified interest layer;
activating a configuration bar that comprises identifiers of layer applications responsive to receiving a command at the layer server to configure the unified interest layer, wherein at least one layer application in the configuration bar is capable of being instantiated multiple times and at least one layer application in the configuration bar is not capable of being instantiated multiple times;
displaying in the configuration bar an identifier associated with a layer application that is active on the unified interest layer and is not capable of being instantiated multiple times in a first visual format; and
displaying in the configuration bar an identifier associated with a layer application that is active on the unified interest layer and is capable of being instantiated multiple times in a second visual format.

53. The method of claim 52, further comprising:
responsive to receiving a trigger event for activating the unified interest layer:
temporarily inactivating the user interface provided by the operating system and the user application, wherein the user application cannot receive user interactions while the user interface is inactivated; activating the unified interest layer to enable the layer application to receive a user interaction;
obtaining contextual information from the user application;
activating the layer application and providing a parameter derived from the obtained contextual information to the layer application; and
displaying, in the area of the display screen, the layer application of the unified interest layer, the layer application displaying information based upon the provided parameter.

54. The method of claim 53, wherein the layer application displaying information based upon the provided parameter comprises displaying search results based at least in part on the provided parameter.

55. The method of claim 54, wherein the provided parameter is a geographical location and the search results comprise weather data associated with the geographical location.

56. The method of claim 54, wherein the provided parameter is a keyword and the search results comprise a definition associated with the keyword.

57. The method of claim 54, wherein the provided parameter is a person's name and the search results comprise contact information associated with the person.

58. In a computer system including a display screen comprising an area displaying a user interface, a computer-implemented method for presenting a unified interest layer, the computer-implemented method comprising:
using the computer system to perform the steps of:
executing an operating system that provides a user interface for receiving user interactions;
executing a user application that is configured to receive a user interaction through the user interface provided by the operating system;
executing a layer server for activation of the unified interest layer separately from the execution of the user application;
executing a first layer application and a second layer application within the unified interest layer; and
responsive to receiving user input at the layer server to move the first layer application on top of the second layer application, automatically moving the second layer application to make room for the first layer application.

59. The method of claim 58, further comprising:
responsive to receiving a trigger event for activating the unified interest layer:
temporarily inactivating the user interface provided by the operating system and the user application, wherein the user application cannot receive user interactions while the user interface is inactivated; activating the unified interest layer to enable the layer application to receive a user interaction;
activating the layer application of the unified interest layer;
displaying, in the area of the display screen, the layer application of the unified interest layer;
obtaining contextual information from the user application;
providing a parameter derived from the obtained contextual information to the layer application; and
displaying in the layer application information based upon the provided parameter.

60. The method of claim 59, wherein providing a parameter derived from the obtained contextual information comprises pre-populating a data entry field of the layer application with information based at least in part on the parameter.

61. The method of claim 59, wherein displaying in the layer application information based upon the provided parameter comprises displaying search results based at least in part on the provided parameter.

62. A computer program product for presenting a unified interest layer in a computer system including a display screen comprising an area displaying a user interface, the computer program product comprising:
a computer-readable medium; and
computer program code, encoded on the medium, for:
executing an operating system that provides a user interface for receiving user interactions;
executing at least one user application that is configured to receive a user interaction through the user interface provided by the operating system;
executing a layer server for activation of the unified interest layer separately from the execution of the at least one user application;
executing within the unified interest layer at least one layer application, wherein each layer application is a client of the layer server;
activating a configuration bar that comprises identifiers of layer applications responsive to receiving a command at the layer server to configure the unified interest layer, wherein at least one layer application in the configuration bar is capable of being instantiated multiple times and at least one layer application in the configuration bar is not capable of being instantiated multiple times;

displaying in the configuration bar an identifier associated with a layer application that is active on the unified interest layer and is not capable of being instantiated multiple times in a first visual format; and displaying in the configuration bar an identifier associated with a layer application that is active on the unified interest layer and is capable of being instantiated multiple times in a second visual format.

63. A system for presenting a unified interest layer in a computer system including a display screen, the system comprising:

an operating system configured to provide a user interface for receiving user interactions and execute at least one user application that is configured to receive a user interaction through the user interface;

a layer server configured to:

activate the unified interest layer separately from the execution of the at least one user application;

execute within the unified interest layer at least one layer application, wherein each layer application is a client of the layer server;

activate a configuration bar that comprises identifiers of layer applications responsive to receiving a command at the layer server to configure the unified interest layer, wherein at least one layer application in the configuration bar is capable of being instantiated multiple times and at least one layer application in the configuration bar is not capable of being instantiated multiple times;

display in the configuration bar an identifier associated with a layer application that is active on the unified interest layer and is not capable of being instantiated multiple times in a first visual format; and display in the configuration bar an identifier associated with a layer application that is active on the unified interest layer and is capable of being instantiated multiple times in a second visual format.

64. A computer program product for presenting a unified interest layer in a computer system including a display screen comprising an area displaying a user interface, the computer program product comprising:

a computer-readable medium; and computer program code, encoded on the medium, for:

executing an operating system that provides a user interface for receiving user interactions;

executing a user application that is configured to receive a user interaction through the user interface provided by the operating system;

executing a layer server for activation of the unified interest layer separately from the execution of the user application;

executing a first layer application and a second layer application within the unified interest layer; and responsive to receiving user input at the layer server to move the first layer application on top of the second layer application, automatically moving the second layer application to make room for the first layer application.

65. A system for presenting a unified interest layer in a computer system including a display screen, the system comprising:

an operating system configured to provide a user interface for receiving user interactions and execute at least one user application that is configured to receive a user interaction through the user interface;

a layer server configured to:

activate the unified interest layer separately from the execution of the at least one user application;

execute a first layer application and a second layer application within the unified interest layer; and responsive to receiving user input at the layer server to move the first layer application on top of the second layer application, automatically move the second layer application to make room for the first layer application.

* * * * *

UNITED STATES PATENT AND TRADEMARK OFFICE
CERTIFICATE OF CORRECTION

PATENT NO. : 7,793,232 B2  
APPLICATION NO. : 11/370743  
DATED : September 7, 2010  
INVENTOR(S) : Imran A. Chaudhri et al.

It is certified that error appears in the above-identified patent and that said Letters Patent is hereby corrected as shown below:

On page 4, in column 1, under "Other Publications", line 50, delete "Retireved" and insert -- Retrieved --, therefor.

In column 5, line 57, delete "desk-top" and insert -- desktop --, therefor.

In column 12, line 28, after "FIG. 6" insert -- . --.

In column 22, line 4, delete "toothers" and insert -- to others --, therefor.

In column 28, line 37, in claim 50, delete "claim 49" and insert -- claim 48, --, therefor.

Signed and Sealed this  
Twenty-ninth Day of November, 2011

David J. Kappos  
*Director of the United States Patent and Trademark Office*